United States Patent

Serizawa et al.

[11] Patent Number: 5,258,779
[45] Date of Patent: Nov. 2, 1993

[54] IMAGE FORMING APPARATUS WITH MEANS FOR CONTROLLING FEEDING OF RECORDING MEDIUM

[75] Inventors: Yoji Serizawa, Yokohama; Akio Noguchi, Ebina; Yukihide Ushio, Tokyo; Shimpei Matsuo, Tokyo; Seiji Uchiyama, Tokyo; Makoto Takeuchi, Yokohama; Kazuro Yamada, Machida, all of Japan

[73] Assignee: Canon Kabushiki Kaisha, Tokyo, Japan

[21] Appl. No.: 656,200

[22] Filed: Feb. 15, 1991

[30] Foreign Application Priority Data

Feb. 17, 1990 [JP] Japan ................ 2-37062
May 25, 1990 [JP] Japan ................ 2-135583
May 31, 1990 [JP] Japan ................ 2-143730
Jun. 25, 1990 [JP] Japan ................ 2-167646

[51] Int. Cl.⁵ ............... G03G 15/00; B41J 13/00; G06K 15/00
[52] U.S. Cl. .................. 346/134; 255/309; 358/300; 395/111
[58] Field of Search ........... 355/206, 309, 311; 346/134, 160; 358/296, 300; 364/519; 395/111, 116

[56] References Cited

U.S. PATENT DOCUMENTS

| 4,687,320 | 8/1987 | Nakanishi et al. | 355/206 |
| 4,933,772 | 6/1990 | Ikenoue et al. | 358/300 |
| 4,985,736 | 1/1991 | Kawano et al. | 355/311 |
| 4,992,882 | 2/1991 | Ikenoue et al. | 355/300 |

FOREIGN PATENT DOCUMENTS 60-018371 1/1985 Japan.
62-082768 4/1987 Japan.
1-174453 7/1989 Japan.
1-209235 8/1989 Japan.

Primary Examiner—Joan H. Pendegrass
Attorney, Agent, or Firm—Fitzpatrick, Cella, Harper & Scinto

[57] ABSTRACT

An image forming apparatus which has an image signal generator for generating an image signal, an image forming unit for forming an image on a recording medium based on the generated image signal, a feeding unit for feeding the medium to the image forming unit, and a controller for outputting different commands to the image forming unit to control the image forming unit. The feeding unit performs spare paper feeding of the medium to a predetermined position before the generator is set in an image signal output enable state and feeds the medium from the predetermined position to the image forming unit after the generator is set in the image signal output enable state. The image forming unit validates a specific command of the different commands when the specific command is received during at least a spare paper feed period from start of spare paper feeding of the recording medium to start of paper feeding from the predetermined position, thereby maximizing the function of the image forming apparatus.

57 Claims, 42 Drawing Sheets

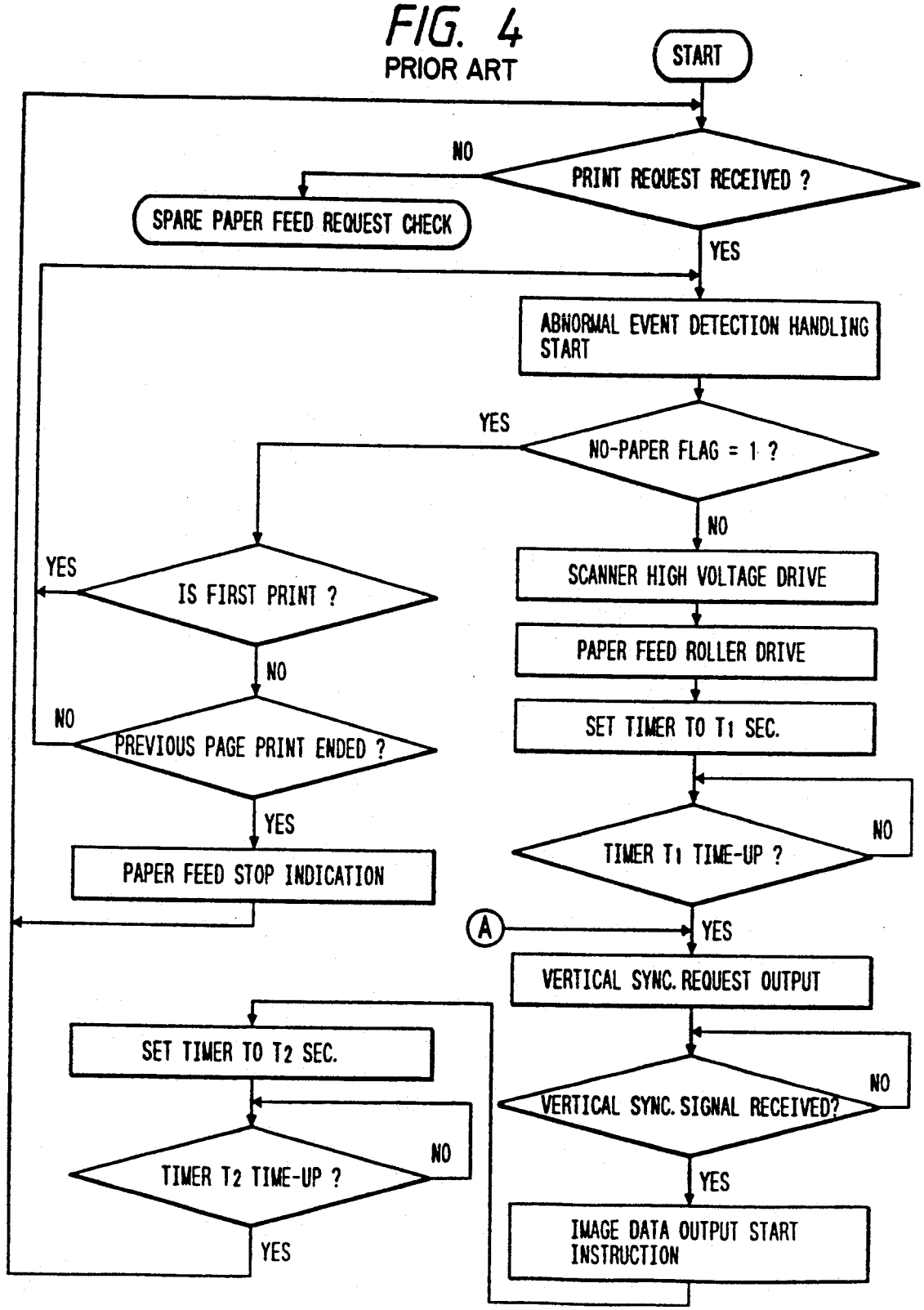

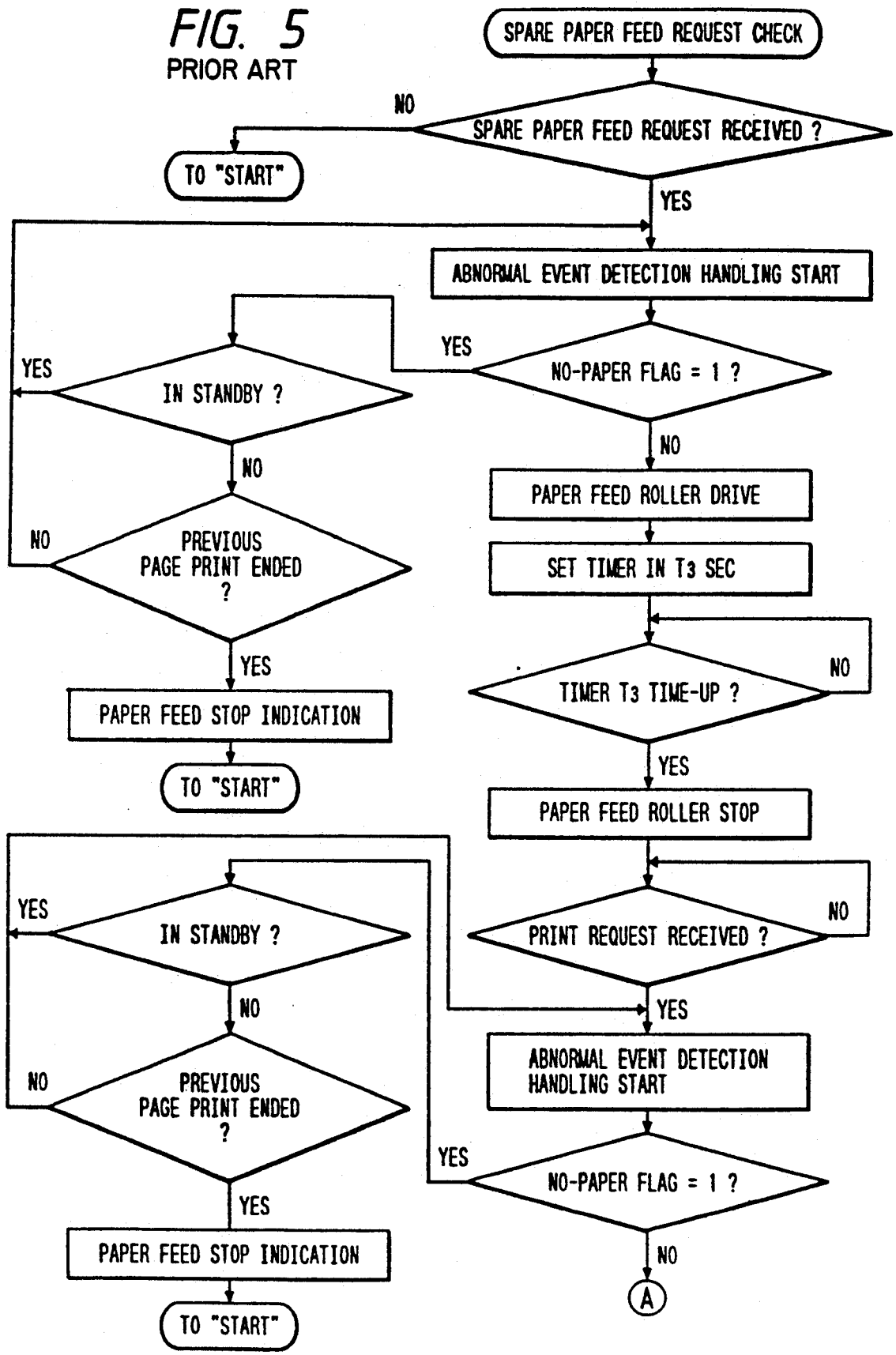

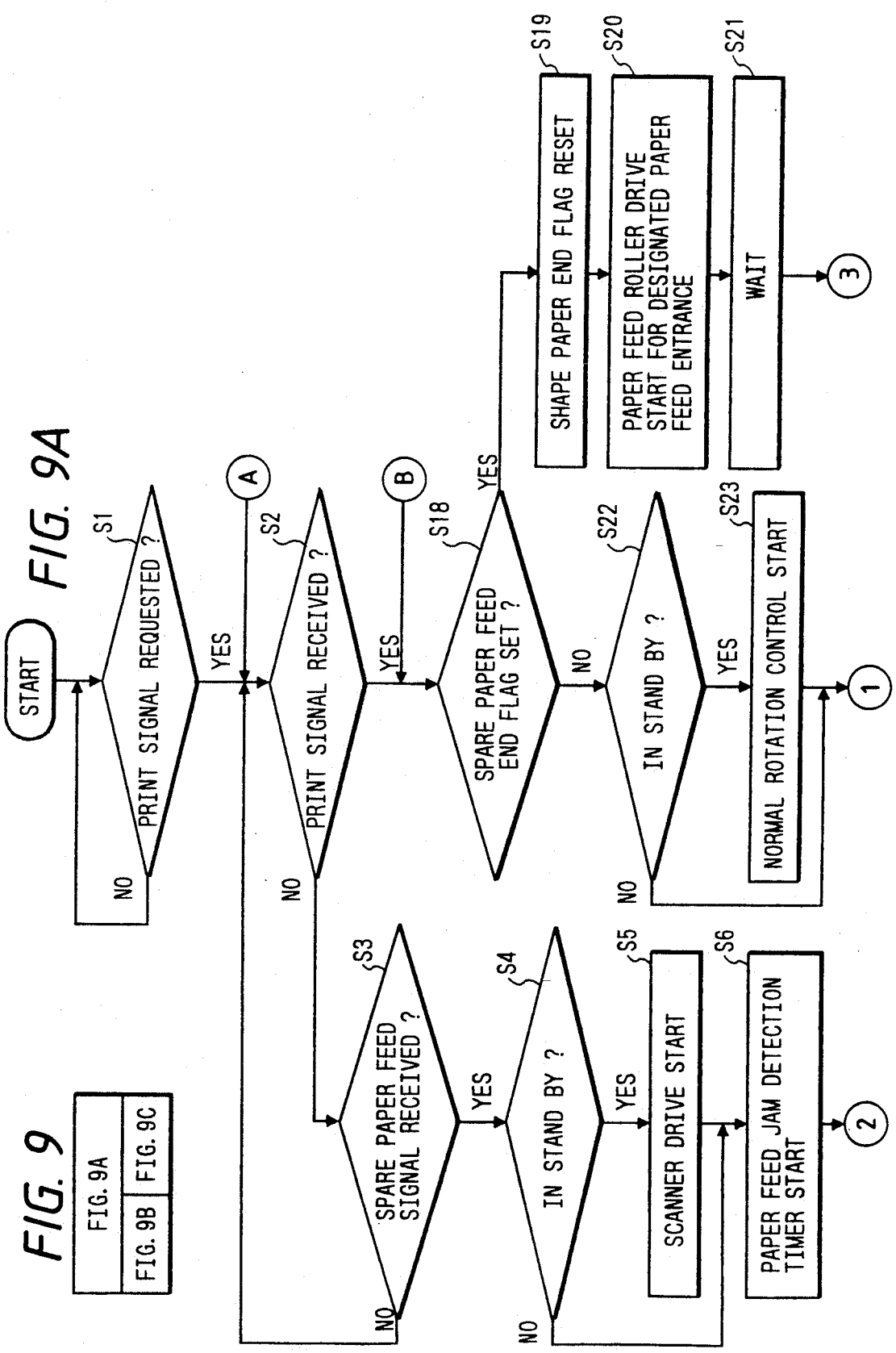

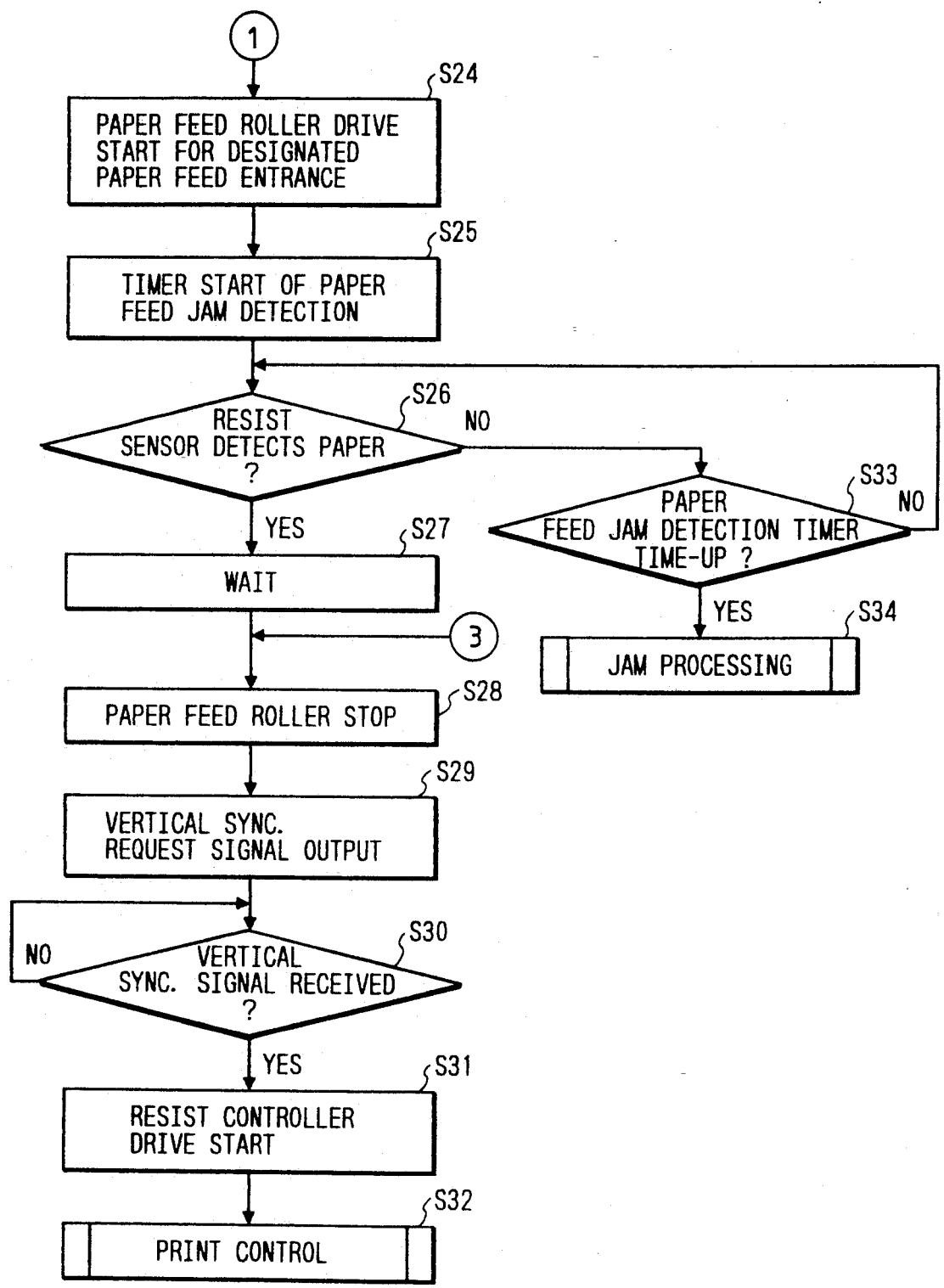

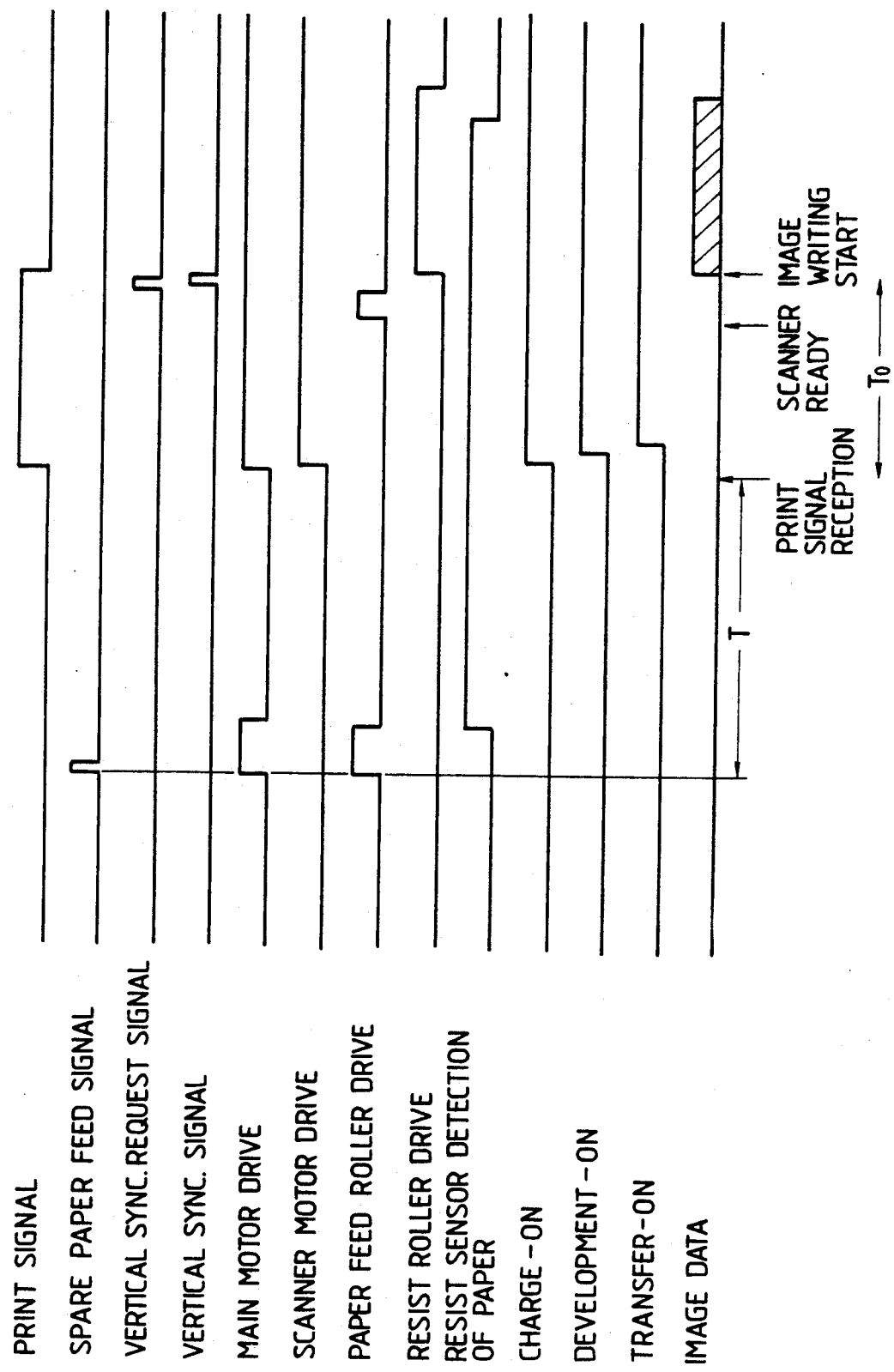

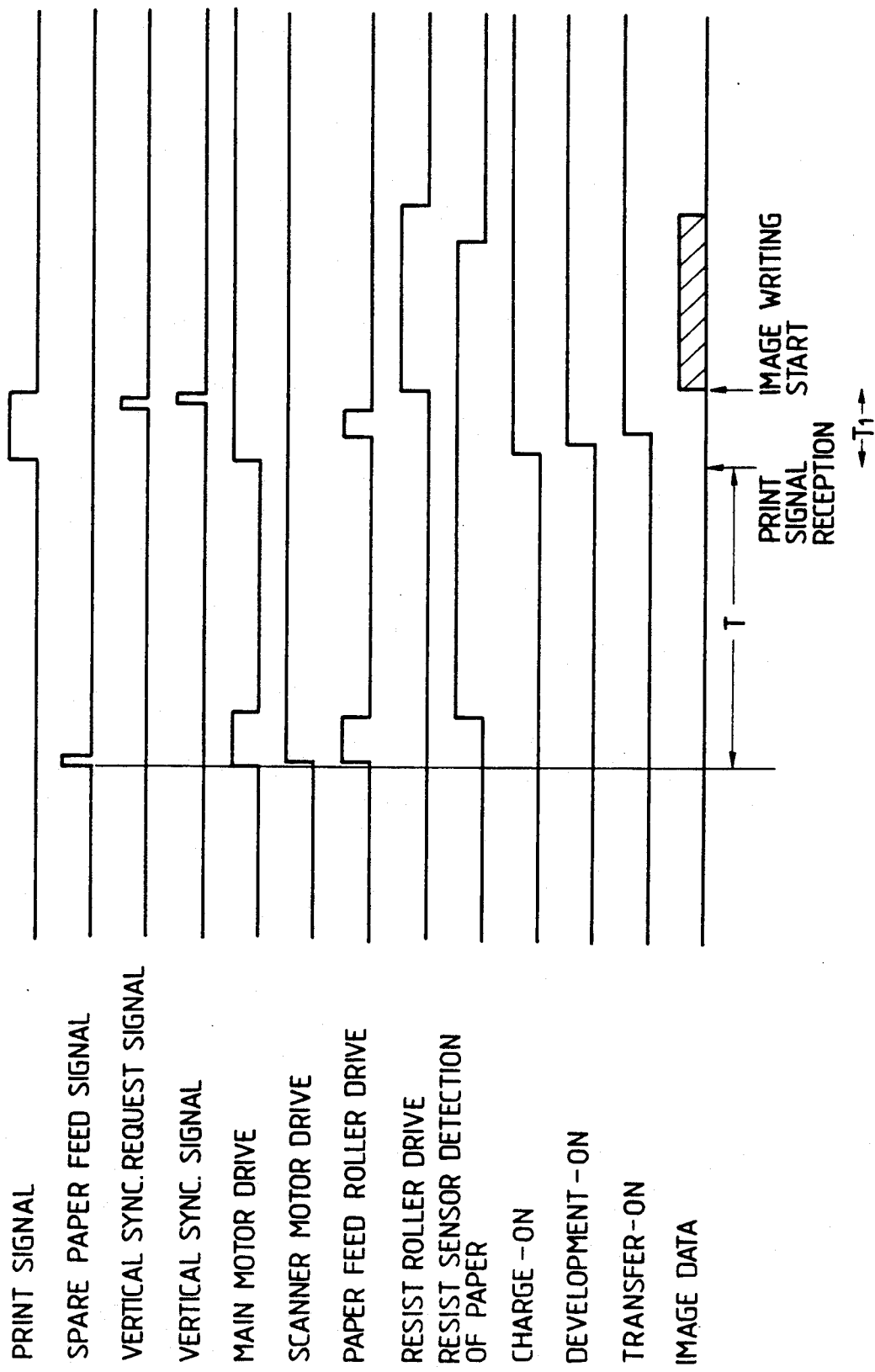

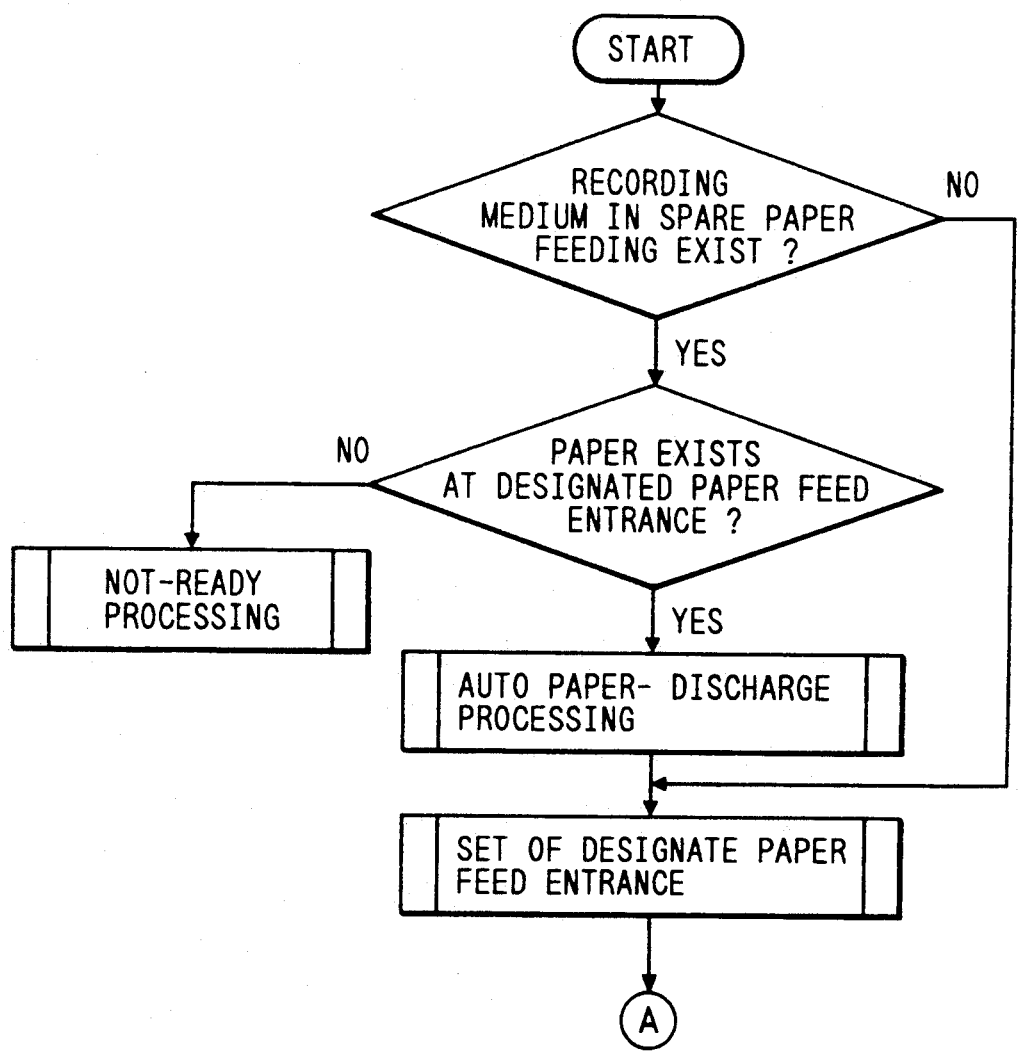

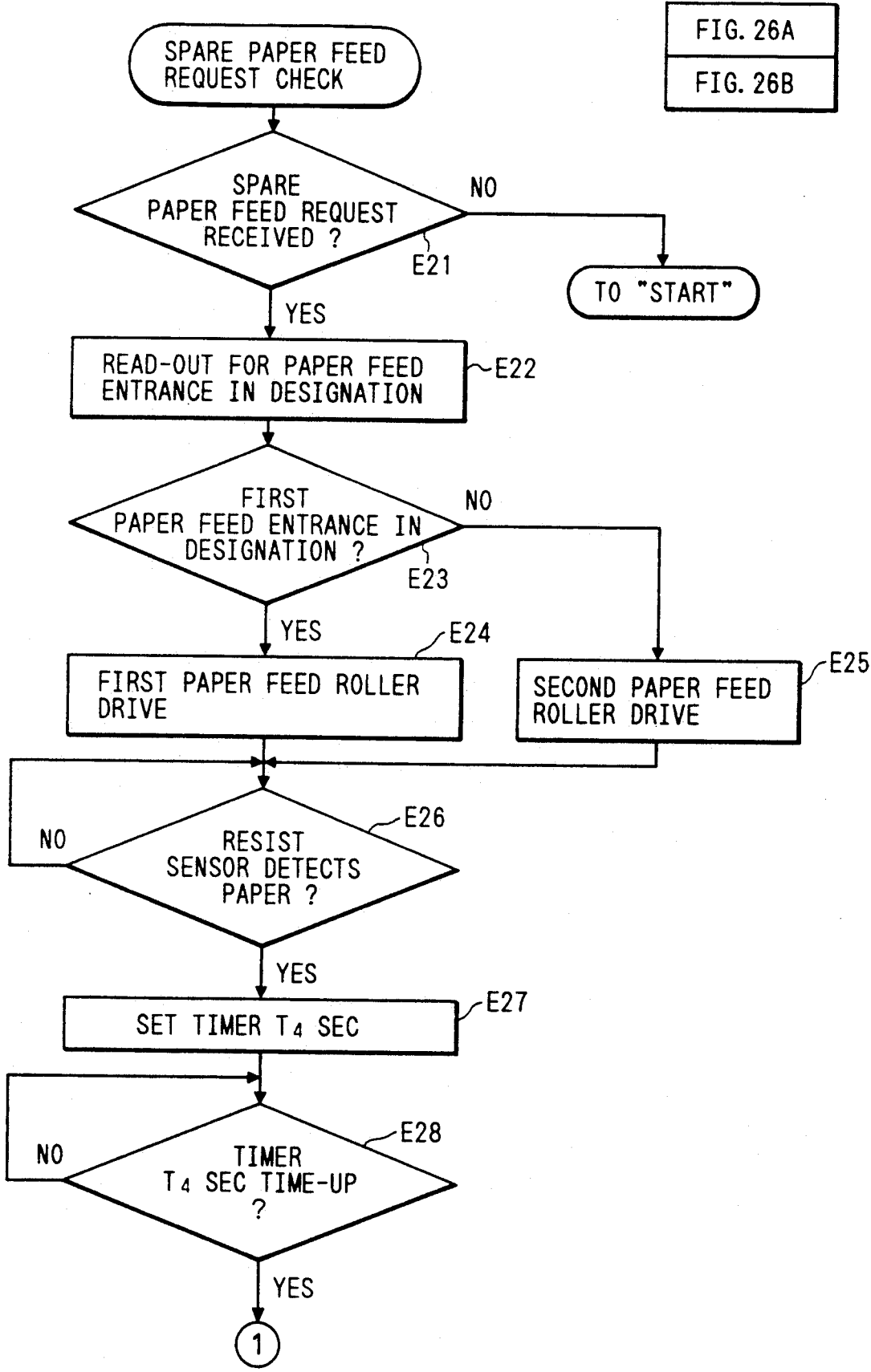

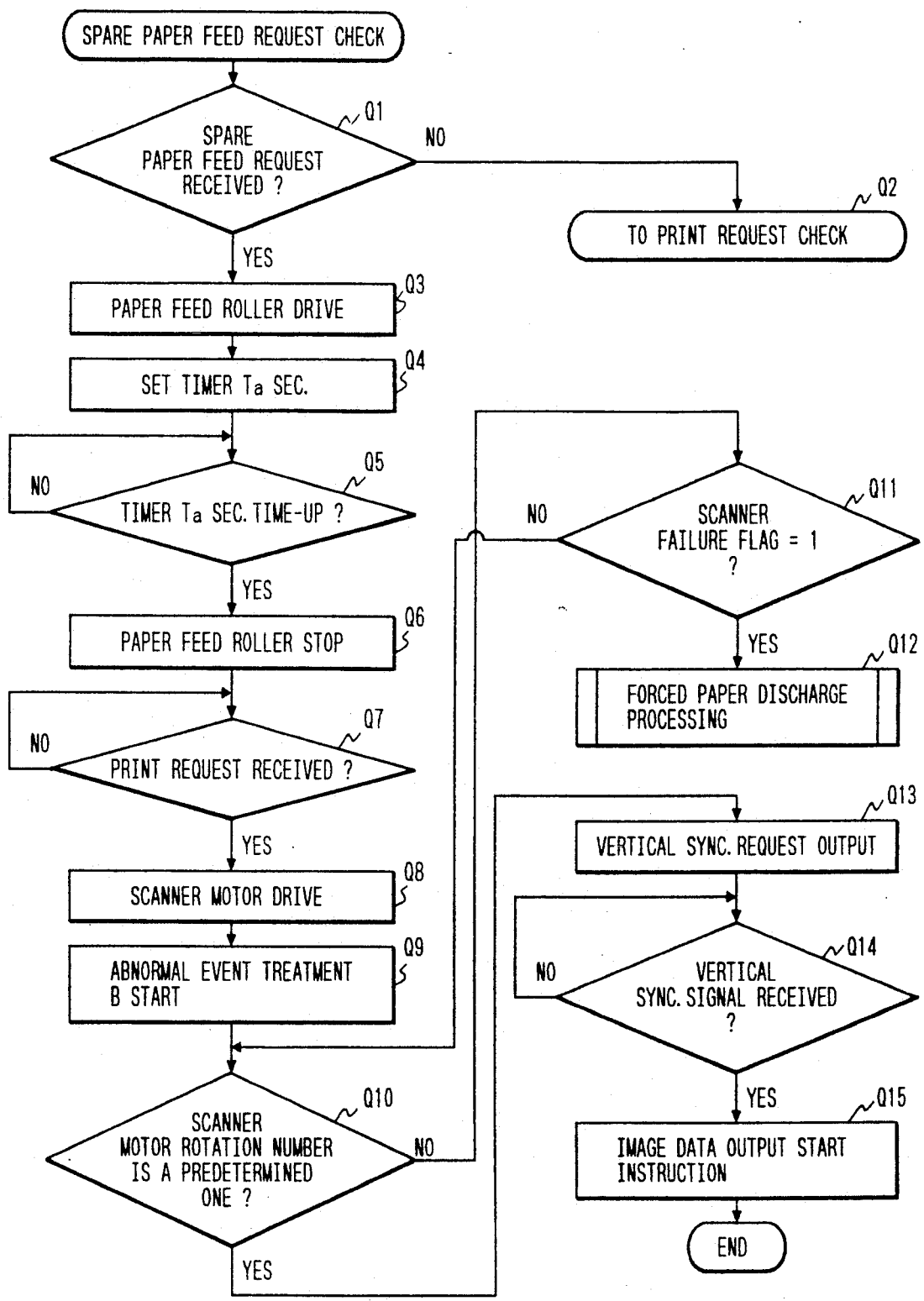

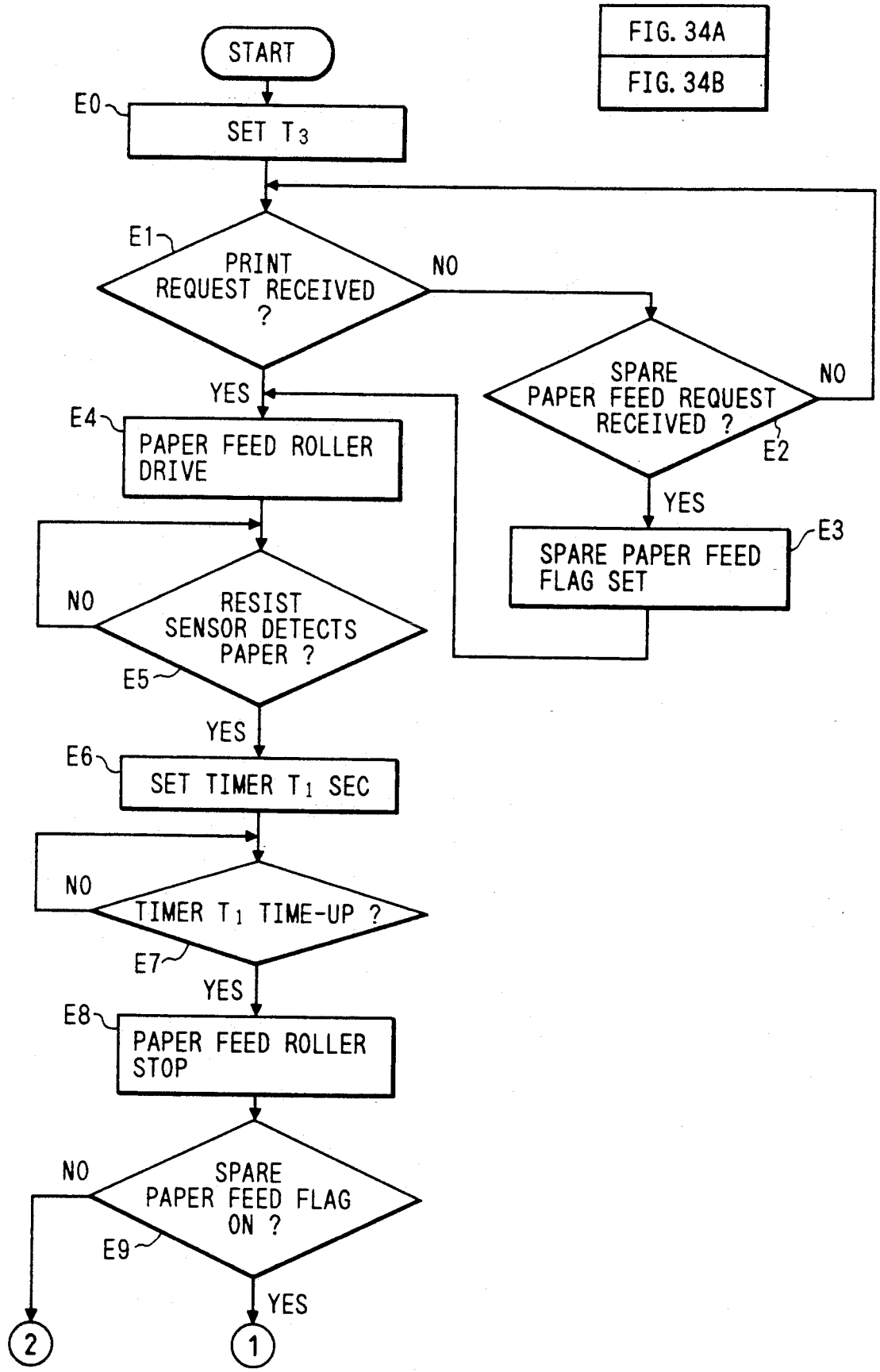

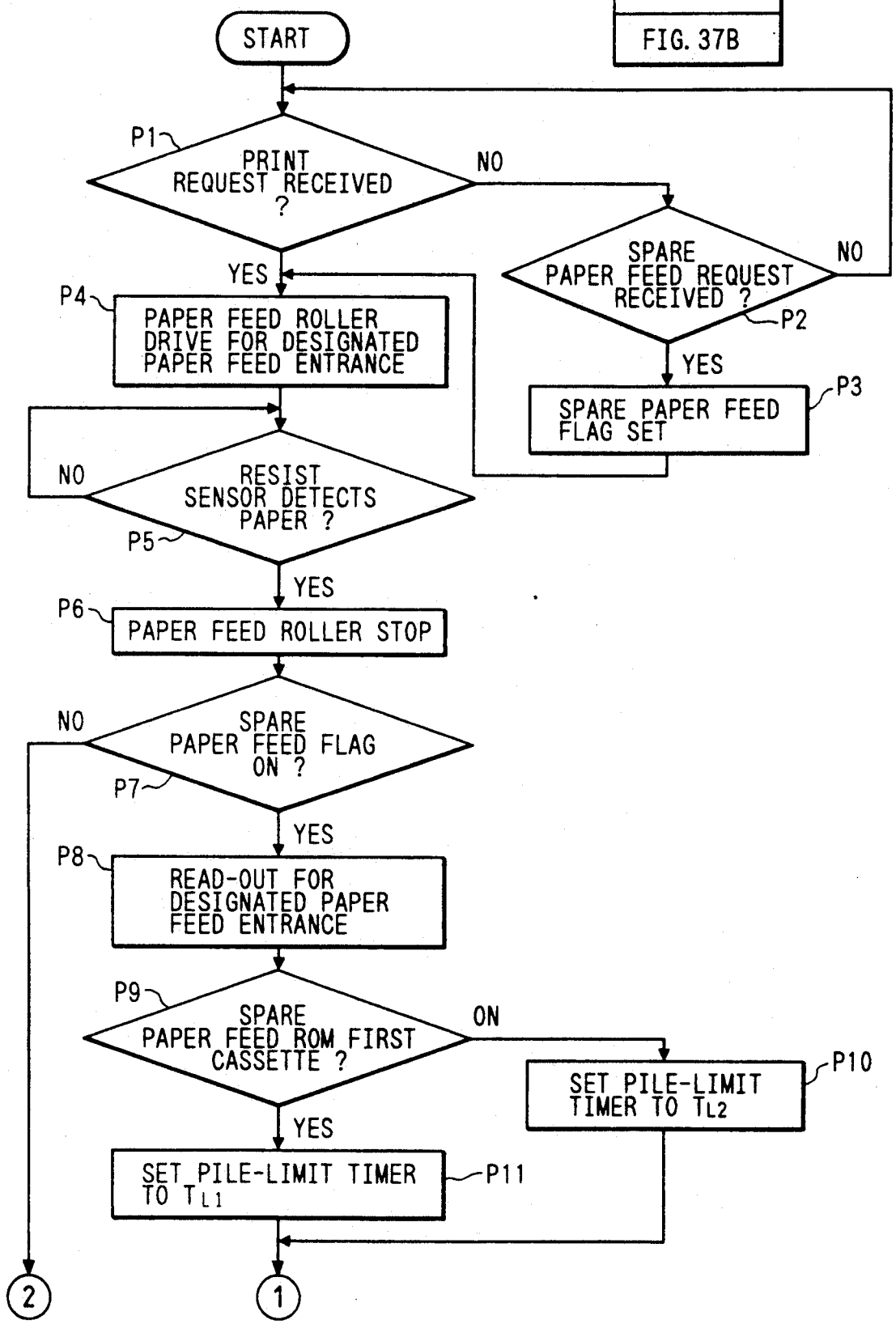

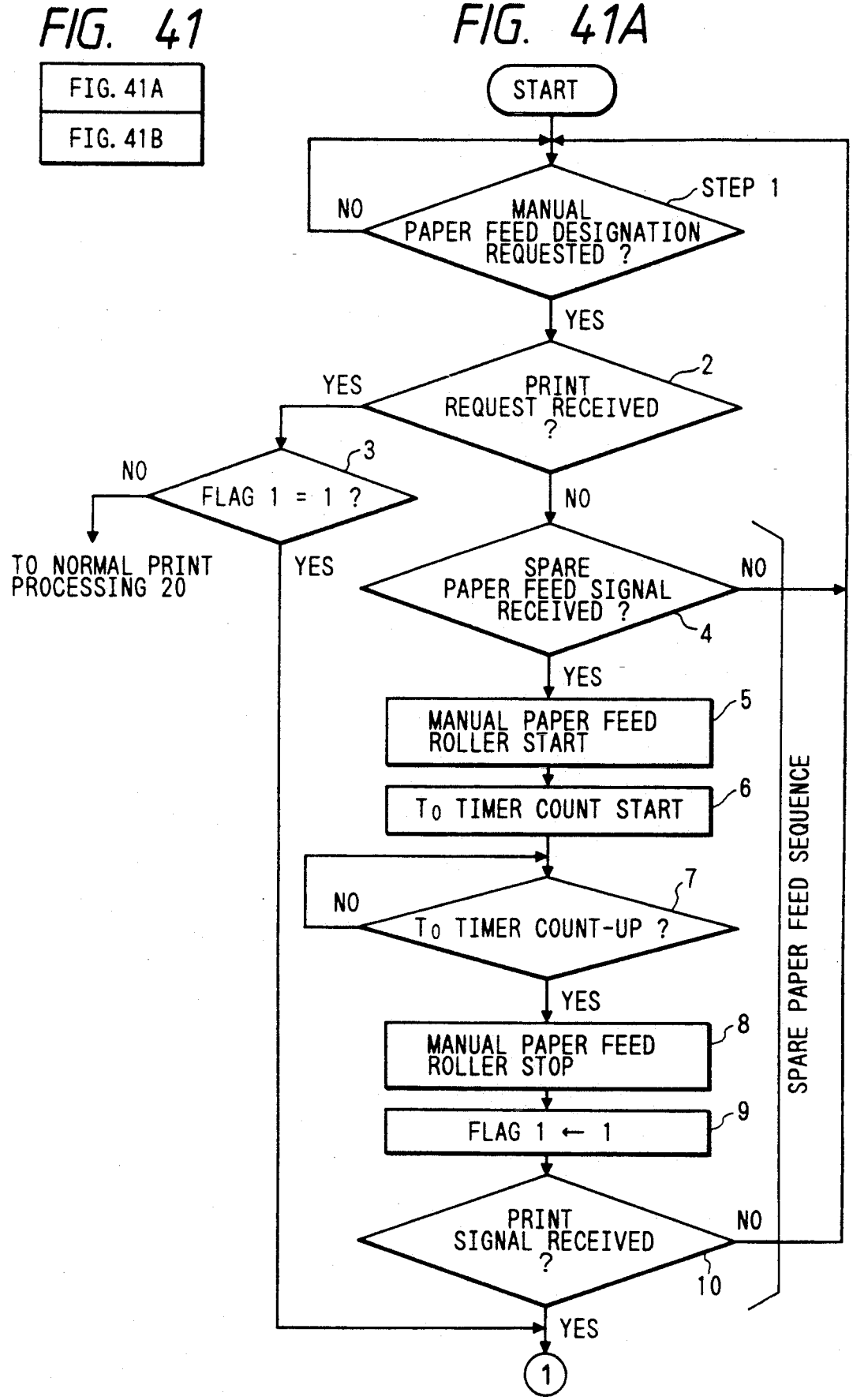

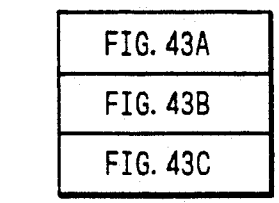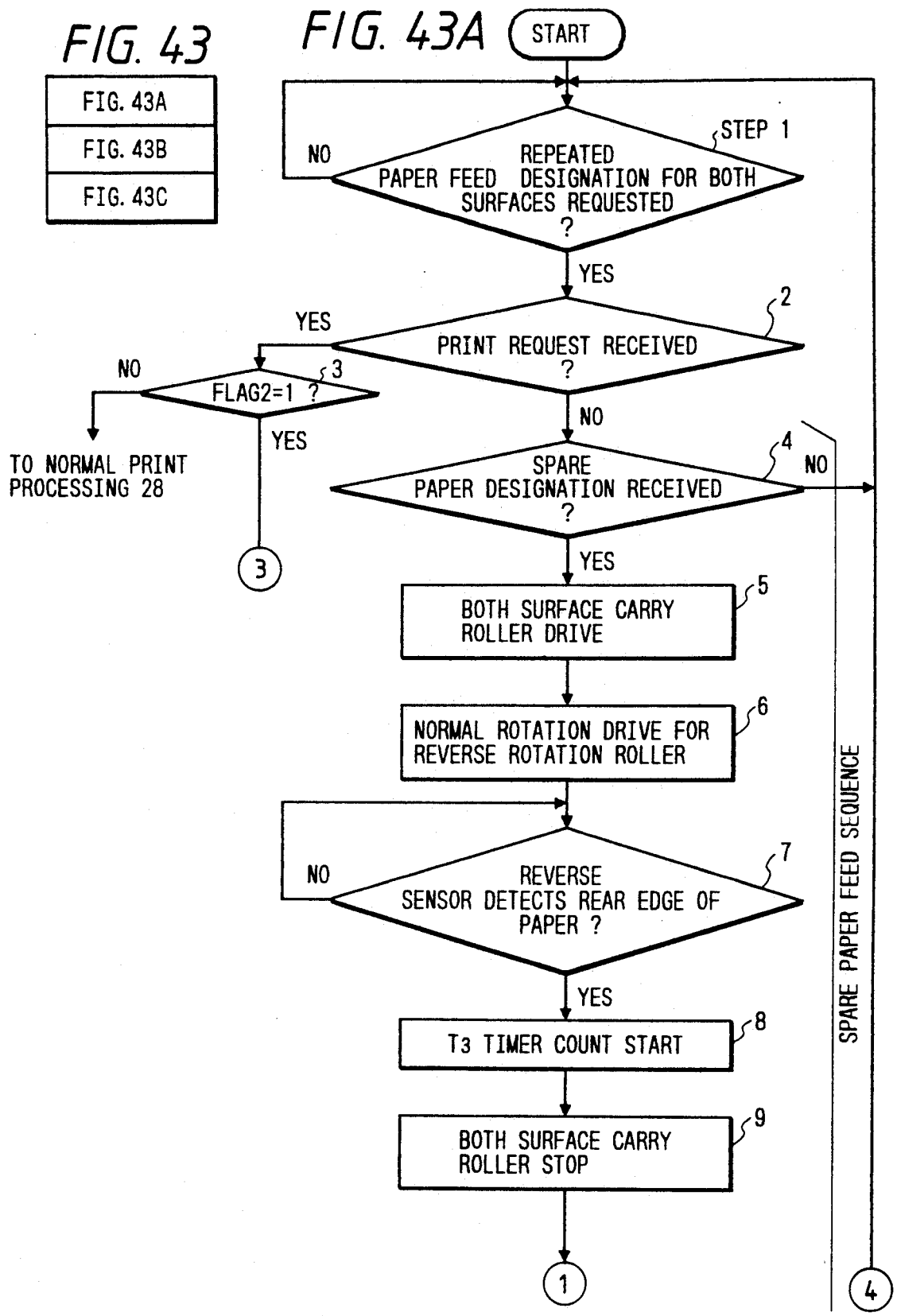

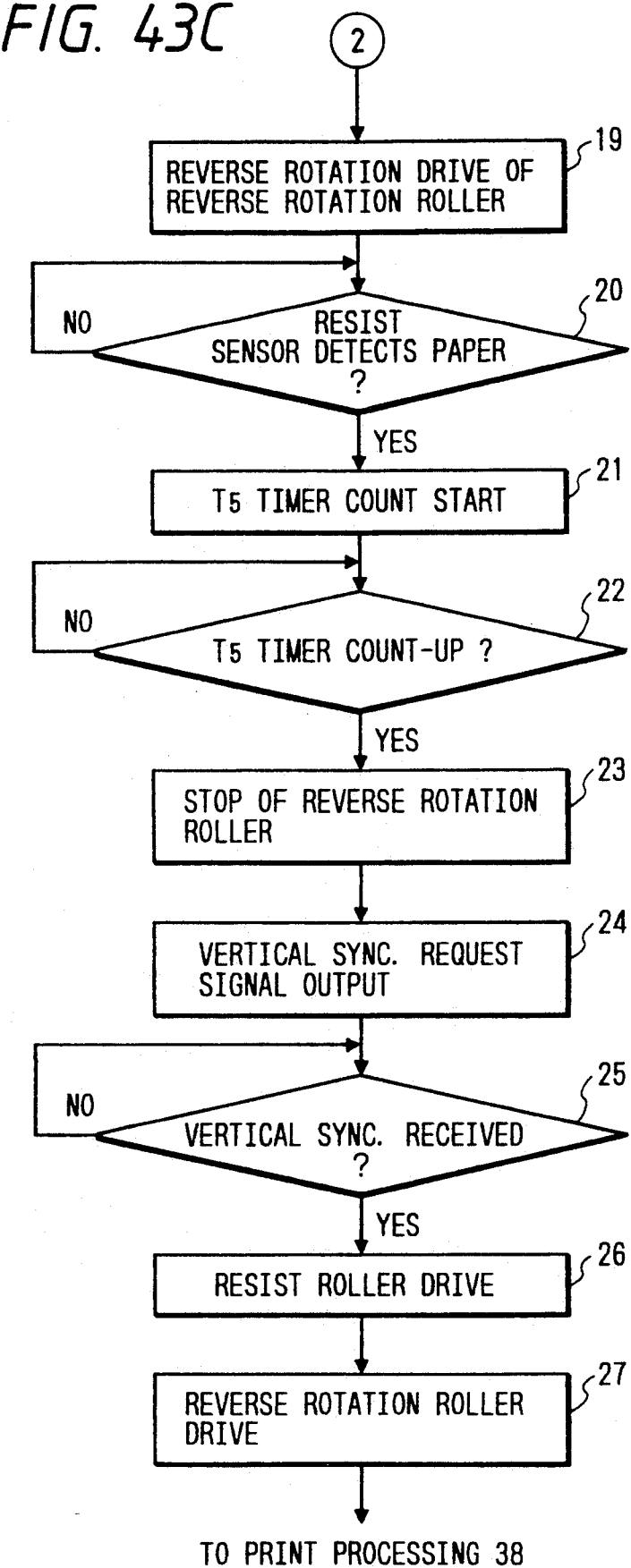

IMAGE FORMING APPARATUS WITH MEANS FOR CONTROLLING FEEDING OF RECORDING MEDIUM

BACKGROUND OF THE INVENTION

1. Field of the Invention

The present invention relates to an image forming apparatus such as an electrophotographic printer apparatus having, e.g., a spare paper feed function. In this specification, the spare paper feed function is defined as a function of feeding a recording sheet or the like from a paper feed cassette or the like to a predetermined position prior to a print request (or an end of one-page image development), and feeding the paper sheet from the predetermined position to a recording unit upon reception of a print request.

2. Related Background Art

A conventional image forming apparatus such as a laser printer performs predetermined image formation in accordance with a recording request signal ($\overline{PRINT}$), a vertical sync request signal ($\overline{VSREQ}$), a vertical sync signal ($\overline{VSYNC}$), and an image signal ($\overline{VDO}$). FIG. 1 shows a schematic arrangement of a laser printer, FIG. 2 is a block diagram of its controller, and FIG. 3 is a timing chart showing a recording operation of the laser printer.

A printer controller 100 develops an image on the basis of code data from an external host computer (not shown) or the like and outputs the signal $\overline{PRINT}$ when bit map image data of one page is obtained. A paper feed roller 49 starts to feed a sheet to a resist roller 50 in accordance with the signal $\overline{PRINT}$ from the printer controller 100. A printer engine control unit 101 supplies the signal $\overline{VSREQ}$ to the printer controller 100 at a predetermined timing when a resist sensor 51 detects a leading end of the recording medium. The printer controller 100 immediately outputs the signal $\overline{VSYNC}$ and causes a semiconductor laser (not shown) to emit laser light 46, thereby starting exposure. In synchronism with the exposure operation, the resist roller 50 is driven, and the recording medium is fed toward a photosensitive drum 41. A developing unit 43 develops a latent image formed on the photosensitive drum 41 to form a toner image. The toner image formed on the photosensitive drum 41 is transferred to a recording medium by a transfer roller 44 and is fixed on the recording medium by a fixing roller 48. A charge roller 42 uniformly charges the photosensitive drum 41. A cleaner 45 removes a toner left on the photosensitive drum 41. A polygonal mirror 47 scans the laser light 46 in a direction perpendicular to the drawing surface.

In the conventional arrangement, however, a series of recording operations are performed after the signal $\overline{PRINT}$ becomes true or ON. Even if a command signal representing resolution switching is received during the recording operation, processing represented by the command signal cannot be performed on the recording medium fed in response to the signal $\overline{PRINT}$. That is, since the start of recording is designated by only the signal $\overline{PRINT}$, the command signal received upon reception of the signal $\overline{PRINT}$ is neglected or becomes effective for printing the next page. The command effective for the already fed recording medium upon reception of the signal $\overline{PRINT}$ represents cancellation of printing which is realized by not holding the signal $\overline{PRINT}$ until the trailing end of the signal $\overline{VSYNC}$.

In the conventional technique, as described above, a recording mode of the already fed recording medium by the user cannot be changed upon start of the paper feed operation. A recording mode must be determined prior to generation of the signal $\overline{PRINT}$. In addition, even in the print cancellation represented by the command effective upon generation of the signal $\overline{PRINT}$, the print enable state cannot be effective unless the fed recording medium is discharged. A throughput is undesirably decreased, and the recording medium is wastefully discharged.

This problem typically occurs in an image forming apparatus having a spare paper feed function proposed in U.S. patent application Ser. No. 558,322 filed by the present applicant due to the following reason. For example, even if a command for selecting one of a plurality of paper feed entrances is output after the start of spare paper feeding, it is neglected or becomes effective in feeding of the next sheet. That is, the user must enter a command for determining a recording mode prior to the start of spare paper feeding to the image forming apparatus.

The image forming apparatus having the spare paper feed function will be described below. In an image forming apparatus of this type, for example, the printer controller 100 outputs a spare paper feed request signal for informing spare paper feeding to the printer engine control unit 101 prior to the end of image development of one page. When the printer engine control unit 101 receives the spare paper feed request signal, the control unit 101 controls a paper feed control unit 105 to stop, e.g., a recording medium in a state wherein it abuts against the resist roller 50. The printer engine control unit 101 waits for a print request signal from the printer controller 100. The following operations are the same as described above.

An abnormal event handle unit 111 monitors a state of the inside of the printer and alarms an abnormal event to the printer engine control unit 101 when the abnormal event which causes failure of normal print processing occurs.

In the conventional arrangement, the abnormal event handle unit 111 does not distinguish abnormal event handling for an abnormal event occurring during printing while a print request signal is received from the printer controller 100 from abnormal even handling for an abnormal event during paper feeding upon reception of a spare paper feed request. Therefore, the abnormal event handle unit 111 performs single processing.

Conventional processing performed upon occurrence of an abnormal event for removing a paper feed cassette 13 (FIG. 1) will be described with reference to flow charts in FIGS. 4 to 6.

Upon reception of a print request from the printer controller 100, the paper sheet is fed to the resist roller 50 by driving of the paper feed roller. At this time, a vertical sync request signal is output to the printer controller 100. Upon reception of the vertical sync signal from the printer controller 100, an image data output instruction is output to an image control unit 103. At the same time, a timer for measuring a paper feed timing of the next page is started. When the time set in the timer has elapsed and if a print request for the next page is not present, the in-print sheet is discharged and the feed system is stopped. However, if the print request is present, a paper feed instruction for the next page is output. At this time, although the presence/absence of the paper feed cassette is always checked, the paper sheet is not fed and stopped upon reception of the print request in abnormal event handling. That is, assume that a spare paper is fed upon reception of a spare paper feed request, that the paper sheet is fed to a predetermined position, i.e., the resist position, and that the apparatus waits for a print request. Under these conditions, when the cassette is temporarily removed and a print request is received after the cassette is then mounted again, the normal vertical sync request is output because the cassette is present at this time. Upon reception of the vertical sync signal, an image data output instruction is output.

In the conventional arrangement described above, no-paper processing upon reception of a print request is the same as no-paper processing upon reception of a spare paper feed request. For this reason, even if the paper feed cassette is removed in a print request wait state once a spare paper feed operation is performed and when the paper feed cassette is mounted again, the vertical sync request is output in response to a print request even under the conditions wherein the spare paper sheet is removed and an abnormal event occurs. Upon reception of the vertical sync signal, image data output is undesirably started. The transfer roller is directly transferred with a toner image. As a result, the lower surface of the sheet is contaminated. In addition, for example, even if the trailing end of the recording medium is torn, it is undesirably output as a normal printed sheet.

The sheet in spare paper feeding receives a deformation force by a loop, a nip of the resist roller 50, and a pressure of the paper feed roller 49.

In recent years, a time required for image development tends to be prolonged along with complication of a recording image. In addition, since the recording medium is exemplified by a thin sheet such as normal paper, intermediate sensitized paper, an OHP film, synthetic paper, or an envelope, when the thin sheet is left in the printer in this state for a long period of time, it is locally warped (curled).

The curled portion is not properly brought into contact with the photosensitive drum during image transfer, thus causing a transfer error. More specifically, a white omission occurs because the toner is not locally transferred to the sheet. In addition, since the image is transferred to the sheet while it is not properly brought into contact, image blurring occurs, thereby degrading recording image quality.

The following problem occurs in an image forming apparatus having a spare paper feed function when one of a plurality of paper feed means is designated to feed a recording medium.

FIG. 7 shows a schematic arrangement of a laser beam printer having a plurality of paper feed means.

An electrophotographic photosensitive drum 1 is rotated at a predetermined peripheral velocity (process speed) clockwise, i.e., a direction indicated by an arrow.

The photosensitive drum 1 is uniformly charged to a predetermined polarity at a predetermined potential by a charge roller serving as a charging means during rotation.

The charged surface of the photosensitive drum 1 receives laser beam scanning exposure light L (image write) by a laser scanner 5 which includes a laser oscillator, a polygonal scanner, and an optical element and which outputs a laser beam modulated in correspondence with a target time-series electrical digital pixels signal input from a host apparatus (not shown) such as a computer or a wordprocessor to a controller (not shown). A latent image corresponding to the target image information is formed on the circumferential surface of the photosensitive drum 1.

The latent image on the drum surface is visualized by a developing unit 3 into a toner image. The toner image reaches a transfer portion B as an opposite portion between a transfer roller 4 and the drum 1 during rotation of the drum 1. The toner image is continuously transferred from the photosensitive drum 1 to a recording sheet fed from a sheet material feed unit (to be described later) to the transfer portion B at a predetermined timing determined by a resist roller 9.

The recording sheet to which the toner image is transferred is separated from the surface of the photosensitive drum 1 and is fed to a fixer 12. The image is fixed on the sheet, and the sheet as an image formation product (print) $S_4$ is discharged to a paper discharge tray 20 by a paper discharge roller 19.

The surface of the drum 1 which passed the transfer portion B is subjected to removal or cleaning of a residual pile such as a residual toner by a cleaner 6 and is repeatedly used for image formation.

The sheet material feed units are constituted by the following three paper feed means:

a. a cassette type middle automatic paper feed unit 31 (first paper feed means) for feeding each sheet;

b. a cassette type lower automatic paper feed unit 32 (second paper feed means) for feeding each sheet; and c. a manual paper feed type upper paper feed unit 33 (third paper feed means).

When a printer engine (not shown) receives a print signal from a controller, the printer engine operates a preselected one of the three paper feed means 31 to 33 to feed a sheet. More specifically, (1) When the first paper feed unit 31 is selected and designated, a paper feed roller $7_1$ of the first paper feed means is rotated and driven to feed one of recording sheets $S_1$ stacked in the paper feed cassette of the first paper feed means. The fed paper sheet passes through a separate sheet path $P_1$ of the first paper feed means 31 and enters into a common sheet path $P_4$ connected to the transfer portion B.

The resist roller 9 is disposed in the common sheet path $P_4$. A resist sensor 10 is arranged in front of the resist roller 9 to detect the leading end of the recording sheet as a fed sheet material.

The leading end of the recording sheet $S_1$ entering into the common sheet path $P_4$ is detected by the resist sensor 10. At this moment, the leading end abuts against the nip portion of the roller pair as the resist roller 9 which is stopped.

Feeding of the recording sheet $S_1$ by the paper feed roller $7_1$ is performed as follows. When the leading end abuts against the resist roller 9 after the leading end of the recording sheet is detected by the resist sensor 10, the sheet is temporarily stopped when a period of time for forming a predetermined loop of the recording sheet has elapsed. A vertical sync request signal is transmitted to the controller, and reception of the vertical sync signal is awaited.

Upon formation of the loop of the fed recording sheet, the leading end of the recording sheet entirely abuts against the nip line of the roller pair as the resist roller 9 to eliminate ramp of the recording sheet and perform matching of the resist portion. Upon reception of the vertical sync signal from the controller after the paper feeding is temporarily stopped, image writing on the photosensitive drum 1 is allowed, and at the same time, the resist roller 9 is rotated and driven.

Upon rotation and driving of the resist roller 9, feeding of the recording sheet $S_1$ temporarily stopped at the roller 9 is started again. The sheet passes through the common sheet path $P_4$ and reaches the transfer portion B. When the leading end of the recording sheet reaches the transfer portion B, the leading end of the toner image formed on the surface of the photosensitive drum 1 also reaches the transfer portion B, so that the toner image surface of the photosensitive drum 1 matches with the recording sheet surface, and image transfer is performed.

(2) When the second paper feed means 32 is selected and designated, a paper feed roller $7_2$ of the second paper feed means is rotated and driven to feed one recording sheet $S_2$ from the paper feed cassette of the second paper feed means 32. The fed paper sheet passes through a separate sheet path $P_2$ of the second paper feed means 32 and enters into the common sheet path $P_4$ connected to the transfer portion B.

The same paper feed operations as in the recording sheet $S_1$ of (1) are performed, and the sheet is synchronously fed to the transfer portion B by the resist roller 9.

(3) When the third paper feed means 33 is selected and designated, a paper feed roller $7_3$ is rotated and driven to feed a recording sheet $S_3$ placed on a manual feed tray of the third paper feed means 33. The sheet passes through a separate path $P_3$ of the third paper feed means 33 and enters into the common sheet path $P_4$ connected to the transfer portion B.

The same paper feed operations as in the paper sheet $S_1$ of (1) are performed, and the sheet is synchronously fed to the transfer portion B by the resist roller 9.

A point A is defined as a merge point between the separate sheet paths $P_1$ to $P_3$ of the first to third paper fed means 31 to 33 and the common sheet path $P_4$. In the third paper feed means 33, a sensor 8 is arranged to detect the presence/absence of the recording sheet $S_3$ set on the manual feed tray.

In the above printer, for example, if a sheet path length from the paper feed position (i.e., a position of the leading end of the recording sheet in each cassette) to the resist roller 9 is large, printing of the next page must be started during write access of the previous image to obtain a maximum throughput. For this reason, the recording sheet $S_2$ must be fed from the paper feed position to the predetermined position in advance (spare sheet feeding).

In the conventional apparatus described above, however, when the plurality of paper feed means are provided, and when paper feeding from another paper feed means except for the currently selected paper feed means is designated from the controller while the paper is subjected to spare sheet feeding from the preselected paper feed means and is stopped, the sheet in spare paper feeding at the merge point of the separate sheet paths of the respective paper feed means is present and blocks the feed path, thereby disabling paper feeding from a paper feed means except for the preselected paper feed means.

SUMMARY OF THE INVENTION

It is an object of the present invention to solve the conventional problems described above.

It is another object of the present invention to improve an image forming apparatus having a spare paper feed function.

It is still another object of the present invention to provide an image forming apparatus capable of performing different operations in response to a specific command signal in accordance with operating modes of the apparatus and capable of improving operability.

According to the present invention, when the image forming apparatus is set in a predetermined operation mode, the specific command signal is enabled to perform control corresponding to the operating state, thereby maximizing the function of the image forming apparatus.

The predetermined operation mode is, e.g., a spare paper feed state (i.e., from reception of a spare paper feed signal to the start of image formation by a recording request signal).

When the specific command signal is a paper refeed command signal, the recording medium in spare paper feeding is automatically discharged, and a sheet is fed again from a paper feed entrance which is newly designated. Even if the recording sheet is fed by the spare paper feed signal, a change in paper feed entrance can be facilitated.

Even if the specific command signal is a paper discharge port designation command or a resolution switching command, the change in paper discharge port or resolution can be facilitated even if the recording medium in spare paper feeding is already present as described above.

When the specific command signal is a paper feed entrance designation command for the spare paper feed signal and the paper feed entrance designation command is changed during spare paper feed control, the recording medium fed by the spare paper feed signal is invalidated. The paper feed entrance designation command is validated for the recording medium which will be fed by the next spare paper feed signal, thereby facilitating control.

It is still another object of the present invention to provide an image forming apparatus capable for increasing a throughput without causing an increase in cost or degrading recording image quality.

According to the present invention, there is provided a means for measuring a pile-limit time or a spare paper feed stop time in the feed path of the paper sheet in spare paper feeding. When the pile-limit time or the like exceeds one of the plurality of predetermined times, the piled paper is temporarily discharged outside the laser printer. Piling of the paper sheet for a long period of time in spare paper feeding can be prevented, and reliability of image quality can be improved. In addition, although a time for adversely affecting the paper sheet varies depending on the atmosphere in which the paper sheet is placed. An appropriate time can be selected and set according to the present invention.

According to the present invention, an abnormal event treatment for an abnormal event occurring during spare paper feeding by a spare paper feed request, which is different from a treatment of an abnormal event during printing, performed by a normal print request is performed to improve printing quality of the image forming apparatus while all the conventional problems are solved.

According to the present invention, when a spare paper feed operation is to be performed in a sheet material feed unit having a plurality of paper feed means, switching of the paper feed means upon output of a spare paper feed signal can be performed, although this switching cannot be performed in any conventional apparatus, thereby greatly increasing a sheet material feed capacity of the apparatus.

The above and other objects, features, and advantages of the present invention will be apparent from the following detailed description of the preferred embodiments in conjunction with the accompanying drawings.

BRIEF DESCRIPTION OF THE DRAWINGS

FIGS. 4 to 6 are flow charts for explaining operations of an image forming apparatus having a spare paper feed function;

FIGS. 9, 9A–9C form a flow chart for explaining an operation of the laser beam printer shown in FIG. 8;

FIGS. 10 and 11 are timing charts showing the operation of the laser beam printer shown in FIG. 8;

FIG. 12 is a flow chart for explaining command processing when a specific command is a paper refeed command;

FIGS. 26, 26A and 26B form a flow chart for explaining an operation upon reception of a spare paper feed request according to the fifth embodiment;

FIG. 32 is a flow chart for explaining an operation upon reception of a spare paper feed request according to the seventh embodiment of the present invention;

FIGS. 34, 34A and 34B form a flow chart for explaining an operation of an engine control unit 620 of the control system shown in FIG. 33;

FIGS. 37, 37A and 37B form a flow chart for explaining an operation of the laser beam printer shown in FIG. 36;

FIGS. 41, 41A and 41B form a flow chart showing a paper feed sequence including a spare paper feed sequence of a manual paper feed means (third paper feed means);

FIGS. 43, 43A–43C form a flow chart showing a paper feed sequence including a spare paper feed sequence of a paper sheet fed again in a two side print mode.

DETAILED DESCRIPTION OF THE PREFERRED EMBODIMENTS

First Embodiment

The first embodiment will be described with reference to the accompanying drawings.

Figure 8:
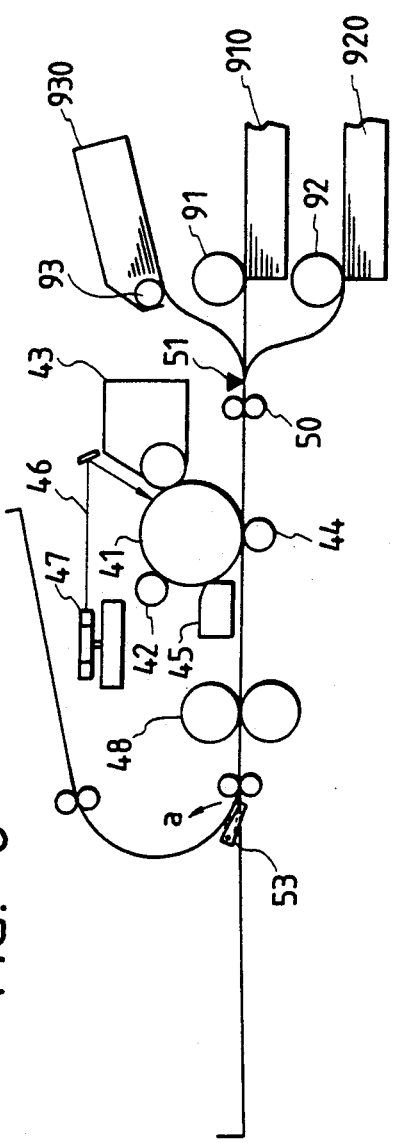
FIG. 8 is a schematic view of a laser beam printer according to the first embodiment of the present invention.

FIG. 8 is a view showing a schematic arrangement of a laser beam printer according to the first embodiment. The same reference numerals as in the conventional techniques (FIGS. 1, 2 and 4 to 6) denote the same parts in FIG. 8, and a detailed description thereof will be omitted. The first embodiment has a plurality (three) of paper feed entrances, and cassettes 910, 920, and 930 can be mounted in correspondence with the respective paper feed entrances. The cassette 930 is an optional cassette for storing recording media such as envelopes and postal cards. An envelope or postal card is fed by a paper feed roller 93. Recording media having desired sizes are stored in the upper and lower cassettes 910 and 920 and are fed by paper feed rollers 91 and 92, respectively. By designating one of the three paper feed entrances, a desired one of the three types of recording media can be selected and is subjected to image recording.

In this embodiment, face-up or face-down paper discharge can be selected. A flapper 53 is arranged to switch a feed path so as to select a desired paper discharge method.

Figure 9B:
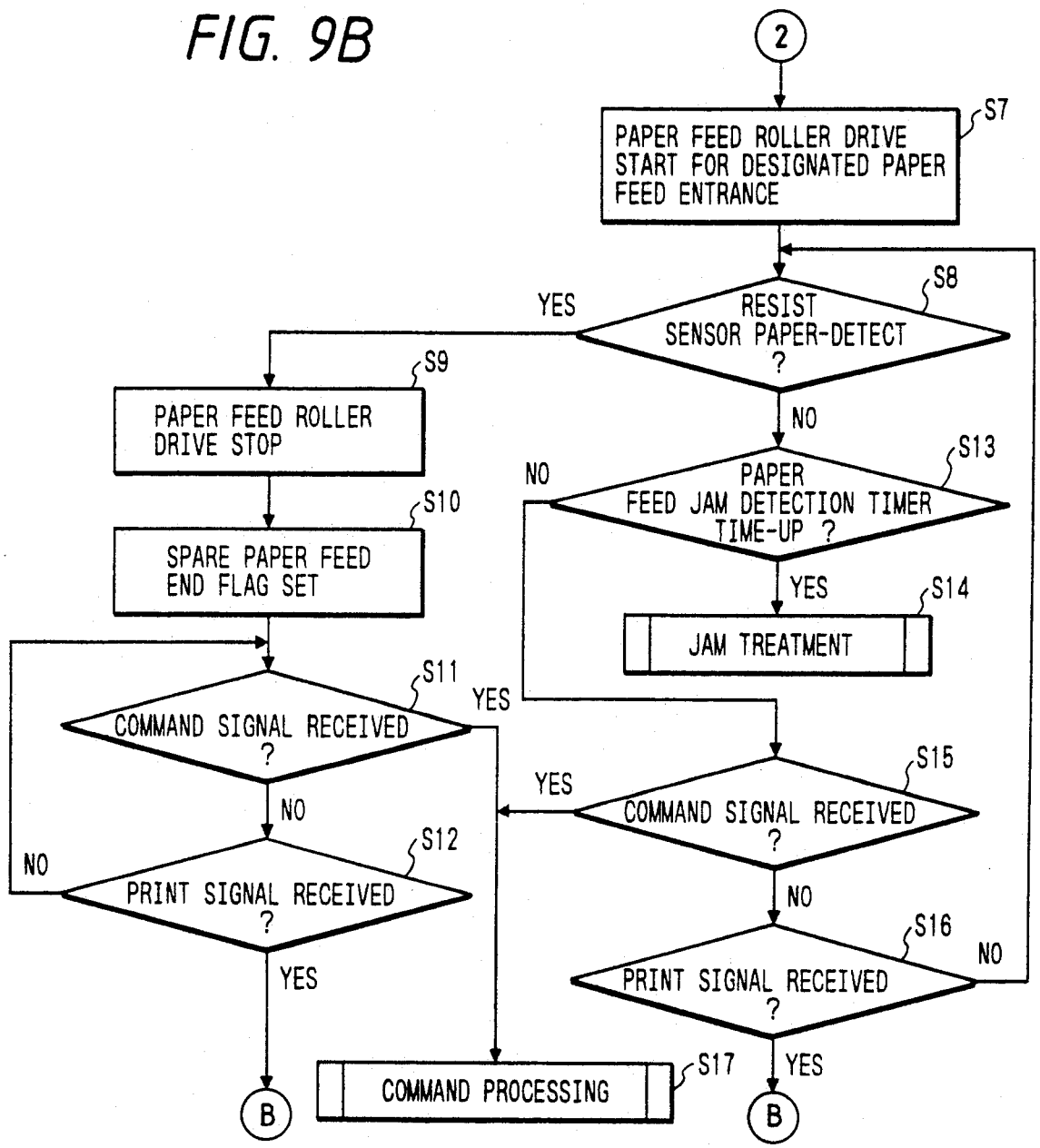

FIG. 9 is a flow chart for explaining an operation of the image forming apparatus (laser beam printer) shown in FIG. 8. FIGS. 10 and 11 are timing charts showing the operation of this image forming apparatus.

Operations of this embodiment will be described below with reference to these drawings.

In this embodiment, a spare paper feed signal is provided in addition to a print signal. The flow advances from step S1 to step S2. When a spare paper feed signal is received prior to reception of a print signal, the flow advances from step S3 to step S4 to feed a recording medium to a preset predetermined position (steps S4 to S8). During feeding of this recording medium (steps S8, S13, and S15) or during stopping of the recording medium (steps S9 to S11), control is performed to validate a predetermined command signal immediately before a recording request signal (print signal) becomes true or enabled (steps S12 and S16). Upon reception of the command signal, processing corresponding to this command signal is performed (step S17).

A time T in FIGS. 10 and 11 is a period for which the predetermined command signal is enabled or validated.

In this embodiment, a timing chart for enabling a scanner motor drive signal upon reception of a print signal is shown in FIG. 10.

As a modification of this embodiment, a timing chart for enabling a scanner motor drive signal upon reception of a spare paper feed signal is shown in FIG. 11.

A time between reception of the print signal and start of image write operation satisfies condition $T_1$ (FIG. 11) $< T_0$ (FIG. 10). In order to increase a throughput, the laser beam printer is arranged to be operated at timings shown in FIG. 11.

Referring to FIGS. 10 and 11, the time T has a value determined by a feed time required to feed a recording medium to the predetermined position, a pre-rotation time of the photosensitive body and the like.

When a print signal is received before the spare paper feed command is received, and when the command signal is not received within the time T, processing in step S18 to S34 is performed.

Command processing in step S17 will be described below.

(1) Specific Command as Paper Refeed Command

A paper refeed command is defined as follows. One of the three paper feed entrances, i.e., the paper feed entrance of the optional feeder (i.e., the feeder for envelopes or postal cards), the upper paper feed entrance, and the lower paper feed entrance is designated. When a recording medium is present at the designated paper feed entrance, auto-discharge is performed for the recording medium already fed in response to the spare paper feed signal, and at the same time, the medium is fed from the designated paper feed entrance.

The auto-discharge is an operation for discharging a recording medium fed in response to a spare paper feed signal to a predetermined discharge port without performing a recording operation. This operation is also performed when jamming processing is released and initial resetting upon power-ON operation is performed in steps S14 and S34.

An operation will be described below with reference to a flow chart in FIG. 12.

When a paper refeed command signal is output from a host computer or the like within the time T, the presence/absence of the recording medium already fed in response to a spare paper feed signal is determined. This determination can be confirmed by an in-feed bit (not shown) or a flag if status information such as a spare paper in-feed bit (not shown) is present.

It is then determined whether a paper sheet is present at the designated paper feed entrance. If no, or a cassette is not mounted, a not-ready signal is output. However, when a recording medium is present, the recording medium fed in response to the spare paper feed signal is automatically discharged, as described above, and a new medium is fed from the designated paper feed entrance. A paper feed entrance is designated, and the flow advances from steps S2 and S3 to steps S4 in FIG. 8 through a connector . In this case, determination in step S3 is made such that a spare paper feed signal has been received. Note that data for designating the paper feed entrance is received together with the paper refeed command.

The above operation is an example, and the following operation may be performed in accordance with another arrangement of the controller. That is, if the paper sizes of the upper and lower cassettes 910 and 920 are equal to each other and when a no-paper state occurs or a no-cassette paper feed entrance is selected, a recording medium can be automatically fed from the other cassette.

Control may be performed to neglect designation of the paper feed entrance of the optional feeder 930 if the optional feeder 930 is not set.

(2) Specific Command as Discharge Port Designation Command

Figure 13:
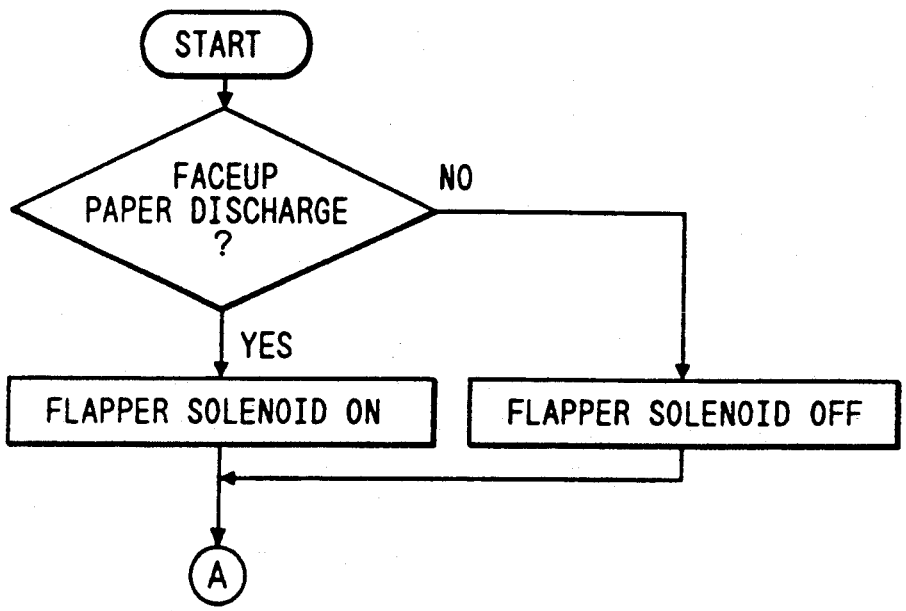
FIG. 13 is a flow chart for explaining command processing when the specific command is a discharge port designation command.

An operation for the specific command as a discharge port designation command is shown in a control flow chart of FIG. 13.

When a discharge port designation command is received to perform face-up paper discharge, a flapper solenoid (not shown) is turned on to move the flapper 53 in a direction indicated by an arrow a.

In this embodiment, the face-up and face-down discharge methods are exemplified. However, this can be true for a plurality of discharge trays.

In addition, when there is provided a plurality of discharge trays and one printer is shared by a plurality of host units, the discharge trays are respectively assigned to the host units. In this case, data processing from the first and second host units can be simultaneously performed by a controller inside the printer. If image development in the second host unit is completed prior to that in the first host unit while a recording medium is fed in spare paper feeding so as to print information on the basis of the data from the first host unit, the discharge port designation command may be transmitted from the controller. When the paper discharge for the second host unit is designated, the print data of the second host is recorded on the recording medium, and this recording medium is discharged onto the discharge tray corresponding to the second host unit. After printing on the basis of the data from the second host unit is started, a print request from the first host is received at a printable timing, and a predetermined print operation is performed.

In this manner, the recording media can be selectively used by the different host units. A command signal can be flexibly input, thereby improving user convenience.

(3) Specific Commane as Paper Feed Designation Command

Figure 14:
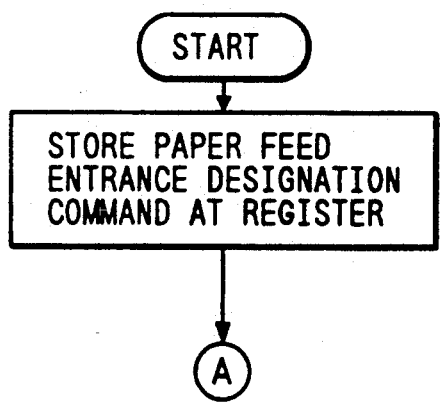
FIG. 14 is a flow chart for explaining command processing when the specific command is a paper feed entrance designation command.

Command processing in this mode is shown in a flow chart of FIG. 14.

In this case, a specific command is a paper feed entrance designation command for a spare paper feed signal. When the paper feed entrance designation command is changed during spare paper feed control, this command is not effected for the recording medium. Image recording of the recording medium is performed on the basis of reception of an image recording request signal. The paper feed entrance designation command received during spare paper feed control of the recording medium of the previous page becomes validated for a spare paper feed signal input upon the start of image recording.

An operation will be described with reference to a flow chart in FIG. 14. More specifically, an operation performed upon paper feed designation for feeding a recording sheet from the lower cassette 920 from the controller with respect to a recording medium (i.e., the recording medium fed from the upper cassette 910) waiting or fed in the spare paper feed control will be described below.

The paper feed entrance designation command is temporarily stored in a paper feed entrance designation command register. In step S2 in FIG. 9, when a print signal as an image recording request signal is received, the temporarily stored paper feed entrance designation command is transferred to a paper feed entrance designation register which is read-accessed to actually feed a recording medium. This register is a paper feed entrance designation register read-accessed at the start of operation in steps S7, S20, and S24 of the flow chart in FIG. 9.

By performing the above operations, after recording is started for the recording medium in spare paper feeding, designation of the paper feed entrance for the next recording medium is assured.

According to this embodiment, by validating the paper refeed command signal for feeding a recording medium from a designated paper feed entrance, the recording medium waiting within the laser printer in spare paper feed control is discharged, and recording is performed on a recording medium fed from any paper feed entrance, thereby providing a new function, improving performance, and simplifying the recording operation.

For example, paper refeed processing of this embodiment is effective when a recording medium is left in the apparatus for a long period of time, when the current recording medium is changed to a new one or a printer is shared, or when the current processing is temporarily interrupted in response to a paper refeed command during prefeed waiting (because a print operation cannot be immediately started due to a time required for image development or the like) and processing of a new host unit is preferentially performed.

According to this embodiment, the discharge port designation command for designating a discharge port allows to add a new function and improve performance.

For example, since a change in discharge port can be freely performed even during prefeed waiting, it is effective to set an operation state set by image development of a long period of time.

As in the case wherein the printer is shared, since a change in discharge port corresponding to a host computer can be easily performed, when processing for the first host unit is prolonged, the data from the second host unit is printed on the recording sheet in spare paper feeding and this paper sheet is discharged to a specific discharge port. Thereafter, the discharge port for the first host is set again, and a recording paper is fed in spare paper feeding.

When the specific command is a paper feed entrance designation command for the spare paper feed signal, since the recording medium in spare paper feeding is preferentially fed, i.e., since printing is intentionally performed for spare paper feeding, unnecessary operations are omitted due to spare paper feeding as the first priority, thereby simplifying the function.

As a result, interruptions from other host units are not accepted, and a throughput can be increased.

Second Embodiment

The second embodiment of the present invention will be described below.

Figure 15:
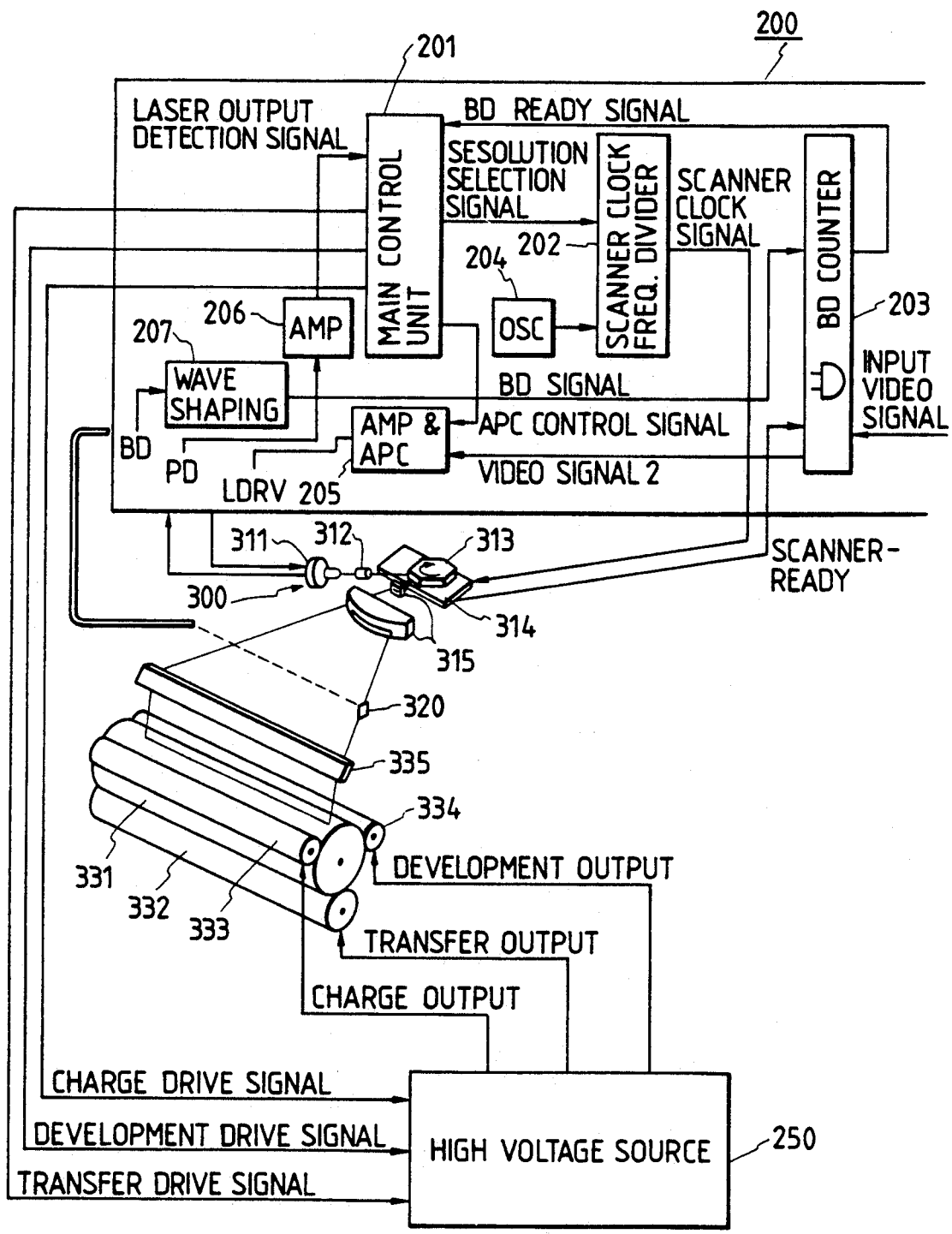
FIG. 15 is a view showing a structural concept of a laser beam printer according to the second embodiment.

FIG. 15 is a view showing a basic arrangement of a recording unit of an electrophotographic laser beam printer (to be referred to as an LBP hereinafter) using laser light as an exposing means.

Referring to FIG. 15, the LBP comprises a controller unit 200, a high voltage source 250, a laser unit 300, a collimator lens 311, a cylindrical lens 312, a polygonal mirror 313 consisting of a hexahedral mirror, a scanner motor 314 for rotating the polygonal mirror 313, a focusing lens 314, a BD mirror 320, a photosensitive drum 331, a transfer roller 332, a charge roller 333, a development cylinder 334, and a reflecting mirror 335.

The controller unit 200 includes a main control unit 201, a scanner clock frequency-divider 202 for controlling a rotation number of the scanner motor 314 in response to a resolution selection signal, a BD counter 203, an oscillator 204, a laser driver and amplifier 205 for amplifying an APC control signal and a video signal to emit a laser beam, an amplifier 206 for amplifying a PD signal upon laser emission, and a wave shaping circuit 207 for forming a waveform of the BD signal.

Figure 16:
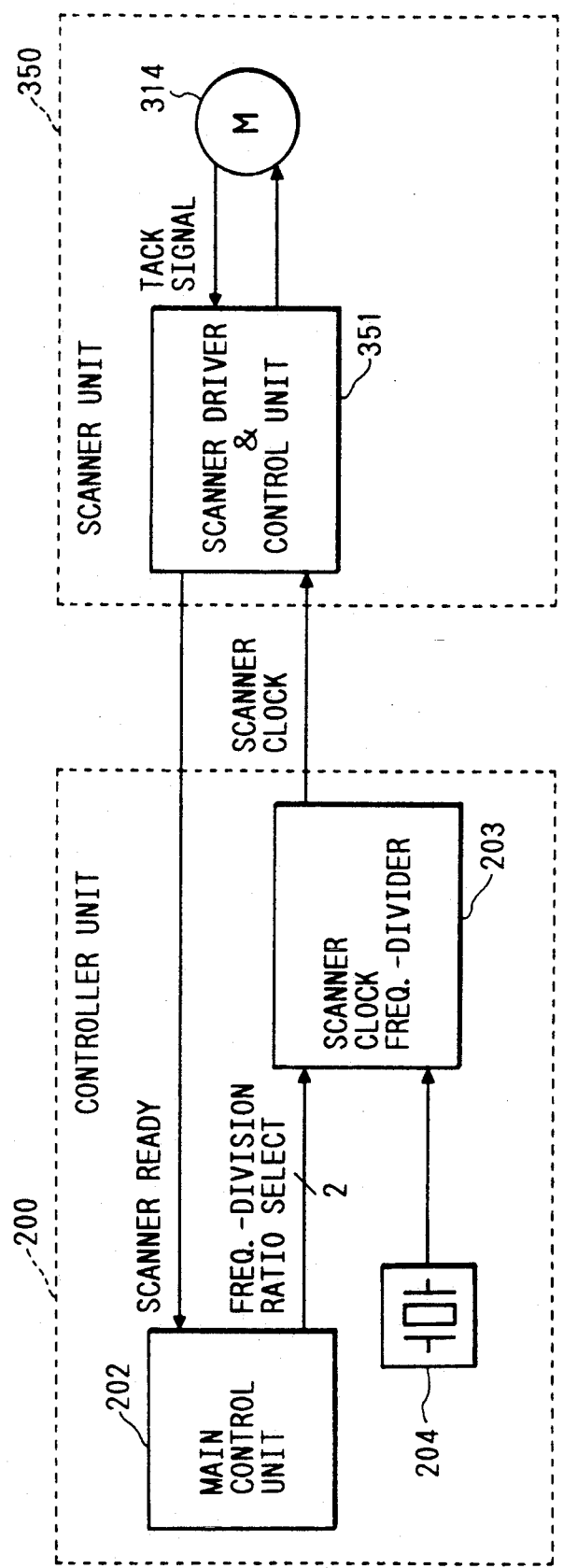
FIG. 16 is a view showing a relationship between a controller unit 200 and a scanner unit shown in FIG. 15.

A detailed relationship between the controller unit 200 and the scanner unit in FIG. 15 is shown in FIG. 16. The same reference numerals as in FIG. 15 denote the same parts in FIG. 16, and a detailed description thereof will be omitted.

Referring to FIG. 16, a scanner unit 350 has a scanner driver and control unit 351.

A scanner clock frequency-divider 202 in the controller unit 200 frequency-divides a reference signal from the oscillator 204 of, e.g., a quartz oscillator in accordance with a frequency-division ratio select signal to generate a scanner clock signal. The scanner clock signal is output to the scanner unit 350. In this embodiment, the frequency-division ratio select signal is a 2-bit signal which can output a maximum of four rotation number switching signals. The number of rotation numbers is not limited to four. If a frequency-division ratio select signal has three or more bits, any rotation number can be selected, and recording outputs at many resolutions can be obtained, as a matter of course.

In the scanner driver & control unit 351, the scanner motor 314 is rotated by the rotation number corresponding to the scanner clock signal from the scanner clock frequency-divider 202. The scanner clock signal is compared with a tack signal generated upon rotation of the scanner motor 314 as a reference signal of a phased locked loop (PLL). Rotation of the scanner motor 314 is controlled so that the scanner clock signal coincides with the tack signal. As a result, constant speed rotation control of the scanner motor 314 can be performed so as to correspond to a desired resolution.

Control of the operation of this embodiment having the above arrangement will be described below. Control timings of the embodiment is shown in a timing chart of FIG. 17.

The LBP of this embodiment is arranged to variably control the rotation speed of the scanner motor 314 in accordance with a desired resolution, so that a resolution (recording density) can be arbitrarily set. For example, switching between resolutions of 240 dpi and 300 dpi and of 300 dpi and 400 dip, and the like can be performed by the single laser beam printer.

When a new resolution is input from an external control unit (not shown) or an operation panel during rotation of the scanner motor 314, the main control unit 201 outputs a corresponding resolution switching signal to the scanner clock frequency-divider 202 in accordance with a set input. The scanner clock frequency-divider 202 changes a scanner clock signal, thereby changing the rotation number of the scanner motor 314. At the same time, a scanner ready signal representing constant speed rotation of the scanner motor 314 is set to be false (not-ready). In addition, at this time, a laser output is inhibited, a BD signal is no detected because the rotation number of the scanner motor 314 is being changed. A BD not-ready state is set, and the LBP apparatus of this embodiment becomes a not-ready state as a whole. A printer ready signal becomes false. At the same time, an input video signal from an external control unit or the like is masked by an AND gate (not shown) in the BD counter 203, thereby generating a laser diode enable signal.

Meanwhile, since image formation prior to the change in resolution is completed, a development/transfer output is set in an OFF state. However, since the development/transfer system of this embodiment employs an image formation process by roller charge/transfer, especially, a voltage of several hundreds of negative volts to about −1 kV (−1 kV in this embodiment) is applied to the transfer roller, so that the toner attracted to the transfer roller can be transferred to the drum even if the development/transfer output is set in the OFF state.

The scanner driver & control unit 351 changes the rotation number of the scanner motor 314 in accordance with the scanner clock signal and performs rotation control so as to obtain a predetermined rotation number specified by the resolution switching signal (i.e., the frequency-division ratio select signal). When a desired constant speed state is obtained, the scanner ready signal becomes "1" (ready).

Upon reception of the scanner ready signal of "1", the main control unit 201 disables at least the development output (or the main control unit 201 confirms that the development output is OFF), and the following control is performed for the transfer output.

As in the transfer output, a cleaning sequence of about several hundreds of negative volts to −1 kV continues.

A predetermined positive bias voltage having a magnitude smaller than that of the normal transfer output is applied. This is a very effective means for erasing a trace of a recording medium. An impedance between the photosensitive drum 331 and the transfer roller 332 in the presence of the recording medium is set to be equal to that in the absence of the recording medium. This bias voltage $V_{t0}$ is determined by an LBP arrangement. In this embodiment, the bias voltage $V_{t0}$ is set to be about 2 kV, which is half of the normal transfer output. The voltage value is not limited to this voltage value, and varies depending on the ambient conditions, and especially humidity and properties of the recording medium. An optimal value is preferably set using these values as parameters. For example, the bias voltage can be automatically adjusted to a desired transfer voltage value on the basis of humidity information. Special paper by manual feeding can be used as a recording medium. In this case, automatic adjustment can be similarly performed by sending recording medium information through an operation panel or a host computer.

After the transfer output is set, a laser diode enable output is set to be active.

The amplifier 205 is biased to obtain a BD signal serving as a horizontal sync signal to turn on a laser. As a result, laser light is guided from the BD mirror 320 to a BD detector through an optical fiber and is sent to the BD counter 203 by forming a waveform by the wave shaping circuit 207, thereby detecting the BD signal. Upon detection of the BD signal, in order to determine a BD period, exposure is performed until the periods are counted by at least two lines (two main scanning cycles). As a result, laser light is emitted on an image area of the photosensitive drum 331.

As described above, at this time, the development output is OFF, and a latent image is not formed on the photosensitive drum 331. In this embodiment, a sequence for clearing the transfer output is executed, and a toner tends not to be transferred to the transfer roller.

A clean state can always be maintained.

Figure 17:
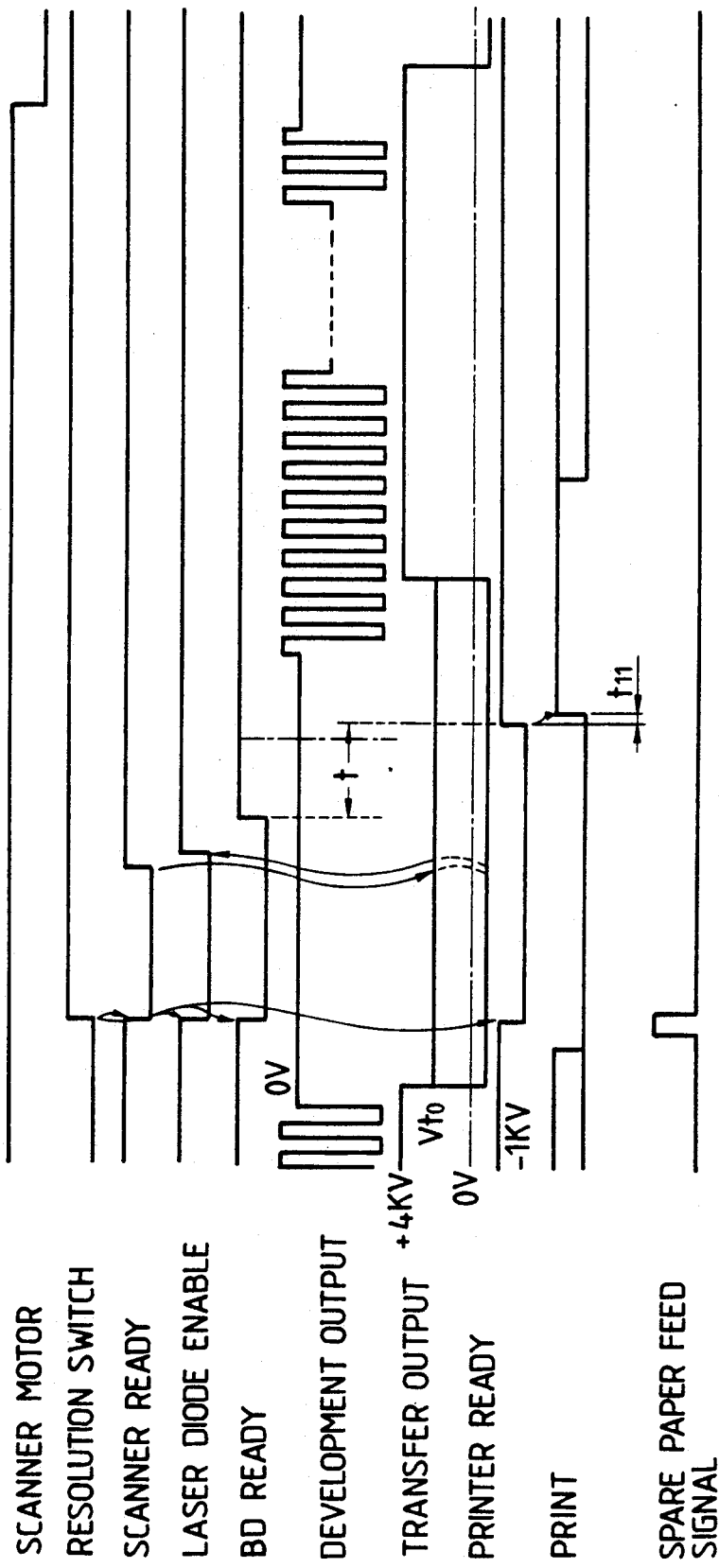
FIG. 17 is a timing chart showing an operation of the laser beam printer shown in FIG. 15.

A time t in FIG. 17 is a sum of a time interval between time when a laser beam is radiated on the photosensitive drum 331 and time when a BD sync signal is enabled, and a time interval between time when a latent image formed within the enable time of the BD sync signal passes through a transfer contact point with the transfer roller 332 and time when the transfer roller 332 is rotated at least one revolution.

Figure 18:
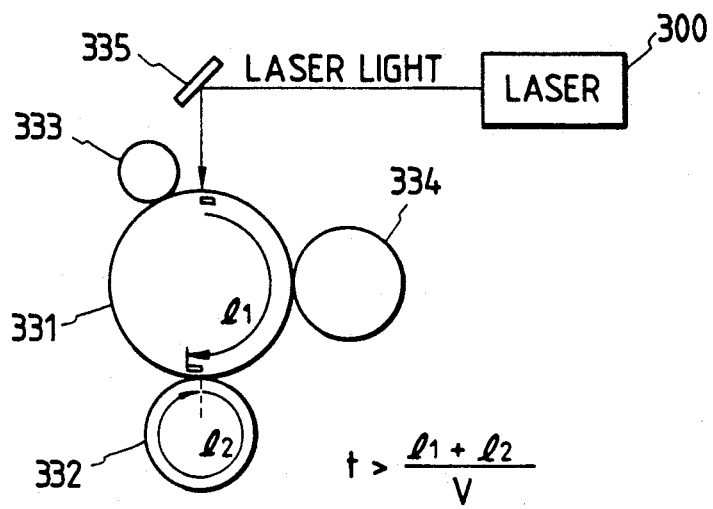
FIG. 18 is a view for explaining operations of the respective parts near a transfer roller 332.

The relationship between the respective components within the time t as the sum of the time interval between time when a laser beam is radiated on the photosensitive drum 331 and time when a BC sync signal is enabled, and the time interval between time when a latent image formed within the enable time of the BD sync signal passes through the transfer contact point with the transfer roller 332 and time when the transfer roller 332 is rotated at least one revolution is shown in FIG. 18.

When the time t has elapsed after the BD ready state, the printer ready signal is set at "1", thereby obtaining a printer ready state.

A normal print sequence is started again in response to an external print signal.

As a result, when the print signal is received immediately after the printer ready state is set, the recording medium stopped at the resist roller starts recording at the changed resolution. This relationship is shown in a timing chart of FIG. 17.

In this embodiment, a time interval $t_{11}$ is a very short time interval. When a controller image development is prolonged, this time is prolonged accordingly. That is, the time $t_{11}$ varies depending on the image development time.

When the recording medium fed in the spare paper feed signal receives a resolution switching signal during feeding, and when the recording medium reaches the predetermined position upon a lapse of the time t after setting of the BD ready state, the same operation as in the stop state can be performed.

If the recording medium does not reach the predetermined position (normal feeding without jamming), an additional time is added to the time t.

Third Embodiment

In this embodiment, processing for an abnormal event generated until an end of vertical synchronization of a recording sheet in spare paper feeding is performed by processing different from an abnormal event treatment executed upon reception of a normal print request. A cassette during spare paper feeding is removed, and the sheet is discharged, thereby performing appropriate processing for an abnormal event such as discharge of a sheet or a scanner failure in accordance with a printer state.

An operation for performing an abnormal event treatment performed when a paper cassette is removed upon reception of a spare paper feed request is performed differently before and after reception of a print request will be described below.

Figure 19:
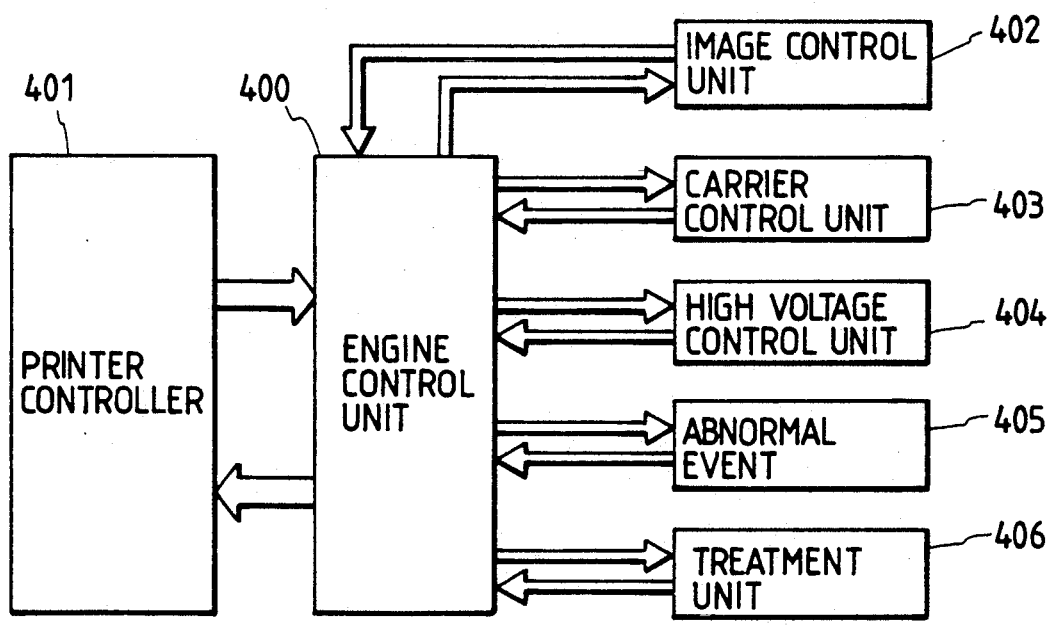
FIG. 19 is a block diagram showing an arrangement of a control system according to the third embodiment of the present invention.

An arrangement of the image forming apparatus of this embodiment is the same as that of the conventional example (FIG. 1), and a detailed description thereof will be omitted. A control system of the image forming apparatus of this embodiment is shown in FIG. 19.

An engine control unit 400 performs exchange of a command/status signal with a printer controller 401, exchange of a vertical sync request/vertical sync signal, reception of image data, and output of a horizontal sync signal. At the same time, the engine control unit 400 performs control of the respective parts of the engine. An image control unit 402 executes driving/stopping of a semiconductor laser and a polygonal scanner on the basis of an instruction from the engine control unit 400. A carrier control unit 403 feeds a sheet and drives/stops the resist roller for vertical synchronization. When the engine control unit 400 receives a spare paper feed request, the carrier control unit 403 also performs spare paper feed control on the basis of an instruction from the engine control unit 400. The high voltage control unit 404 outputs high charge, development and transfer voltages having predetermined values at timings instructed by the engine control unit 400.

The abnormal event treatment unit 405 performs a treatment for an abnormal event occurring during a standby state or during printing upon reception of the print request. An abnormal event treatment unit 406 feeds a sheet to a predetermined position and stops it upon reception of a spare paper feed request, and performs an abnormal event treatment for an abnormal event occurring until reception of a vertical sync signal upon reception of a print request. The abnormal event treatment unit 406 performs processing different from that of the abnormal event treatment unit 405. Actual control will be described with reference to flow charts of FIGS. 20 and 21.

Figure 20:
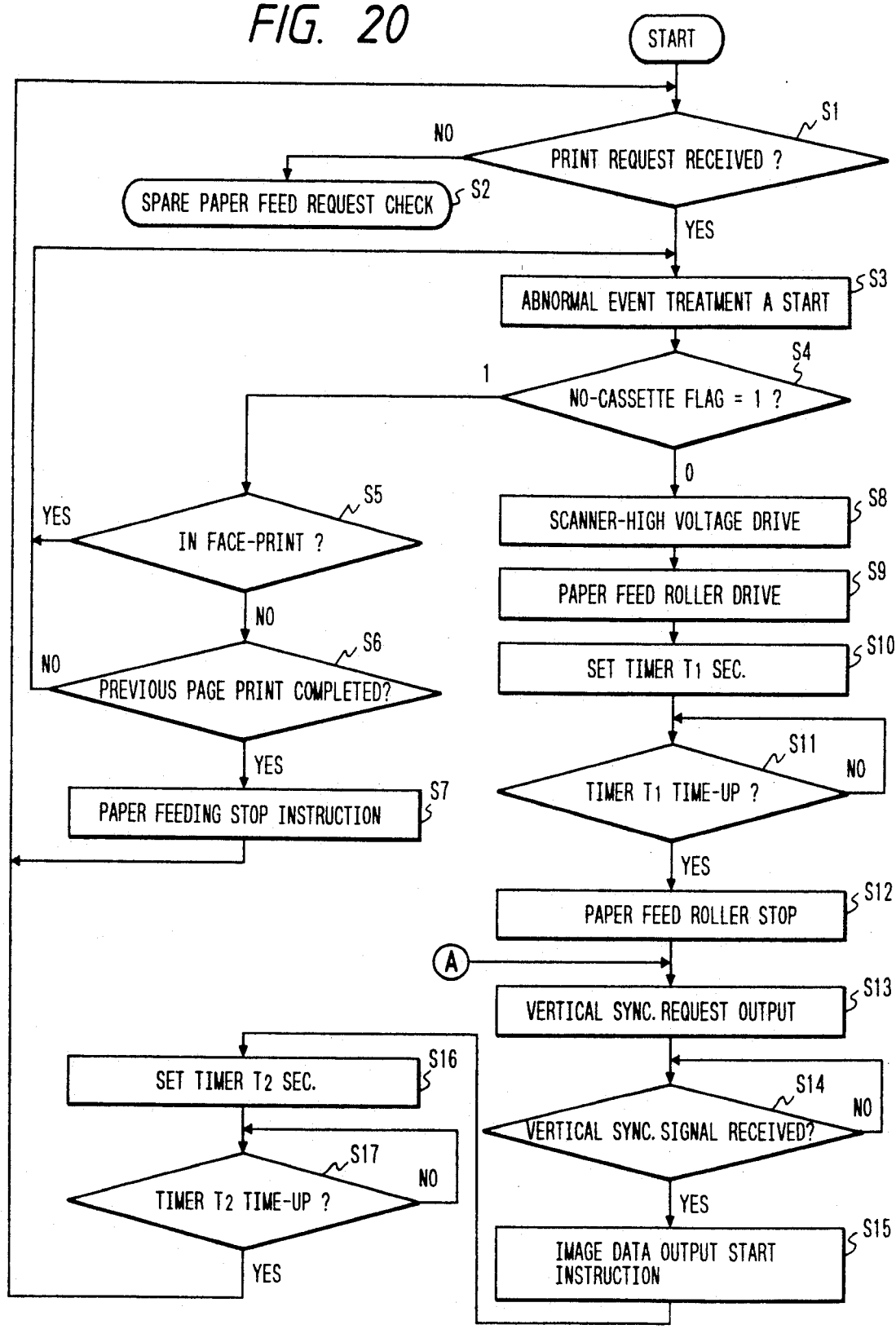
FIG. 20 is a flow chart for explaining an operation upon reception of a print request without receiving a spare paper feed request according to the fourth embodiment.
Figure 21:
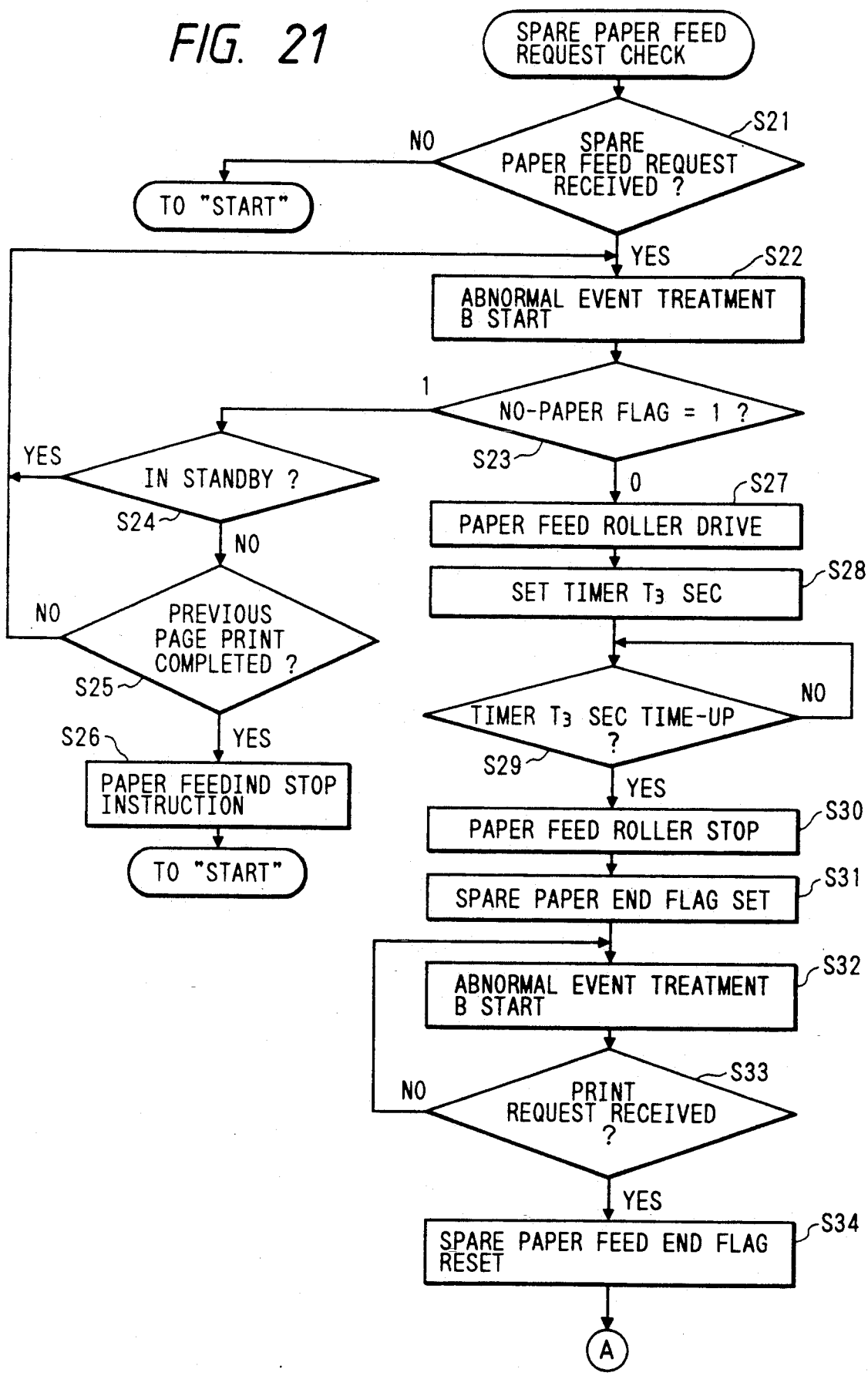
FIG. 21 is a flow chart for explaining an operation performed when a spare paper feed request is received according to the fourth embodiment.
Figure 22:
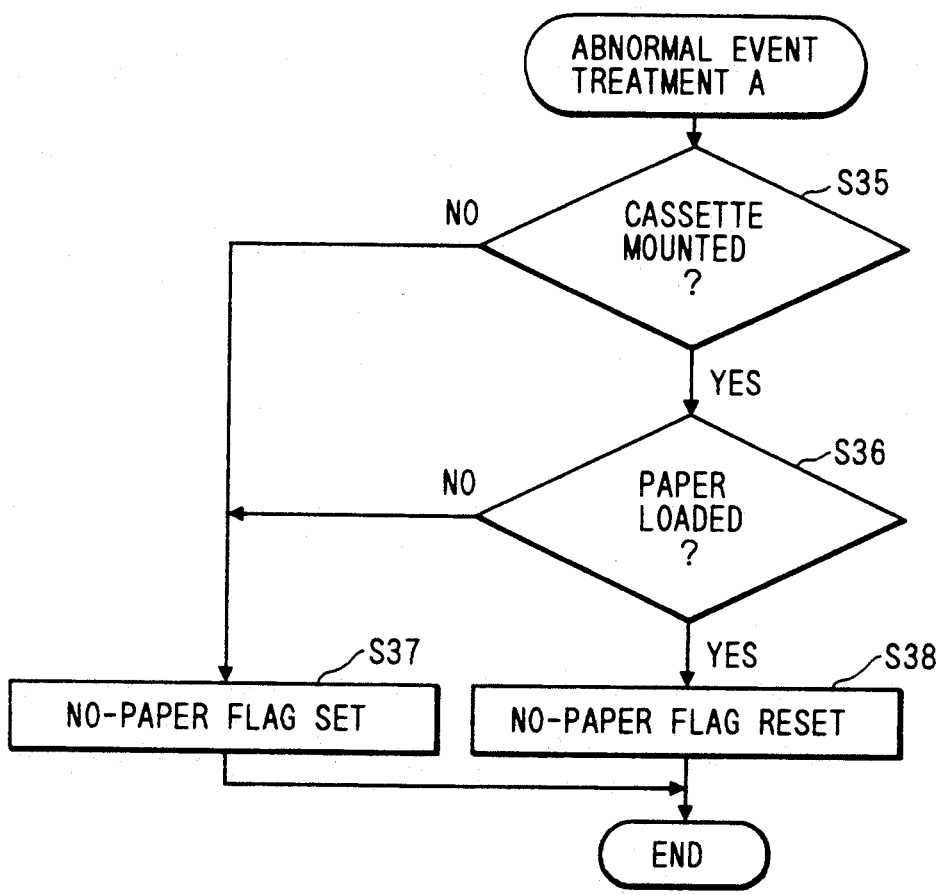
FIG. 22 is a flow chart for explaining an operation of an abnormal event treatment task A according to the fourth embodiment.

FIG. 20 is the flow chart of an operation performed upon reception of a predetermined signal such as a normal print request to cause a predetermined operation such as normal printing. It is determined whether a print request is received (step S1). If NO in step S1, reception of a control command such as a spare paper feed request in FIG. 21 is checked (step S2). If YES in step S1, the abnormal event treatment unit 405 performs a processing operation such as a control task A (step S3). As shown in FIG. 22, in the abnormal event treatment task A, the mounting/non-mounting of the cassette is checked (step S35), and the presence/absence of the sheet is checked (step S36). When a paper cassette is not mounted in the printer or a sheet is not present in the paper cassette, a no-paper flag is set (step S37). When the cassette is mounted and sheets are present, the no-paper flag is reset (step S38). When the no-paper flag is set by this processing, the flow advances from step S4 to step S5 in FIG. 20. When first printing is not performed, the print end state of the previous page is checked (step S6). Otherwise, paper feeding is stopped (step S7). The abnormal event treatment task A is started again if first printing is being performed. If the printing of the previous page is not completed in step S6, the abnormal event treatment task A is started again.

If the no-paper flag is reset in step S4, the scanner is started and the voltage is raised to a high voltage to start paper feeding (steps S8 and S9). When a predetermined period of time $T_1$ (sec) has elapsed after paper feeding is started (steps S10 and S11), the paper feed roller is stopped, and a vertical sync request is output to the controller (step S13). Upon reception of the vertical sync signal (step S14), the start of image data output is instructed (step S15), and a paper feed timing of the next page is set by a timer $T_2$ (sec). When $T_2$ has elapsed, the next print request check is started (steps S16 and S17).

Figure 23:
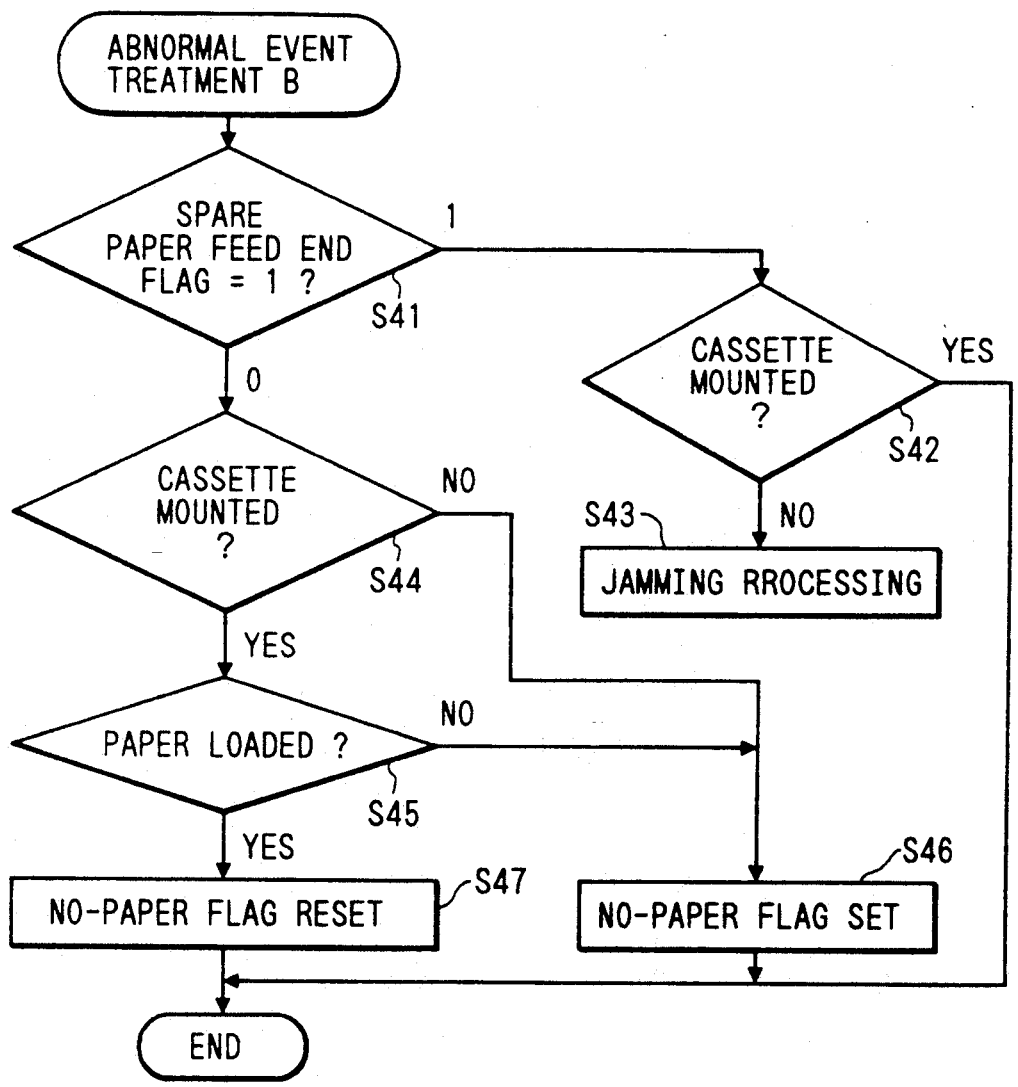
FIG. 23 is a flow chart for explaining an operation of an abnormal event treatment task B according to the fourth embodiment.

When a spare paper feed request is received prior to reception of a print request (step S21 in FIG. 21), another processing operation such as abnormal event treatment task B is started (step S22). In the abnormal event treatment task B, as shown in FIG. 23, when a spare paper feed end flag is not set (step S41), the no-paper flag is set or reset (steps S46 and S47) in accordance with mounting/non-mounting of the cassette and the presence/absence of the paper sheet (steps S44 and S45). When the no-paper flag is set at this moment, the flow advances from step S23 to step S24 of FIG. 21. If a standby state is detected, the abnormal event treatment task B is executed again. Otherwise, paper feeding is stopped or the abnormal event treatment task B is performed again in accordance with the print end state of the previous page (step S25).

When the no-paper flag is not set in step S23, the paper feed roller is driven (step S27). When a time $T_3$ (sec) required for feeding the paper sheet to the predetermined position has elapsed (steps S28 and S29), the paper feed roller is stopped (step S30). The spare paper feed end flag is set (step S31), and the abnormal event treatment task B is started. In this abnormal event treatment task B, the flow advances from step S41 to step S42 of FIG. 23. Mounting/non-mounting of the cassette is checked. If a no-cassette state is determined, jamming processing is performed (step S43). Otherwise, normal processing is restored. Reception of a print request is awaited, and the abnormal event treatment task B is kept started. Upon reception of a print request, the spare paper feed end flag is reset (step S34), and the flow returns to step S13 of FIG. 20 through a connector According to this processing, when normal printing is performed without performing spare paper feeding, the no-paper state is set because of removal of the cassette, and paper feeding is not performed so that the standby state is set. However, when spare paper feeding is performed to feed the sheet to the predetermined position and the cassette is removed while the sheet waits for a print request, jamming processing is performed.

According to this embodiment, as described above, when an abnormal event occurs during the operation mode shown in FIG. 20, the abnormal event treatment task A shown in FIG. 22 is performed. When an abnormal event occurs during the operation mode shown in FIG. 21, the abnormal event treatment task B shown in FIG. 23 is performed. Therefore, an appropriate abnormal event treatment can be performed in accordance with the current operation mode.

In addition, the sheet stopped at the resist roller position in spare paper feeding is often subjected to a positional error, removal of the sheet, and tearing of the trailing end of the sheet. In this embodiment, in the abnormal event treatment task B, since jamming processing is performed upon removal of the cassette, i.e., since the sheet piled within the laser beam printer is discharged, and a new sheet is fed again from the paper feed cassette, problems such as contamination of a lower surface of a sheet due to a positional error of the sheet can be solved.

Fourth Embodiment

FIGS. 24 to 28 are views showing the fourth embodiment of the present invention.

Figure 24:
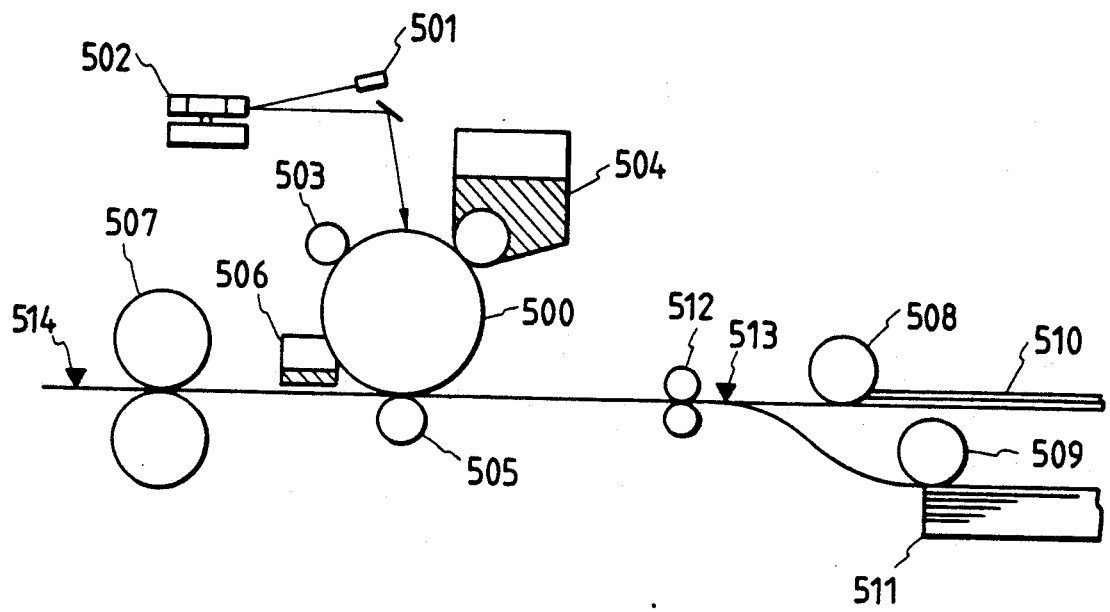
FIG. 24 is a view showing an arrangement of an apparatus according to the fifth embodiment of the present invention.

FIG. 24 shows an arrangement of an apparatus according to the fourth embodiment. This apparatus includes a photosensitive drum 500, a semiconductor laser 501, a polygonal mirror scanner 502, a charge roller 503, a developing unit 504, a transfer roller 505, a cleaner 506, a fixer 507, a first paper feed roller 508, a second paper feed roller 509, a paper feed tray 510, a paper cassette 511, a resist roller 512, and paper sensors 513 and 514.

The arrangement of this embodiment is different from that of the third embodiment in that a sheet can be fed from the paper feed tray, and that the paper sensor 513 is added in front of the resist roller 512. With this arrangement, processing performed upon discharge of a sheet in spare paper feeding by a user before a print request is received is shown in this embodiment. A control system of this embodiment is the same as that of the third embodiment in FIG. 19.

Figure 25:
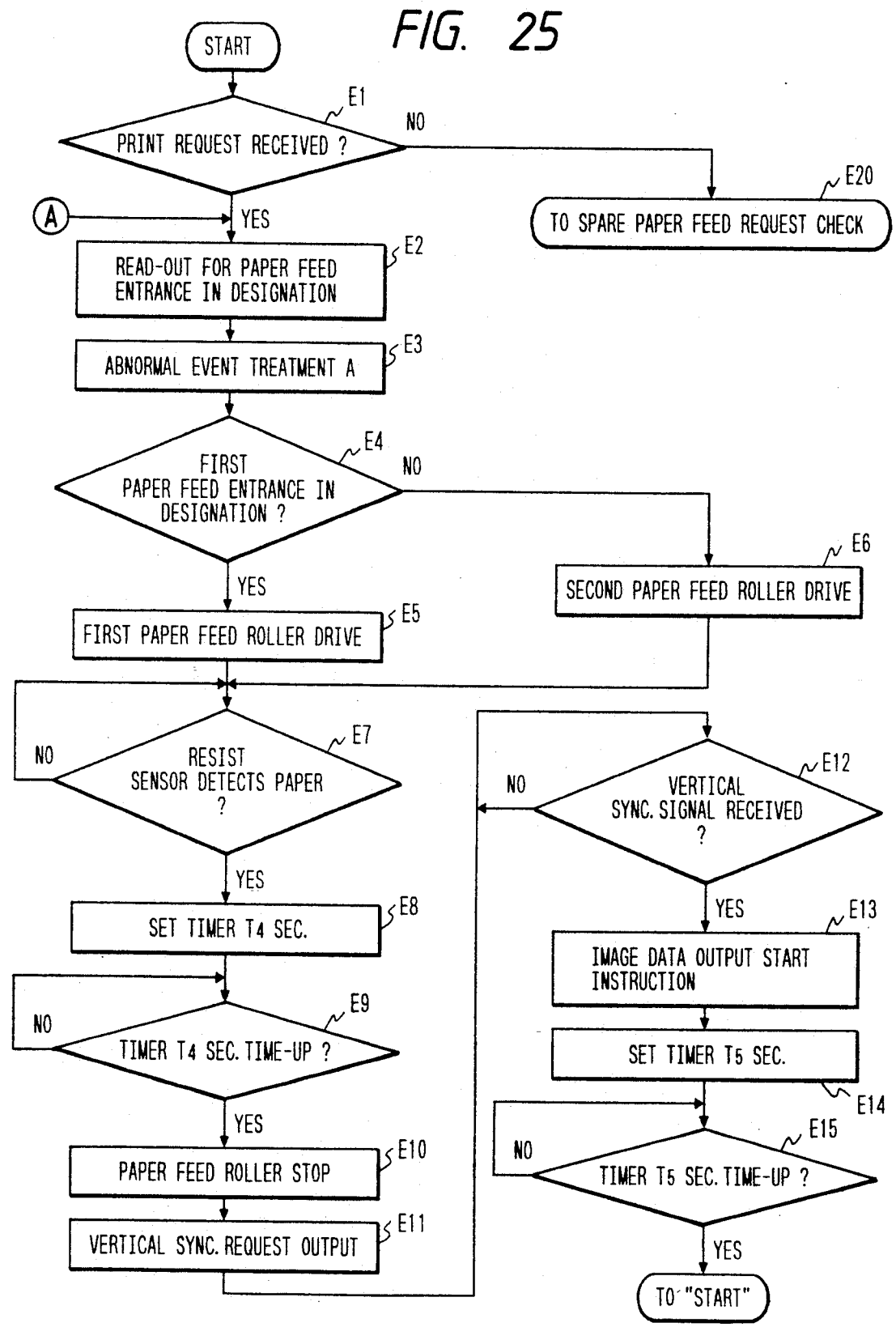
FIG. 25 is a flow chart for explaining an operation upon reception of a print request without receiving a spare paper feed request according to the fifth embodiment.

A feed operation in the printer shown in FIG. 24 will be described below with reference to a flow chart in FIG. 25.

When a print request is received in step E1, data of a paper feed entrance of the first or second paper feed roller 508 or 509 which is designated by the controller is read (step E2). An abnormal event treatment task A is executed (step E3) (to be described later in detail), and the paper feed roller of the designated paper feed entrance is driven (steps E5 and E6). Thereafter, control waits until the paper sensor 513 detects the presence of the sheet (step E7). Upon detection of the presence of the sheet, when a predetermined period of time $T_4$ has elapsed (steps E8 and E9), the paper feed roller is stopped (step E10), and a vertical sync request is output to the controller (step E11). When the controller receives the vertical sync signal, the flow advances from step E12 to step E13 to drive the resist roller 512, and writing of an image on the photosensitive drum 500 is started. When a predetermined period of time $T_5$ has elapsed (steps E14 and E15), writing of the image is completed, and the flow returns to the "start".

Figure 27:
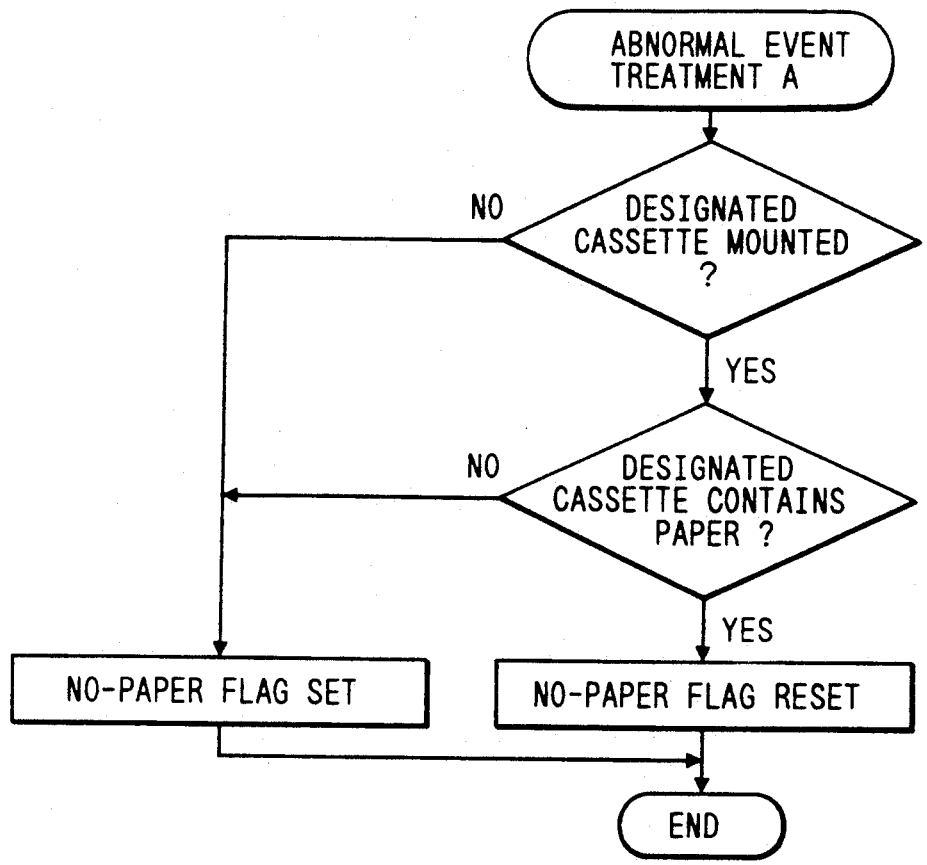
FIG. 27 is a flow chart for explaining an abnormal event treatment task A according to the fifth embodiment.

As shown in FIG. 27, the abnormal event treatment task A in step E3 is substantially the same as that of the first embodiment except that mounting/non-mounting of the designated cassette in each decision step is determined and that the presence/absence of a sheet in the designated cassette is determined.

Figure 26B:
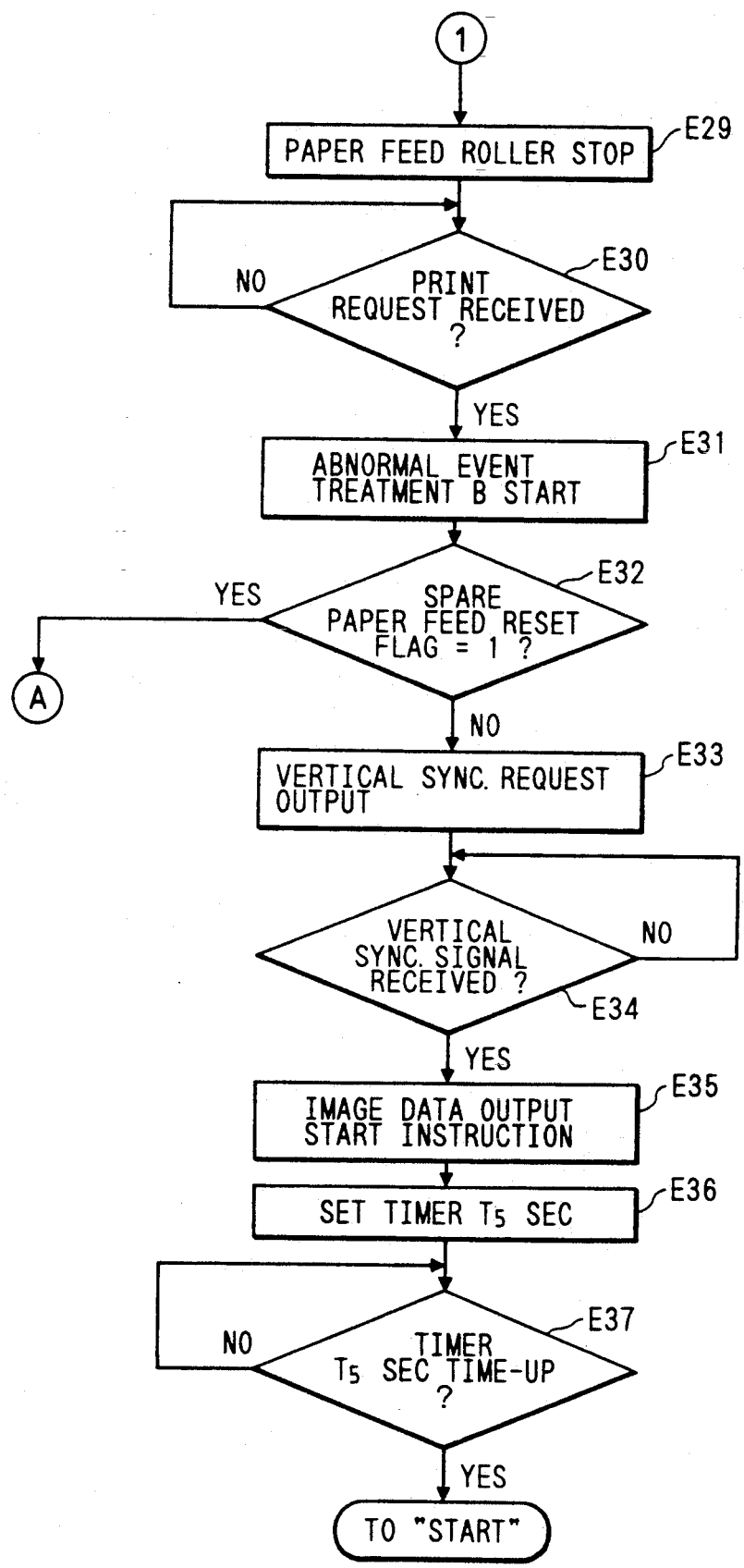

When a spare paper feed request is received prior to a print request, the flow advances from step E21 to step E22 in FIG. 26, and the designated paper feed roller is driven (steps E22 to E25). Thereafter, control waits until the paper sensor 513 detects the presence of a sheet (step E26). Upon detection of the presence of the sheet, when the predetermined period of time $T_4$ has elapsed (steps E27 and E28), the paper feed roller is stopped (step E29). The controller waits for a print request (steps E30). Upon reception of a print request, the abnormal event treatment task B is performed (step E31). When a normal state is detected, a vertical sync request is output to the controller (step E33). Upon reception of the vertical sync signal (step E34), the resist roller 512 is driven and image write access of the photosensitive drum 500 is started (step E35). When the predetermined period of time $T_5$ has elapsed (steps E36 and E37), the image write access is completed, and the flow returns to the "start".

Figure 28:
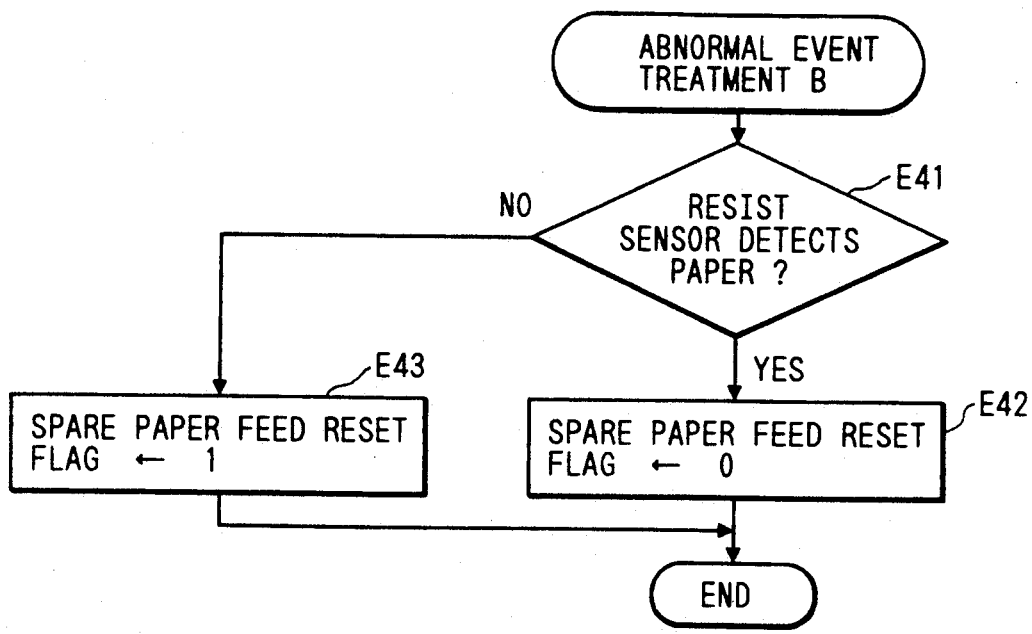
FIG. 28 is a flow chart for explaining an operation of an abnormal event treatment task B according to the fifth embodiment.

As shown in FIG. 26, once a spare paper feed request is received, the sheet is fed to the resist roller position, and the controller waits for a print request while the paper feed roller is kept stopped. Upon reception of a print request in step E30, the abnormal event treatment task B shown in FIG. 28 is started. In the abnormal event treatment task B, if the "presence" of the sheet is detected by the resist sensor (step E41), a spare paper feed reset flag is reset (step E42). However, if a no-paper state is detected, the spare paper feed reset flag is set (step E43). When spare paper feeding is completed and a print request is received, the content of the spare paper feed reset flag is read. If this flag is set at "1", the controller determines that the sheet in the spare paper feeding is discharged (step E32). The flow returns to step E2 through connectors of FIGS. 26 and 25 to cause the paper feed roller to feed a sheet. However, if the above flag is set at "0", the flow advances to step E33, and vertical synchronization is performed to start an image output.

In this embodiment, an appropriate abnormal event treatment can be performed in accordance with an operation mode. When a sheet in spare paper feeding is stopped at the position of the sensor 513 and is discharged, a sheet can be fed again from the paper feed tray. Otherwise, a normal operation can be performed.

Fifth Embodiment

Figure 29:
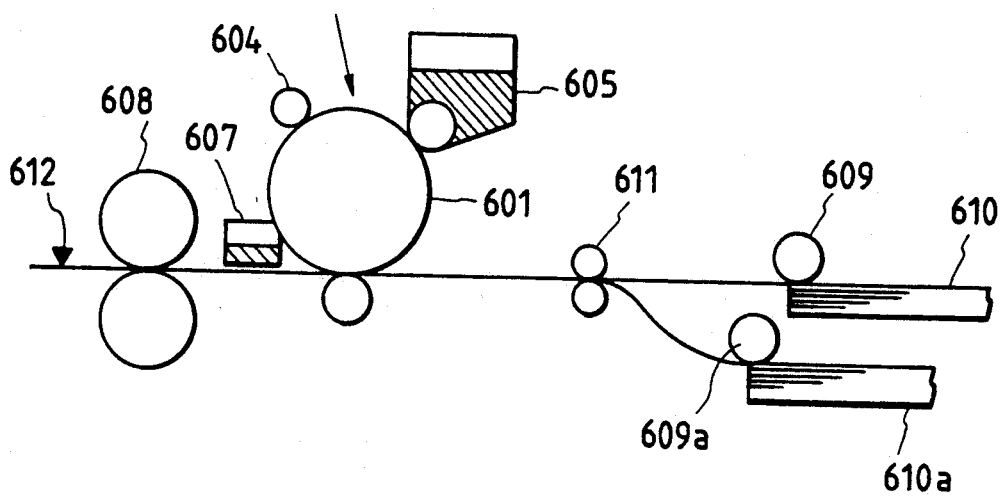
FIG. 29 is a view showing an arrangement of an apparatus according to the sixth embodiment of the present invention.

FIG. 29 shows arrangement of an apparatus of the fifth embodiment of the present invention. This apparatus has a two-stage paper feed cassette, and paper paths from the respective paper feed entrances to a resist roller do not interfere with each other.

As shown in FIG. 29, the apparatus according to this embodiment comprises a paper feed roller 609, a cassette 610, a paper feed roller 609a, and a cassette 610a.

Figure 30:
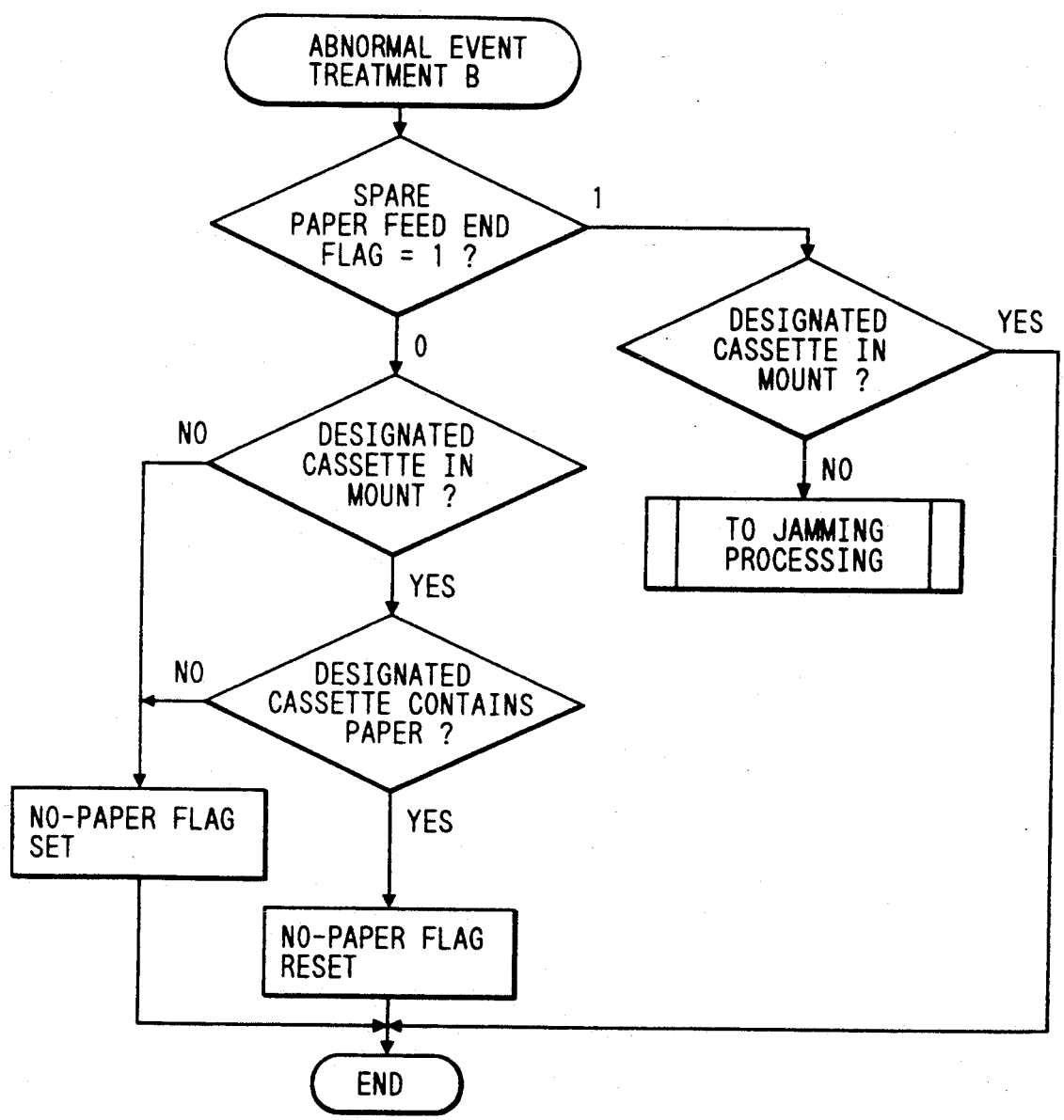
FIG. 30 is a flow chart for explaining an abnormal event treatment task B according to the sixth embodiment.

Processing of the apparatus having the above arrangement in each operation mode is substantially the same as the processing of the fourth embodiment shown in FIGS. 20 and 21. An abnormal event treatment task A of this embodiment is substantially the same as that of the fifth embodiment shown in FIG. 22. An abnormal event treatment task B of this embodiment is substantially the same as that of the third embodiment except that mounting/non-mounting of the designated cassette and the presence/absence of a sheet are determined in each decision step, as shown in FIG. 30.

In this embodiment, a spare paper feed request is received, and a sheet in spare paper feeding is fed from the designated paper feed entrance. When a cassette at the paper feed entrance subjected to spare paper feeding is removed while the fed sheet is kept stopped at the resist roller position, jamming processing is performed. When a cassette is removed from a paper feed entrance different from that in spare paper feeding, no jamming processing is performed. This can prevent an unnecessary jamming event.

Figure 31:
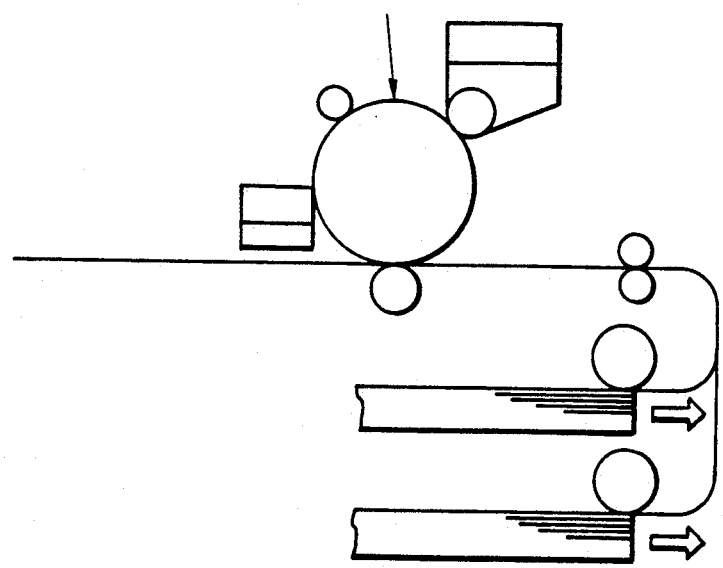
FIG. 31 is a view showing an arrangement of an apparatus of a modification according to the sixth embodiment.

When a removal direction of the cassette is indicated by an arrow in the arrangement of FIG. 31, this is influenced by another paper feed entrance. In this case, it is preferable to perform jamming processing when either cassette is removed.

Sixth Embodiment

FIG. 32 is a flow chart showing an operation of spare paper feeding according to the sixth embodiment of the present invention. In this embodiment, an operation performed upon reception of a print request prior to reception of a spare paper feed request is the same as that of the third embodiment (FIG. 20). Abnormal event treatment tasks A and B are the same as those of the third embodiment (FIGS. 22 and 23). An operation for receiving a spare paper feed request prior to reception of a print request will be exemplified below.

In the above embodiment, when a print request is received during a standby state of the printer, the stopped scanner motor is driven. When the rotation number of the scanner motor reaches a predetermined rotation number, paper feeding is started. In this embodiment, when a spare paper feed request is received during the standby state of the printer (step Q1), a sheet is fed to the resist roller position while the scanner motor is kept stopped (steps Q3 to Q6). Driving of the scanner motor is started (step Q8) upon reception of a print request (step Q7), and the abnormal event treatment task B is started (step Q9). When the rotation number of the scanner motor reaches the predetermined rotation number (step Q10), a vertical sync request is output (step Q13). Upon reception of the vertical sync signal (step Q14), image write access is started (step Q15).

When the rotation number of the scanner motor does not reach the predetermined rotation number due to the failure of the scanner motor at the end of spare paper feeding even if the scanner motor is driven upon reception of a print request, printing cannot be performed. The sheet in spare paper feeding cannot be permanently discharged in a normal abnormal event treatment. In this embodiment, when the rotation number of the scanner motor does not reach the predetermined rotation number within a predetermined period of time at the end of spare paper feeding even if the scanner motor is driven upon reception of the print request, the flow advances from step Q10 to step Q11 to determine that a failure flag is set. The sheet in spare paper feeding is forcibly discharged regardless of an instruction from the controller (step Q12). Therefore, piling of an unnecessary sheet within the printer can be prevented.

Seventh Embodiment

Figure 33:
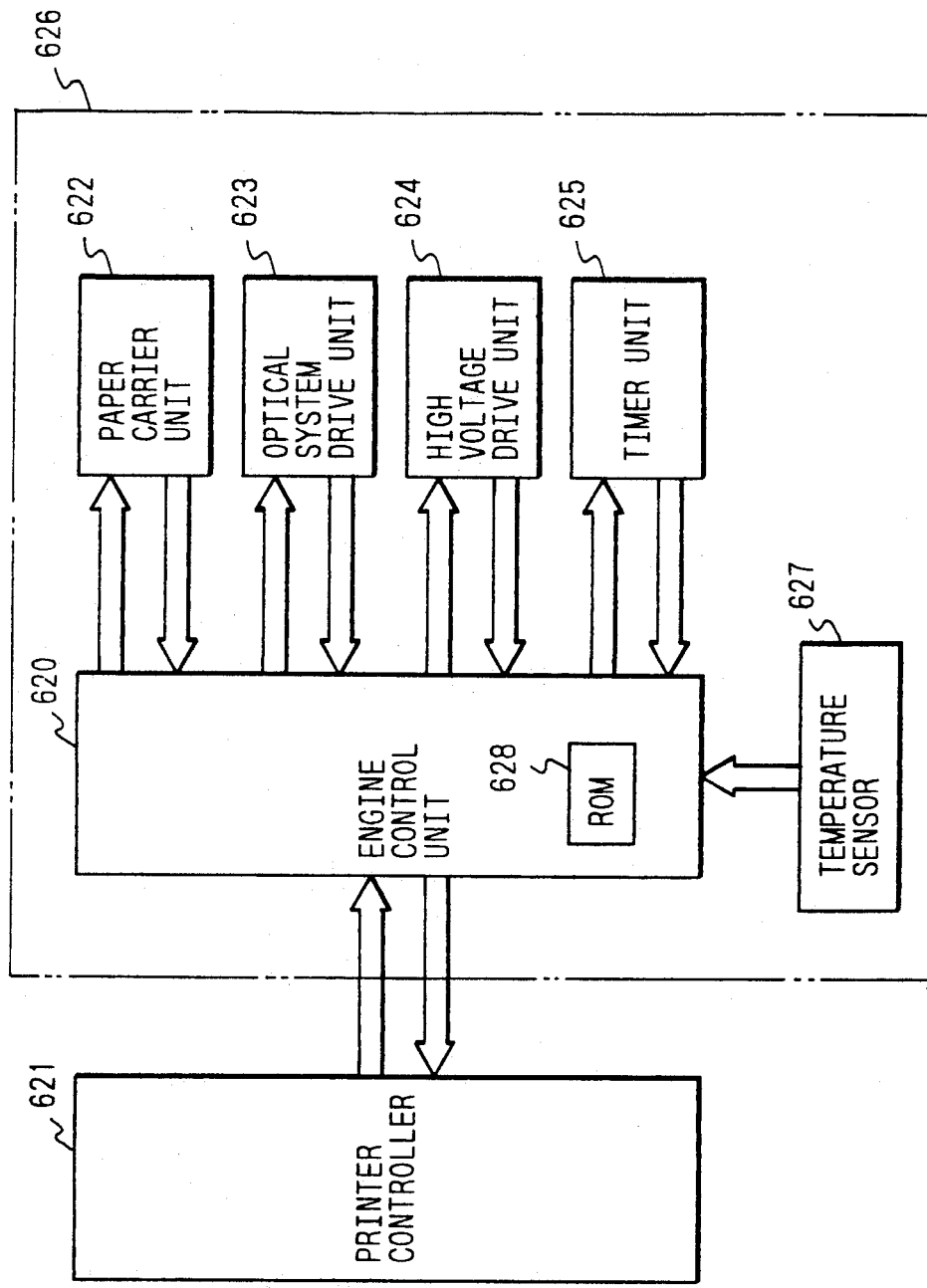
FIG. 33 is a block diagram showing an arrangement of a control system of a laser printer of the present invention.
Figure 34B:
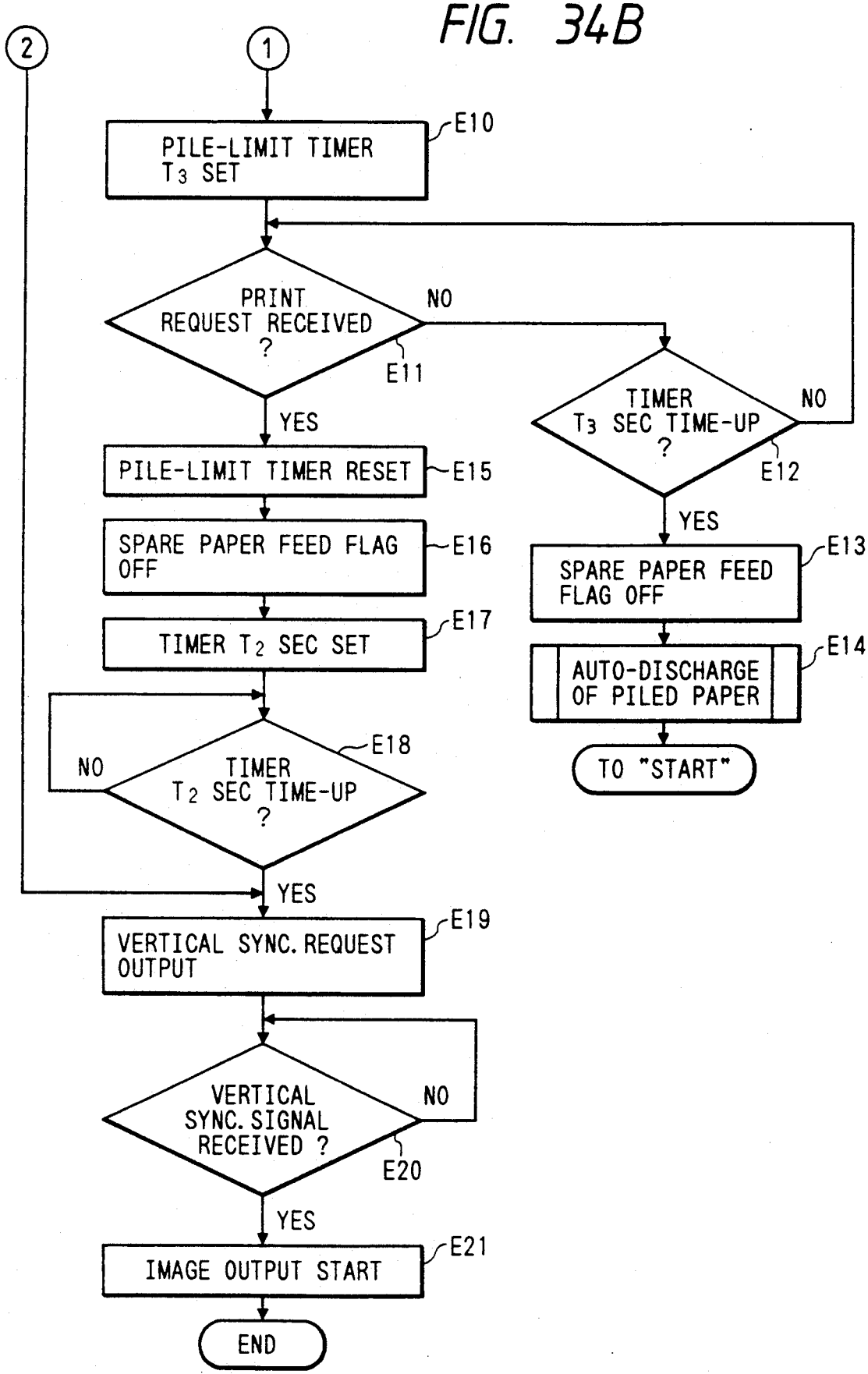
Figure 35:
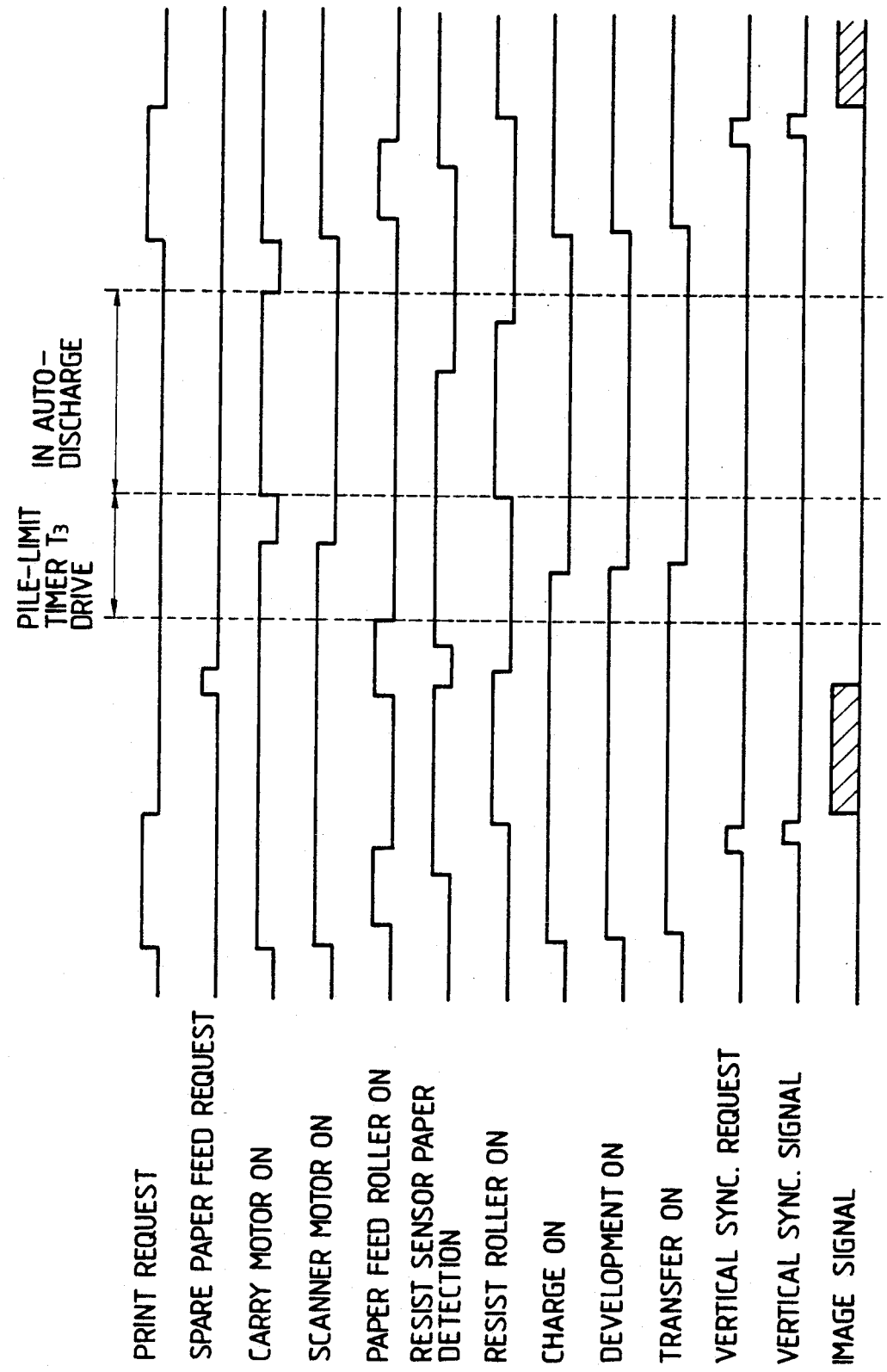
FIG. 35 is a timing chart showing an operation of the control system shown in FIG. 33.

FIGS. 33 to 35 show the seventh embodiment of the present invention. The mechanical structure of this embodiment is the same as that shown in FIG. 1, and a detailed description thereof will be omitted. A timer 625 is added to the arrangement of FIG. 1 in a control system of the seventh embodiment shown in FIG. 33. The timer 625 counts a time from the stop of a sheet after a spare paper feed request is supplied from a printer controller 621 to an engine control unit 620, and the sheet is fed to a predetermined position and is stopped and waits for receiving a print request. A temperature sensor 627 comprises, e.g., a thermistor. A ROM 628 stores pile-limit time corresponding to each temperature. The engine control unit 620 outputs to the timer 625 a pile-limit time as a time $T_3$ corresponding to a temperature detected by the temperature sensor 627, thereby setting the time $T_3$.

A flow chart of the engine control unit 620 according to this embodiment is shown in FIG. 34. The engine control unit 620 sets the time $T_3$ (step E0).

The presence/absence of a print request from the printer controller 621 is checked (step E1). When the print request is not present, the presence/absence of a spare paper feed request is checked (step E2). If YES in step E2, the spare paper feed flag is set (step E3). However, when the spare paper feed request is not present, the presence/absence of the print request is checked again. If the presence of the print request is detected, the paper feed roller is driven without setting the spare paper feed flag (step E4).

Figure 1:
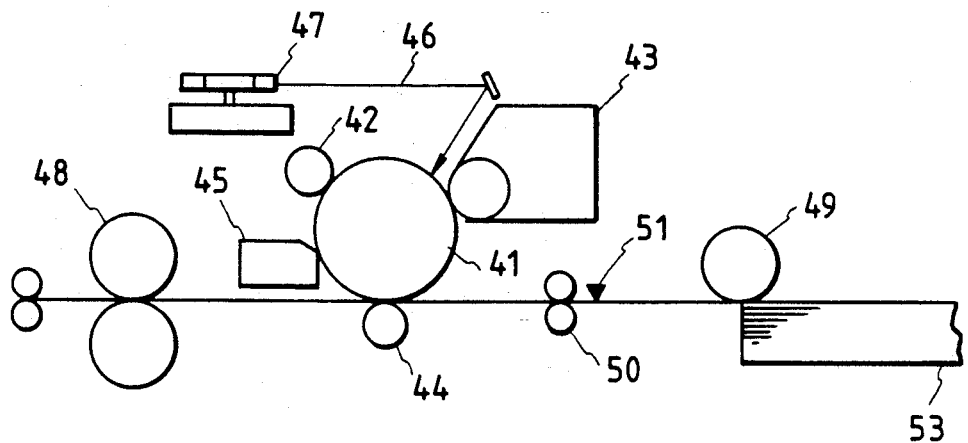
FIG. 1 is a view showing an arrangement of a conventional laser beam printer.
Figure 3:
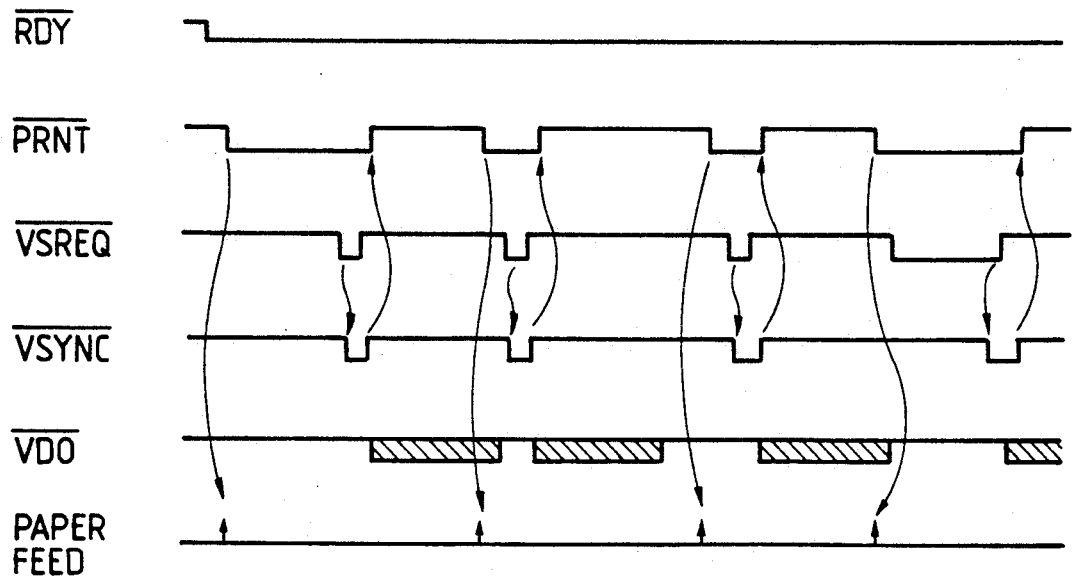
FIG. 3 is a timing chart for explaining an operation of the laser beam printer shown in FIG. 1.
Figure 2:
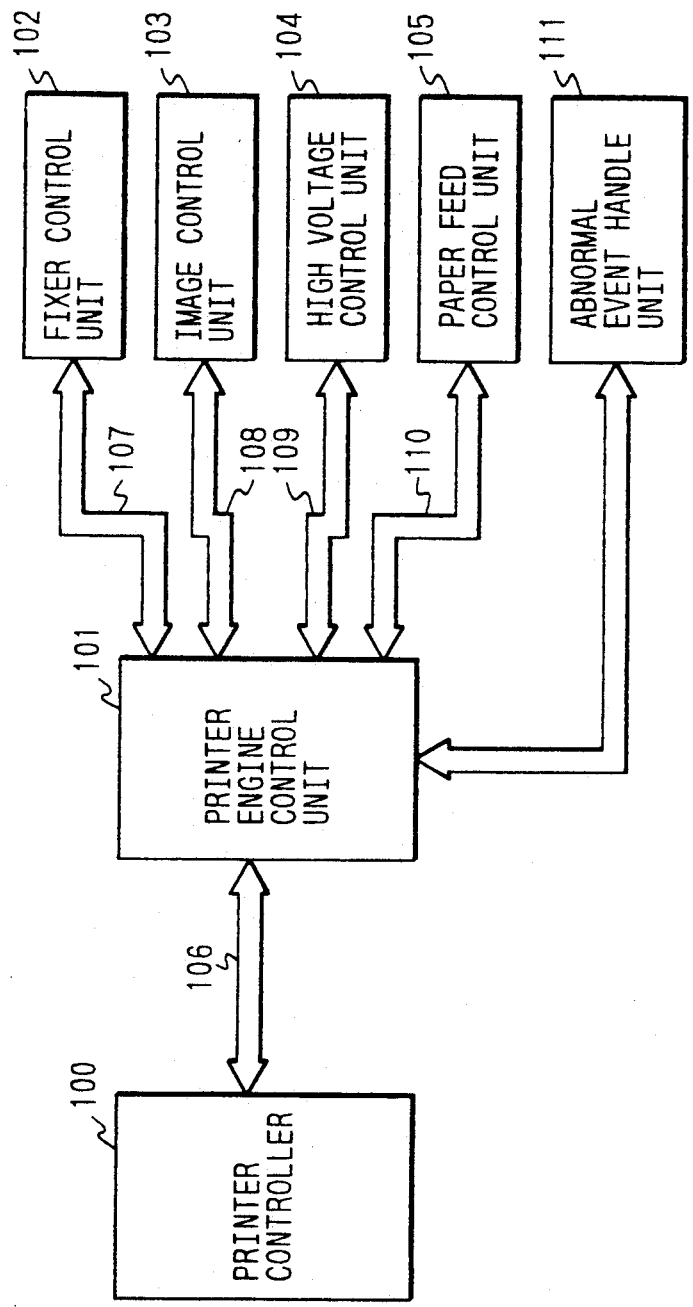
FIG. 2 is a block diagram of the laser beam printer shown in FIG. 1.
Figure 6:
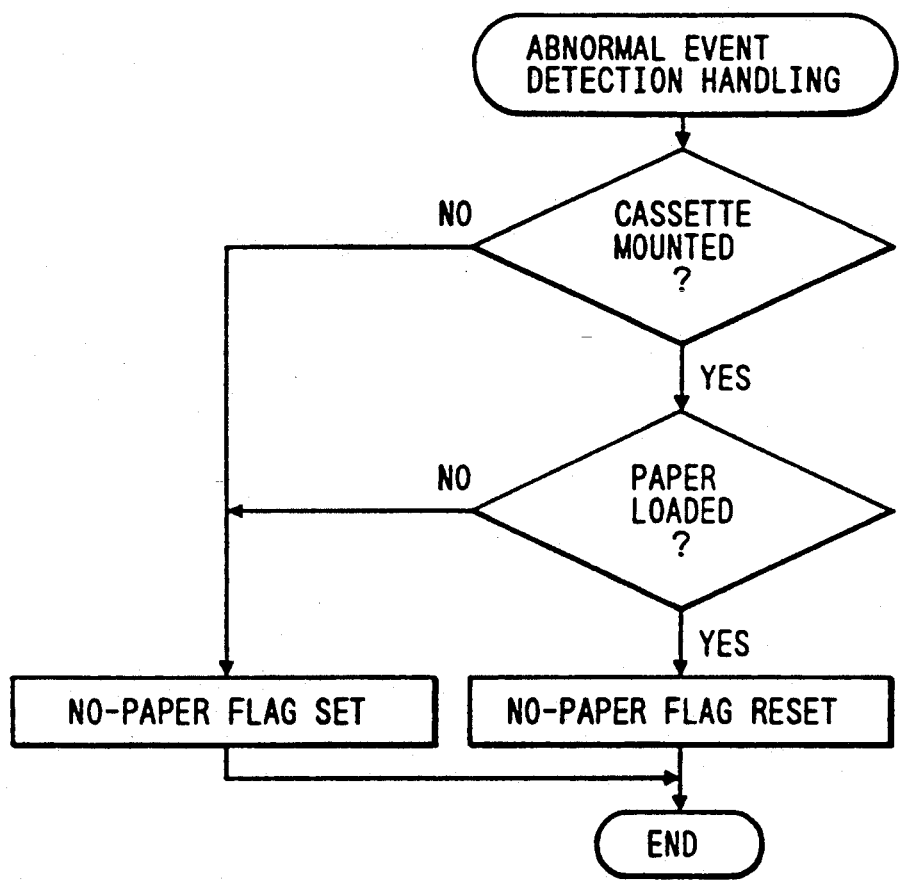

When the sheet reaches the resist paper sensor 51 (FIG. 1) (step E5), the sheet abuts against the resist roller 50 (FIG. 1). When a predetermined period of time $T_1$ (sec) for forming a predetermined loop has elapsed (steps E6 and E7), i.e., when feeding of the sheet to the resist roller position upon reception of the print request or spare paper feed request, the paper feed roller is stopped (step E8), and the spare paper feed flag is checked (step E9). If the spare paper feed flag is OFF, a vertical sync request is output as in the conventional case (step E19). However, when the spare paper feed flag is ON, a pile-limit timer $T_3$ for monitoring a pile time of the sheet in spare paper feeding is set (step E10), and the controller waits for a print request (step E11). It is then checked whether the time of the pile-limit timer $T_3$ has elapsed while reception of a print request is being checked (step E12). When a print request is received prior to the lapse of the time of the pile-limit timer $T_3$, the pile-limit timer is reset (step E15), and the spare paper feed flag is turned off (step E16). When the time $T_2$ (sec) has elapsed (steps E17 and E18), a vertical sync request is output (step E19). The subsequent operations are the same as those of the conventional technique (steps E20 and E21). When a print request is not received even after the lapse of the time of the pile-limit timer $T_3$, the spare paper feed flag is set to OFF (step E13). The piled sheet is discharged outside the laser beam printer (step E14), and the flow returns to the "start".

The above operations are represented in a timing chart of FIG. 35. This timing chart exemplifies a series of operations as follows. The first page is printed in response to a normal print request. The next page is fed in spare paper feeding in response to a spare paper feed request, and no print request is received after a lapse of the time $T_3$ (sec). An auto-discharge mode is set, and the sheet is automatically discharged. A sheet is fed from a paper feed cassette again upon reception of a print request.

In this manner, when a temperature is high, the sheet tends to be curled. However, when the temperature is low, the sheet tends not to be curled. In this embodiment, the temperature inside the printer is detected by the temperature sensor 627, and the time of the pile-limit timer $T_3$ is determined in accordance with the detected temperature. Therefore, the sheet in spare paper feeding can be discharged only when an appropriate period of time has elapsed.

As a modification of this embodiment, a humidity sensor may be arranged in place of the temperature sensor. In this case, sheets tend to be curled when the humidity is increased. The appropriate time of the pile-limit timer $T_3$ can be set in accordance with a humidity detected by the humidity sensor.

Alternatively, both a temperature sensor and a humidity sensor are arranged to appropriately set the time of the pile-limit timer $T_3$ on the basis of the temperature and humidity values detected by these sensors.

A plurality of time values need not be stored in the ROM. For example, a desired time may be input from a key input means and may be stored in a RAM.

Eighth Embodiment

Figure 36:
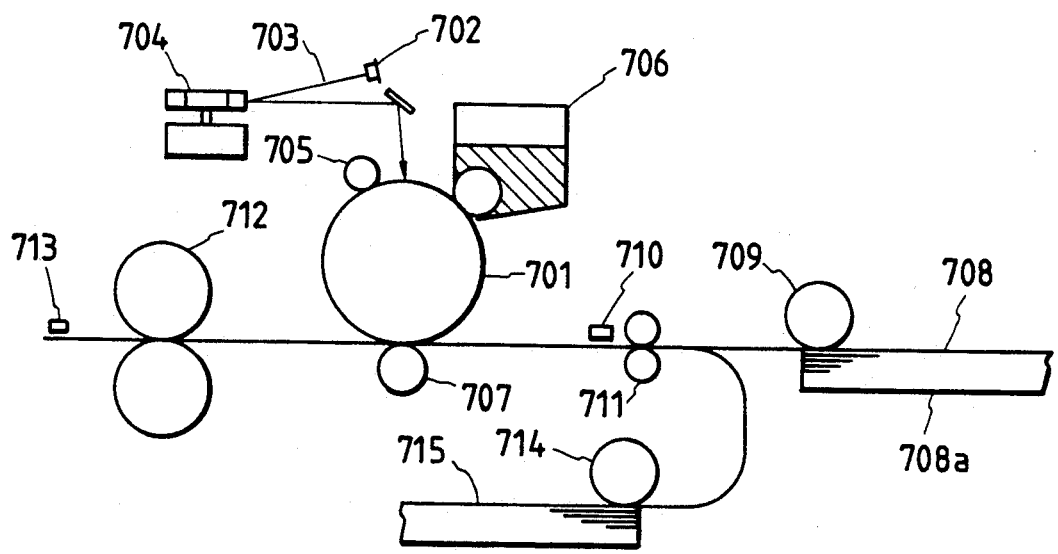
FIG. 36 is a view showing an arrangement of a laser printer according to the eighth embodiment of the present invention.
Figure 37B:
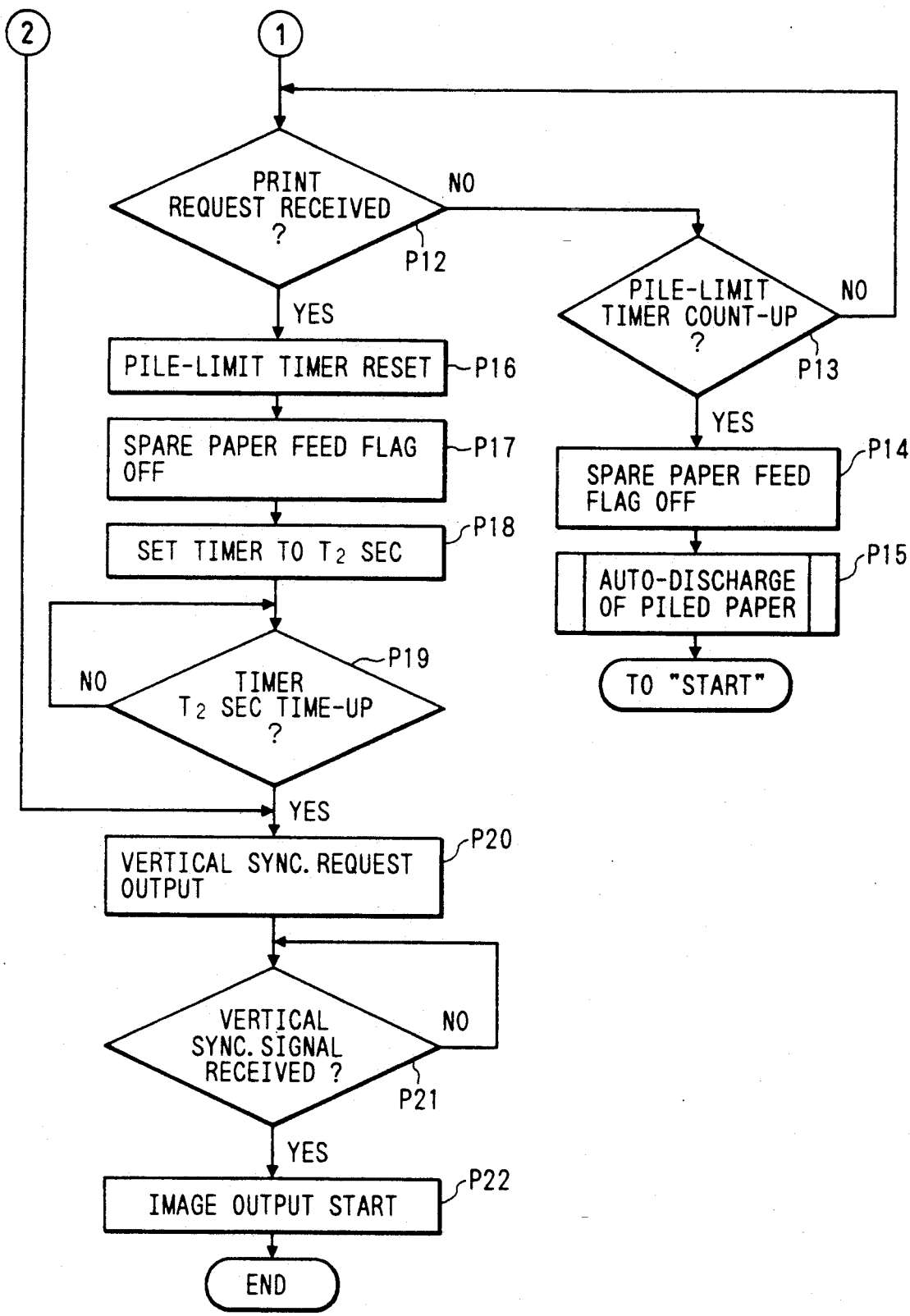

FIGS. 36 and 37 are views showing the eighth embodiment of the present invention.

FIG. 36 shows an arrangement of an apparatus according to the eighth embodiment. This apparatus has a second paper feed roller 714 and a paper feed cassette 715. A roller 711 is not a roller for correcting ramp upon abutment with the leading end of the sheet, but serves as a ramp feed roller for correcting ramp by bringing one side of the sheet into contact with one side surface of the feed path. Unlike in the above embodiments, a loop need not be formed at the resist roller portion. However, since a feed path from the second paper feed cassette 715 to a resist sensor 710 has a curve, the sheet tends to be curled if it is piled for a long period of time within the apparatus. Curling adversely affects the subsequent feed operation. In this embodiment, a sheet pile-limit time is changed for each paper feed entrance to perform optimal control. FIG. 37 is a flow chart of this control.

The presence/absence of a print request from a printer controller is checked in step P1. If no print request is received, the presence/absence of a spare paper feed request is checked (step P2). If NO in step P2, the flow returns to step P1 to check the presence/absence of a print request. When a spare paper feed request is received, a spare paper feed flag is set (step P3), and the flow advances to step P4.

When the print request is received in step P1, a paper feed roller 709 and the feed roller 711 are driven (step P4). When the resist sensor 710 detects the sheet (step P5), the paper feed roller 709 and the roller 711 are stopped (step P6). It is checked in step P7 whether the spare paper flag is set. If NO in step P7, the flow advances to step P20 to output a vertical sync request. However, if YES in step P7, data associated with designation of a paper feed entrance is read out from a RAM (not shown) to determine whether the designated paper feed entrance is a paper feed entrance of a first cassette 708a or a paper feed entrance of the second cassette 715 (step P8). When the designated paper feed entrance is determined to be the paper feed entrance of the first cassette 708a, a time $T_{L1}$ is set as the time of the pile-limit timer $T_3$ (step P11). However, when the designated paper feed entrance is determined to be that of the second cassette, a time $T_{L2}$ s set (step P10).

Thereafter, it is checked whether counting of the pile-limit timer $T_3$ is completed while the presence/absence of a print request is being checked (steps P12 and P13). When counting of the pile-limit timer $T_3$ is completed without receiving a print request, the spare paper feed flag is set to OFF (step P14), and the piled sheet is discharged outside the apparatus (step P15), and the flow returns to the "start". When a print request is received before counting of the pile-limit timer $T_3$ is completed in steps P12 and P13 (step P16), the spare paper feed flag is set to OFF (step P17). The time $T_2$ (sec) is waited, and the vertical sync request is output (steps P19 and P20). When the vertical sync signal is received (step P21), image data output is started (step P22), and this sequence control is ended.

In this embodiment, since the two paper feed entrances are available, when a spare paper feed request is received, the designated paper feed entrance is read, and the paper feed roller of the designated paper feed entrance is driven. When the paper sheet reaches the resist sensor 710 and is stopped while waiting for a print request, it is determined which paper feed entrance is designated, and a value corresponding to the designated paper feed entrance is set in the pile-limit timer. In this embodiment, the paper path of the first cassette is straight, and the resist loop need not be formed, so that a limit time can be long. However, since the paper path of the second cassette is curved, the limit time is set to be shorter than that of the first cassette. That is, condition $T_{L1} > T_{L2}$ is satisfied. A time which adversely affects the sheet is changed. In this case, since the time of the pile-limit timer $T_3$ is determined in accordance with the designated paper feed entrance, image formation with an appropriate pile-limit time can be performed even if either paper feed entrance is used.

In the above embodiment, the time elapsed after the spare paper feeding is performed is counted as a pile-limit time. However, a time counted upon reception of a spare paper request or upon the start of driving of the paper feed roller may be counted. This embodiment exemplifies a laser printer. However, the present invention is also applicable to a liquid crystal printer or an LED printer.

Ninth Embodiment

This embodiment has a plurality of paper feed means, and the current paper feed means can be changed without automatically discharging a sheet of spare paper feeding after spare paper feeding is performed.

Figure 7:
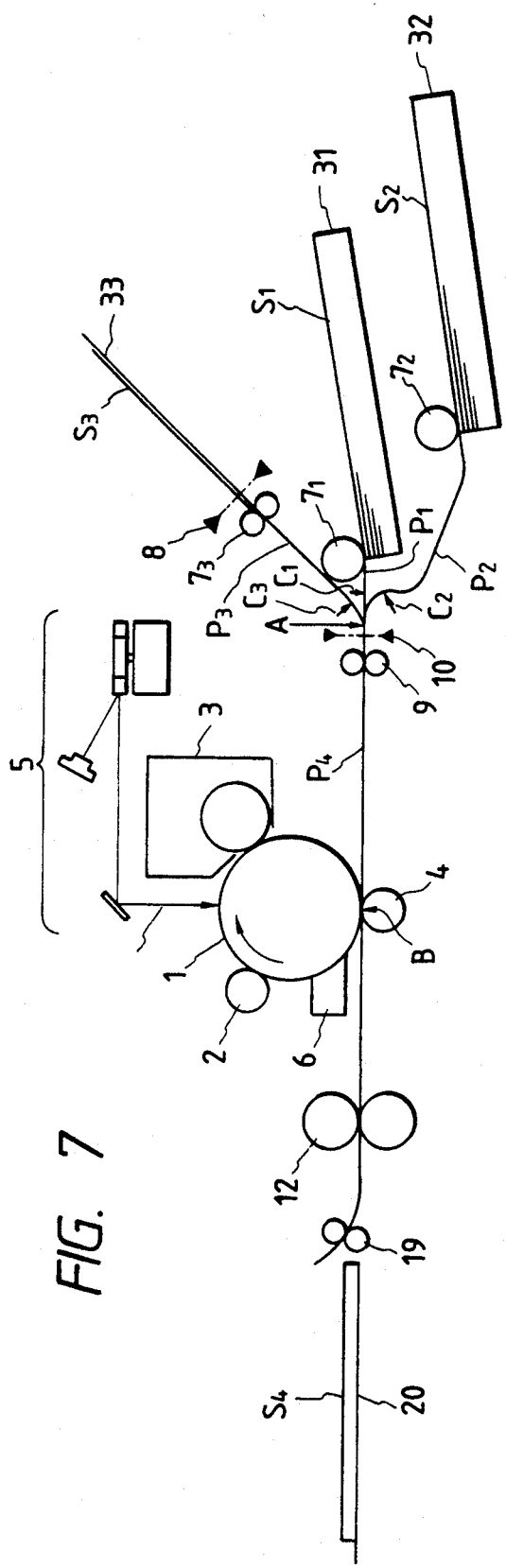
FIG. 7 is a schematic view showing an arrangement of a printer having a plurality of paper feed means.

An arrangement of this embodiment is substantially the same as that of FIG. 7.

Figure 38:
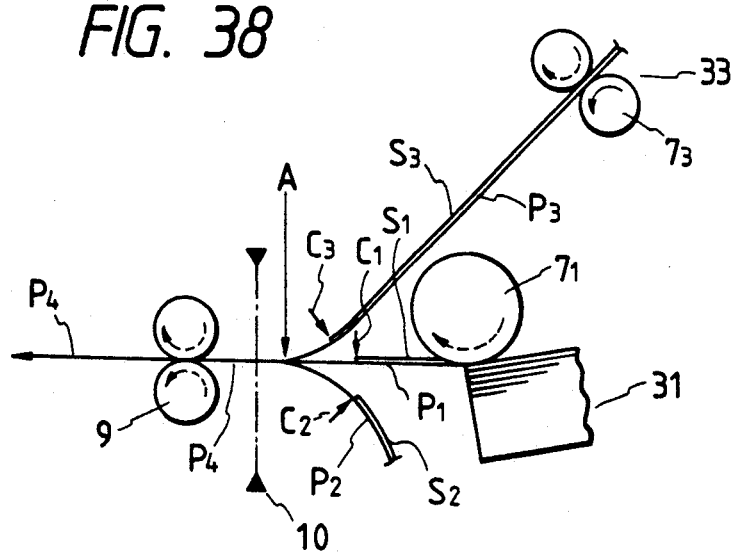
FIG. 38 is a view showing a state wherein a recording sheet of each paper feed means is fed by a spare paper feed request according to the ninth embodiment of the present invention.

FIG. 38 shows a state wherein spare paper feeding is performed for the first to third paper feed means 31 to 33 in the printer of FIG. 7, and recording sheets $S_1$ to $S_3$ wait at spare paper feed positions $C_1$ to $C_3$, respectively.

The first paper feed means 31 to 33 are controlled by spare paper feeding by a controller (i.e., a control circuit such as a microcomputer) serving as a paper feed control means on the basis of spare paper feed signals before a printer operation start signal (print start signal), so that the recording sheets $S_1$ to $S_3$ are fed as sheets in spare paper feeding. Feeding of the recording sheets $S_1$ to $S_3$ is stopped when leading ends of the recording sheets $S_1$ to $S_3$ are located at predetermined spare paper feed positions $C_1$ to $C_3$ in front of a merge point A of the respective sheet paths $P_1$ to $P_3$ of the paper feed means 31 to 33, respectively. Spare paper feeding is completed, and the recording sheets are set in the waiting state.

Figure 41B:
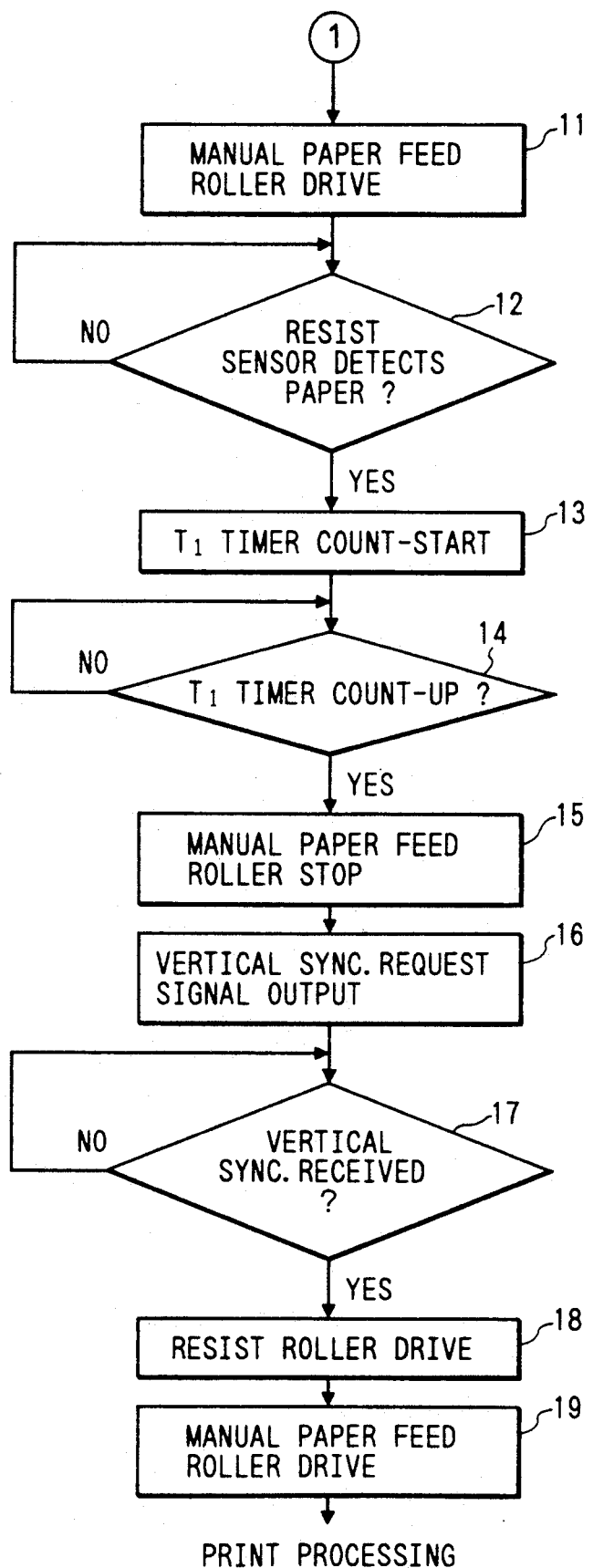

FIG. 41 is a flow chart showing a paper feed sequence including a spare paper feed sequence. The paper feed sequences of the paper feed means 31 to 33 are identical to each other, and only a paper feed sequence of the third paper feed means 33 serving as a manual feed means will be described below.

(1) When the recording sheet $S_3$ is placed on the manual feed tray, it is detected by the sensor 8, and a paper ON signal is sent to a controller.

(2) The presence/absence of manual paper feed designation from the controller is read (step 1). If manual paper feed designation is detected, the presence/absence of a print request is read (step 2).

(3) At this time, a flag 1 (FLAG1) is read whether the sheet $S_3$ in spare paper feeding is already present if the print request from the controller is detected (step 3). If NO in step 3, normal print processing is performed (step 20). However, if YES in step 3, the flow jumps a spare paper feed sequence (steps 4 to 10) and advances to a sequence (from step 11).

(4) If a print request from the controller is not present (step 2), the presence/absence of a spare paper feed request is read (step 4). If a spare paper feed request is present, the manual paper feed roller $7_3$ is driven (step 5). At the same time, a time $T_0$ (sec) is set in the sequence control timer (step 6).

The time $T_0$ is determined so that paper feeding of the recording sheet $S_3$ is started, and its leading end reaches the predetermined spare paper feed position $C_3$ in the sheet path $P_3$ of the third paper feed means 33 in front of the merge point (i.e., almost corresponding to the position of the resist sensor 10) with the sheet paths $P_1$ and $P_2$ of other paper feed mens 31 and 32.

(5) When the timer counts the time $T_0$ (sec) (step 7), driving of the manual paper feed roller $7_3$ is stopped (step 8). The flag 1 (FLAG1) serving as a flag representing the presence of a paper sheet in spare paper feeding is set (step 9), and reception of a print request signal from the controller is awaited (step 10).

The manual feed recording paper $S_3$ of the third paper feed means 33 in spare paper feeding is fed in steps 4 to 10, and the sheet $S_3$ is kept at a spare paper feed wait position state of FIG. 38 until the next print request signal is received.

(6) When a print request is received from the controller, driving of the manual paper feed roller $7_3$ is started again (step 11).

The recording sheet $S_3$ fed in spare paper feeding and waiting, as described above, is fed again.

(7) Feeding continues until the leading end of the recording sheet $S_3$ reaches the resist sensor 10. When the leading end of the paper sheet $S_3$ reaches the resist sensor 10, and this is detected by the resist sensor 10, the time of the timer $T_1$ (sec) is set (step 13).

Figure 39:
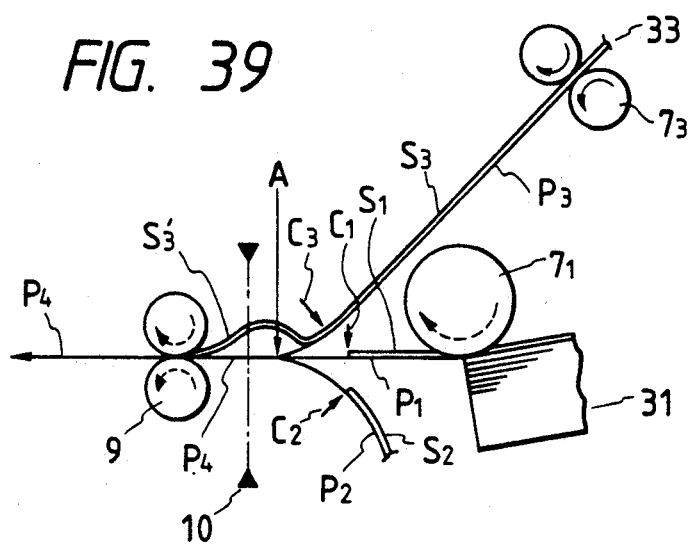
FIG. 39 is a view showing a state wherein a recording sheet from the third paper feed means is fed and abuts against a resist roller, and a loop having a predetermined amount is formed in the paper sheet according to the ninth embodiment.

The timer time $T_1$ (sec) is a time interval from time when the leading end of the recording sheet $S_3$ passes by the position of the resist sensor 10 and the recording sheet $S_3$ abuts against the nip portion of the roller pair as the resist roller 9 to time when a loop $S_3'$ having a predetermined amount shown in FIG. 39 is formed in the continuously fed recording sheet $S_3$. By forming this loop, ramp or skewing of the recording sheet $S_3$ can be eliminated, and matching at the resist position can be achieved.

(8) When the time of the $T_1$ (sec) timer has elapsed, driving of the manual paper feed roller $7_3$ is stopped (step 15), and a vertical sync request signal is output to the controller (step 16).

(9) When the controller receives the vertical sync signal (step 17), driving (step 18) of the resist roller 9 and driving (step 19) of the manual paper feed roller $7_3$ are started.

The recording sheet $S_3$ stopped upon abutment with the resist roller 9 and waiting at this position is fed to the transfer portion B through the common sheet path $P_4$ at an appropriate paper feed timing. The sheet is then subjected to image transfer and printing.

(10) Even if designation of the paper feed means is changed to the cassette of the first or second paper feed means 31 or 32 after spare paper feeding of the recording sheet $S_3$ of the third paper feed means 33 serving as the manual paper feed means is performed (steps 4 to 10), since the leading end of the paper sheet $S_3$ in the sheet path $P_3$ is located at the predetermined position $C_3$ in front of the merge point A, the recording sheet $S_1$ or $S_2$ fed from the first or second paper feed means 31 or 32 as another selected paper feed means is not interfered with the paper sheet $S_3$ in spare paper feeding. The recording sheet $S_1$ or $S_2$ is guided from the separate sheet $P_1$ or $P_2$ to the common sheet path $P_4$, thereby performing paper feeding.

Figure 40:
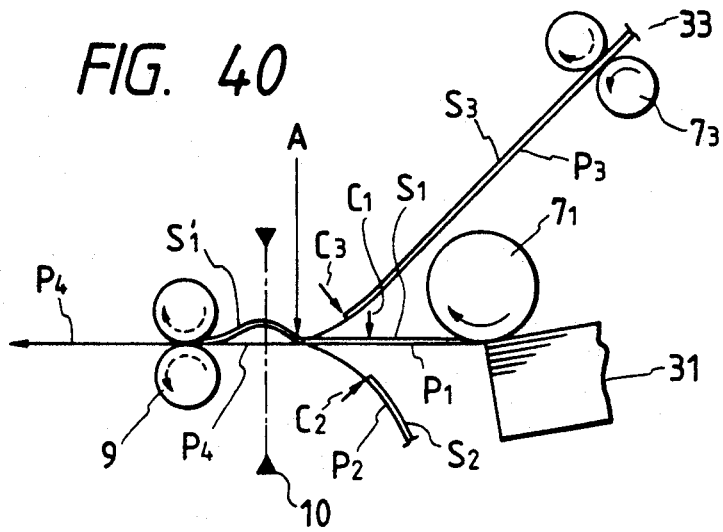
FIG. 40 is a view showing a state wherein a recording sheet from the first paper feed means is fed and abuts against a resist roller, and a loop having a predetermined amount is formed in the paper sheet according to the ninth embodiment.

FIG. 40 shows a state wherein the recording sheet $S_1$ of the first paper feed means as the selected paper feed means is fed, its leading end abuts against and is stopped at the resist roller 9, and a loop $S_1'$ having a predetermined amount is formed.

(11) The paper feed sequence including a spare paper feed sequence can be performed as in the third paper feed means 33 described above.

Since the recording sheets $S_1$ and $S_2$ from the paper feed means 31 and 32 in spare paper feeding are set so that their leading ends are located at the predetermined spare paper feed positions $C_1$ and $C_2$ in front of the merge point A of the sheet paths $P_1$ and $P_2$ of the paper feed means 31 and 32, no sheets in spare paper feeding are present at the sheet path merge point A. Therefore, it is possible to feed a new recording sheet S₃ from the third paper feed means 33.

Tenth Embodiment

Figure 42:
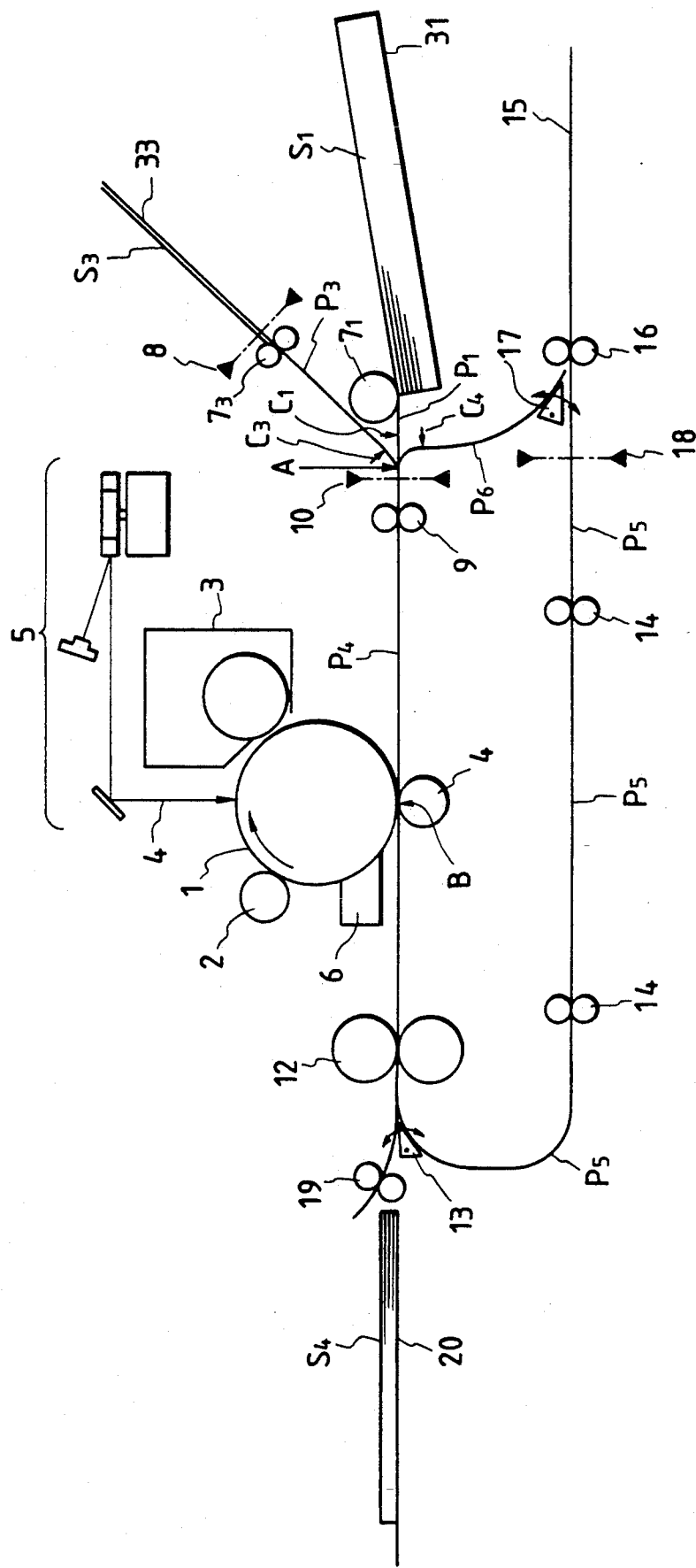
FIG. 42 is a schematic view showing an arrangement of a printer having a two-side print function according to the tenth embodiment of the present invention.

FIG. 42 shows a schematic arrangement of a printer having a two-side print function.

The same reference numerals as in FIG. 7 denote the same parts in FIG. 42, and a detailed description thereof will be omitted.

Paper feed means comprise a cassette paper feed means 31, a manual paper feed means 33, and a paper refeed means.

The paper feed sequences of the paper feed means 31 and 33 are the same as those of the paper feed means 31 and 33 of the ninth embodiment.

A paper sheet is fed from the paper feed means 31 or 33 to a transfer portion B. An image is transferred to the first surface of the fed recording sheet. The recording sheet to which the image is fixed by a fixer 12 is discharged on a paper discharge tray 20 from a discharge roller 19 through an upper guide surface of a paper discharge flapper 13 located at the first selection position, i.e., a horizontal position in a one-side print mode.

When the two-side print mode, however, is set, the recording sheet on which an image is formed on the first surface thereof passes through the fixer 12 and enters into a feedback sheet path $P_5$ under the lower guide surface of the paper discharge flapper 13 switched to a second selection position, i.e., an obliquely upward position. The recording sheet is then guided to a switch-back path 15 by carrier rollers 14 (i.e., the surface having the image faces down). The recording sheet is then switched back to a paper refeed sheet path $P_6$ by cooperation of a recording sheet sensor 18, a reverse rotation roller 16, and a reverse rotation flapper 17.

The paper refeed path $P_6$ merges into the separate sheet paths $P_1$ and $P_3$ of the cassette paper feed means 31 and 33 and communicates with the common sheet path $P_4$ connected to the transfer portion B. The recording sheet whose image on the first surface faces down is guided from the paper refeed path $P_6$ to the common sheet path $P_4$. The recording sheet is fed by the resist roller 9 again to the transfer portion B at a predetermined timing. An image is transferred to the second surface of the recording sheet. The sheet is then guided to the fixer 12, and the image on the second surface is fixed. The sheet is then guided to the paper discharge roller 19 through the paper discharge flapper 13 switched to the first posture. Therefore, the recording sheet having images respectively on both sides is output on the paper discharge tray 20.

Figure 43B:
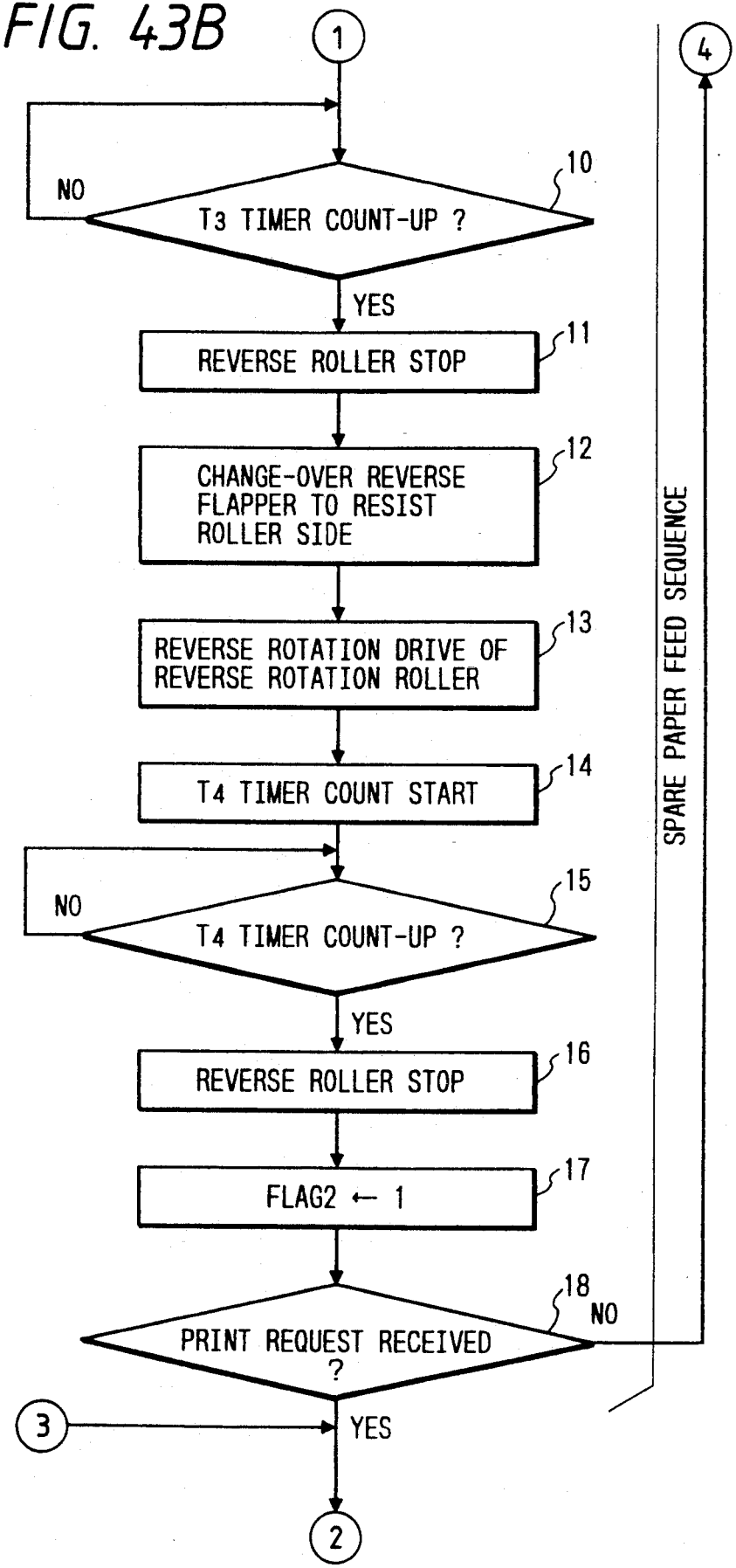

FIG. 43 is a flow chart of a paper refeed sequence including a spare paper feed sequence in the two-side print mode.

(1) The recording sheet having the image on its first surface, passing through the fixer 12, and entering into the feedback sheet path $P_5$ by the paper discharge flapper 13 switched to the second posture is fed toward the switch-back path 15 by the carrier rollers 14. When the leading end of the recording sheet is detected by the recording paper sensor 18 located in front of the reverse rotation roller 16 located at the entrance of the switch-back path 15, driving of the carrier rollers 14 is temporarily stopped. Feeding of the recording sheet is stopped in the feedback sheet path $P_5$ until paper refeed instruction is input while the leading end of the paper sheet is located at the position of the sensor 18.

(2) When the recording sheet waiting in the feedback sheet path $P_5$ receives a two-side paper refeed instruction from the controller (step 1), the presence/absence of a print request is checked (step 2).

(3) At this time, when a print request is detected, the presence/absence of the sheet in spare paper feeding is read, i.e., a flag (FLAG2) is read (step 3). If the sheet in spare paper feeding is present, the flow jumps the spare paper feed sequence (steps 4 to 18). However, when the sheet in spare paper feeding is not present, normal two-side paper refeeding (step 28) is performed.

(4) When any print request is present, the presence/absence of a spare paper feed request is checked (step 4). If YES in step 4, the roller 14 is driven (step 5), and the reverse rotation roller 16 is rotated in the forward direction (step 6).

As a result, the recording sheet stopped and waiting in the feedback sheet path $P_5$ enters into the switch-back path 15 under the lower surface of the reverse rotation flapper 17, as described in (1).

(5) When the trailing end of the recording sheet is detected by the sensor 18 during feeding of the recording sheet (step 7), $T_3$ (sec) is set in the timer (step 8). Driving of the rollers 14 is stopped (step 9).

The timer time $T_3$ is a time interval from time when the trailing end of the recording sheet is detected to time when the trailing end of the recording paper passes under the reverse rotation flapper 17 and reaches a position immediately before a position at which the trailing end is about to pass the reverse rotation roller 16.

(6) When the timer counts $T_3$ (sec) (step 10), the reverse rotation roller 16 is stopped (step 11), and the reverse rotation flapper 17 is switched to the position for feeding the recording sheet to the paper refeed path $P_6$ (step 12). In addition, the reverse rotation roller 16 is rotated in the reverse direction (step 13). The recording sheet entering into the switch-back path 15 is switched back and is fed into the paper refeed path $P_6$ by the reverse rotation flag 17.

(7) The time $T_4$ (sec) is set in the timer simultaneously with reverse rotation of the reverse rotation roller 16 (step 14).

This timer time $T_4$ is a time interval until the leading end of the recording sheet entering into the paper refeed path $P_6$ in the switch-back direction reaches a predetermined spare paper feed position $C_4$ in front of the sheet path merge point A with the remaining paper feed means 31 and 33 in the paper refeed path $P_6$.

(8) When the timer counts $T_4$ (sec) (step 15), reverse rotation of the reverse rotation roller 16 is stopped (step 16).

(9) The flag 2 (FLAG2) is set (step 17), and the apparatus waits for reception of the next print signal (step 18).

Spare paper feeding of the recording sheet having the image on one surface in the two-side print mode is completed by steps 4 to 18.

(10) Upon reception of the print signal, the reverse rotation roller 16 is rotated in the reverse direction again (step 19). The recording sheet fed to the predetermined position $C_4$ of the paper refeed path $P_6$ is fed into the common sheet path $P_4$.

(11) When the leading end of the fed recording sheet is detected by the resist sensor 10 (step 20), $T_5$ (sec) is set in the timer (step 21).

This timer time $T_5$ is a time interval until the leading end of the fed recording sheet passes through the position of the resist sensor 10 and abuts against the nip portion of the roller pair as the resist roller 9, and a loop having a predetermined amount is formed in the continuously fed recording sheet.

(12) When timer counts $T_5$ (sec) (step 22), reverse rotation of the reverse rotation roller 16 is stopped (step 23), and a vertical sync request signal is output to the controller (step 24). A vertical sync request signal output from the controller is awaited (step 25).

(13) When the vertical sync signal is received from the controller, driving (step 26) of the resist roller 9 is started, and reverse rotation (step 27) of the reverse rotation roller 16 is also started.

The recording sheet abutting against and stopping at the resist roller 9 is fed to the transfer portion B through the common sheet path $P_4$ at an appropriate paper feed timing. An image is then formed on the second surface of the recording medium.

That is, upon reception of the vertical sync signal, the resist roller 9 is driven to allow image write access of the drum 1, thereby preforming a printing operation.

Even in this embodiment, a refed recording sheet in the spare paper feeding in the two-side print mode is stopped at the position $C_4$ in front of the sheet path merge point A in the paper refeed path $P_6$, so that paper sheets fed by feed systems of the cassette paper feed means 31 and the manual paper feed means 33 are not interfered with the sheet stopped in the paper refeed path $P_6$.

Therefore, even if a paper sheet is fed from the cassette paper feed means 31 or the manual paper feed means 33 is designated upon change in paper feed means designation after a refeed recording sheet is fed by spare paper feeding in the two-side print mode, paper feed switching can be properly performed without causing any problem. The same operations as described above can similarly be performed when the paper feed means is switched before the paper sheet in the two-side print mode is fed by spare paper feeding.

What is claimed is:

1. An image forming apparatus comprising:
    an image signal generator for generating an image signal;
    an image forming unit for forming an image on a recording medium on the basis of the image signal generated by said image signal generator;
    a feeding unit for feeding the recording medium to said image forming unit; and
    a controller for outputting different types of commands to said image forming unit to control an operation of said image forming unit,
    wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state,
    wherein said image forming unit validates a specific command of the different types of commands when the specific command is received during at least a spare paper feed period from start of spare paper feeding of the recording medium to start of paper feeding from the predetermined position, and
    wherein said controller outputs a paper refeed command as one of the specific commands so that a recording medium fed in spare paper feeding is discharged without forming an image thereon, and another recording medium can be fed.

2. An apparatus according to claim 1, wherein said image forming unit comprises a plurality of paper feed means, and said controller can designate one of said plurality of paper feeding means to feed said another recording medium when the paper refeed command is output.

3. An apparatus according to claim 2, further comprising means for generating a spare paper feed signal for designating start of spare paper feeding.

4. An apparatus according to claim 2, wherein said image signal generator develops an image and generates an image signal on the basis of external code data, and
    wherein said image forming unit performs image formation in accordance with an electrophotographic scheme.

5. An apparatus according to claim 1, further comprising means for generating a spare paper feed signal for designating start of spare paper feeding.

6. An apparatus according to claim 1, wherein said image signal generator develops an image and generates an image signal on the basis of external code data, and
    wherein said image forming unit performs image formation in accordance with an electrophotographic scheme.

7. An image forming apparatus comprising:
    an image signal generator for generating an image signal;
    an image forming unit for forming an image on a recording medium on the basis of the image signal generated by said image signal generator;
    a feeding unit for feeding the recording medium to said image forming unit; and
    a controller for outputting different types of commands to said image forming unit to control an operation of said image forming unit,
    wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state,
    wherein said image forming unit validates a specific command of the different types of commands when the specific command is received during at least a spare paper feed period from start of spare paper feeding of the recording medium to start of paper feeding from the predetermined position, and
    wherein said image forming unit comprises a plurality of paper discharge means, and said controller outputs a paper discharge means designation command for designating one of said plurality of paper discharge means as one of the specific commands.

8. An apparatus according to claim 7, further comprising means for generating a spare paper feed signal for designating start of spare paper feeding.

9. An apparatus according to claim 7, wherein said image signal generator develops an image and generates an image signal on the basis of external code data, and
    wherein said image forming unit performs image formation in accordance with an electrophotographic scheme.

10. An image forming apparatus comprising:
    an image signal generator for generating an image signal;

an image forming unit for forming an image on a recording medium on the basis of the image signal generated by said image signal generator;

a feeding unit for feeding the recording medium to said image forming unit; and a controller for outputting different types of commands to said image forming unit to control an operation of said image forming unit, wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state, wherein said image forming unit validates a specific command of the different types of commands when the specific command is received during at least a spare paper feed period from start of spare paper feeding of the recording medium to start of paper feeding from the predetermined position, wherein said image forming unit comprises a plurality of paper feed means and said controller outputs a paper feed means designation command for designating one of said plurality of paper feed means to feed the recording medium as one of the specific commands, and wherein said image forming unit performs recording of the recording medium in spare paper feeding and causes designated paper feed means to feed a recording medium to be recorded next when the paper feed means designation command is received within the spare paper feed period.

11. An apparatus according to claim 10, further comprising means for generating a spare paper feed signal for designating start of spare paper feeding.

12. An apparatus according to claim 10, wherein said image signal generator develops an image and generates an image signal on the basis of external code data, and wherein said image forming unit performs image formation in accordance with an electrophotographic scheme.

13. An image forming apparatus comprising:

an image signal generator for generating an image signal;

an image forming unit for forming an image on a recording medium on the basis of the image signal generated by said image signal generator;

a feeding unit for feeding the recording medium to said image forming unit; and a controller for outputting different types of commands to said image forming unit to control an operation of said image forming unit, wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state, wherein said image forming unit validates a specific command of the different types of commands when the specific command is received during at least a spare paper feed period from start of spare paper feeding of the recording medium to start of paper feeding from the predetermined position, wherein said image forming unit can perform image formation selectively at one of a plurality of resolutions, and wherein said controller outputs a command for designating one of the plurality of resolutions as one of the specific commands.

14. An apparatus according to claim 13, further comprising means for generating a spare paper feed signal for designating start of spare paper feeding.

15. An apparatus according to claim 13, wherein said image signal generator develops an image and generates an image signal on the basis of external code data, and wherein said image forming unit performs image formation in accordance with an electrophotographic scheme.

16. An image forming apparatus comprising:

an image signal generator for generating an image signal;

an image forming unit for forming an image on a recording medium on the basis of the image signal generated by said image signal generator;

a feeding unit for feeding the recording medium to said image forming unit; and a controller for outputting different types of commands to said image forming unit to control an operation of said image forming unit, wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state, wherein said image forming unit validates a specific command of the different types of commands when the specific command is received during at least a spare paper feed period from start of spare paper feeding of the recording medium to start of paper feeding from the predetermined position, wherein said image forming unit comprises a plurality of paper feed means, and the predetermined position is located on an upstream side of a merge point of sheet paths extending from said plurality of paper feed means to said image forming unit, and wherein said controller outputs the paper feed means designation command as one of the specific commands and causes the recording medium in spare paper feeding to stop at the predetermined position and allows another paper feed means to feed a recording medium when the paper feed means designation command is received during the spare paper feed period.

17. An apparatus according to claim 16, wherein one of said plurality of paper feed means is arranged to feed a recording medium having an image on a first surface thereof to form an image on a second surface thereof.

18. An apparatus according to claim 17, further comprising means for generating a spare paper feed signal for designating start of spare paper feeding.

19. An apparatus according to claim 17, wherein said image signal generator develops an image and generates an image signal on the basis of external code data, and wherein said image forming unit performs image formation in accordance with an electrophotographic scheme.

20. An apparatus according to claim 16, further comprising means for generating a spare paper feed signal for designating start of spare paper feeding.

21. An apparatus according to claim 16, wherein said image signal generator develops an image and generates an image signal on the basis of external code data, and
wherein said image forming unit performs image formation in accordance with an electrophotographic scheme.

22. An image forming apparatus comprising:
an image signal generator for generating an image signal;
an image forming unit for forming an image on a recording medium on the basis of the image signal generated by said image signal generator;
a feeding unit for feeding the recording medium to said image forming unit; and
a controller for outputting different types of commands to said image forming unit to control an operation of said image forming unit,
wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state, and
wherein said image forming unit performs different processing operations when a specific command of the different types of commands is received during a spare paper feed period from start of spare paper feeding of the recording medium to start of paper feeding from the predetermined position, and when the specific command is received before the spare paper feed period.

23. An apparatus according to claim 22,
wherein said image forming unit comprises a plurality of paper feed means, and said controller outputs a paper feed means designation command for designating one of said plurality of paper feed means; and
wherein said image forming unit performs paper feeding from the designated paper feed means when the paper feed means designation command is received before the spare paper feed period, and said image forming unit performs recording of a recording medium already fed in spare paper feeding and causes the designated paper feed means to feed the next recording medium when the paper feed means designation command is received during the spare paper feed period.

24. An image forming apparatus comprising:
an image forming unit for performing image formation, said image forming unit comprising image signal generating means and recording medium feed means;
signal generating means for generating a predetermined signal to cause said image forming unit to perform a predetermined operation; and
a controller for outputting a command to said image forming unit to control an operation of said image forming unit,
wherein said image forming unit performs different processing operations when said image forming unit receives the command during the predetermined operation based on the predetermined signal and when said image forming unit receives the command during an operation not based on the predetermined signal, and said image forming unit causes said recording medium feed means to keep the recording medium stopped at a predetermined position in spare paper feeding on the basis of the predetermined signal before said image signal generating means is set in an image signal generation enable state.

25. An image forming apparatus comprising:
an image signal generator for generating an image signal;
an image forming unit for forming an image on a recording medium on the basis of the image signal generated by said image signal generator;
a feeding unit for feeding the recording medium to said image forming unit; and
a controller for outputting different types of commands to said image forming unit to control an operation of said image forming unit,
wherein said feeding unit performs spare paper feeding of the recording medium to a predetermined position before said image signal generator is set in an image signal output enable state, and said feeding unit feeds the recording medium from the predetermined position to said image forming unit after said image signal generator is set in the image signal output enable state, and
wherein said image forming unit performs different abnormal event treatments for identical abnormal events during a spare paper feed period from start of spare paper feeding of the recording medium to start of paper feeding from the predetermined position and during a period except for the spare paper feed period.

26. An apparatus according to claim 25, wherein the abnormal event treatments are treatments performed for a feed disable state of the next recording medium.

27. An apparatus according to claim 26, wherein the abnormal event treatment during the spare paper feed period is the same as jamming processing of the recording medium.

28. An apparatus according to claim 25,
wherein said image forming unit comprises means for detecting the recording medium of spare paper feeding located at the predetermined position; and
wherein said feeding unit feeds the recording medium again upon occurrence of an abnormal event in which the recording medium in spare paper feeding is no longer detected.

29. An apparatus according to claim 25, further comprising spare paper feed signal generating means for designating start of spare paper feeding.

30. An apparatus according to claim 25,
wherein said image signal generator develops an image and generates an image signal on the basis of external code data; and
wherein said image forming unit performs image formation in accordance with an electrophotographic scheme using a light beam.

31. An apparatus according to claim 30,
wherein said image forming unit comprises means for deflecting the light beam; and
wherein the abnormal event treatments are treatments performed for a failure of said deflecting means.

32. An image forming apparatus comprising:
an image forming unit for forming an image, said image forming unit comprising image signal generating means, toner image forming means for forming a toner image on an image carrier, and recording medium feed means;

signal generating means for generating a predetermined signal for causing said image forming unit to perform a predetermined operation; and abnormal event treating means for performing a treatment of an abnormal state of said image forming unit, wherein said abnormal event treating means performs different abnormal event treatments when said image forming unit is set in abnormal states during the predetermined operation based on the predetermined signal and during an operation other than the predetermined operation, and said image forming unit causes said recording medium feed means to stop the recording medium at the predetermined position on the basis of the predetermined signal before said image signal generating means is set in an image signal generation enable state.

33. An apparatus according to claim 32, wherein the abnormal state is one of a supply disable state of the next recording medium and a toner image formation disable state.

34. An image forming apparatus comprising:
an image signal generator for generating an image signal;
an image forming unit for forming an image on a recording medium on the basis of the image signal generated by said image signal generator;
a feeding unit for feeding the recording medium to said image forming unit, said feeding unit performing spare paper feeding of the recording medium to a predetermined position before said image signal generator is set in an image signal output enable state, and said feeding unit feeding the recording medium from the predetermined position to said image forming unit after said image signal generator is set in the image signal output enable state; and
control means for discharging a given recording medium without forming an image thereon when a pile-limit time of the given recording medium within said apparatus exceeds a predetermined period of time,
wherein said control means can change and set the predetermined period of time.

35. An apparatus according to claim 34, wherein said image signal generator develops an image and generates an image signal on the basis of external code data.

36. An apparatus according to claim 34, wherein said control means sets the predetermined period of time in accordance with ambient conditions inside said apparatus.

37. An apparatus according to claim 36,
further comprising at least either a temperature sensor or a humidity sensor, and
wherein said control means sets the predetermined period of time on the basis of a detection signal from said temperature or humidity sensor.

38. An apparatus according to claim 34,
wherein said apparatus comprises a plurality of feeding units, one of said plurality of feeding units selectively performing paper feeding, and
wherein said control means sets the predetermined period of time in accordance with one of the plurality of paper feed means which performs paper feeding.

39. An image forming apparatus comprising:
an image forming unit for forming an image on a recording medium on the basis of an image signal sent from an image signal generator;
a feeding unit for feeding the recording medium to said image forming unit; and
a receiver for receiving different types of commands to control an operation of said image forming unit,
wherein said feeding unit performs spare paper feeding of the recording medium to a predetermined position before said image signal generator is set in an image signal output enable state, and
wherein when said receiver receives a paper refeed command during the spare paper feeding, the recording medium fed in spare paper feeding is discharged without forming an image thereon, and another recording medium is fed.

40. An apparatus according to claim 39, wherein said image forming unit comprises a plurality of paper feeding means, and one of said plurality of paper feeding means can be designated to feed said another recording medium when the paper refeed command is output.

41. An image forming apparatus comprising:
an image forming unit for forming an image on a recording medium on the basis of an image signal sent from an image signal generator;
a feeding unit for feeding the recording medium to said image forming unit; and
a receiver for receiving different types of commands to control an operation of said image forming unit,
wherein said feeding unit performs spare paper feeding of the recording medium to a predetermined position before said image signal generator is set in an image signal output enable state, and
wherein said image forming unit comprises a plurality of paper discharge means, and when said receiver receives a paper discharge means designation command during the spare paper feeding, the designated paper discharge means discharges the recording medium fed in the spare paper feeding after the image forming.

42. An image forming apparatus comprising:
an image forming unit for forming an image on a recording medium on the basis of an image signal sent from an image signal generator;
a feeding unit for feeding the recording medium to said image forming unit; and
a receiver for receiving different types of commands to control an operation of said image forming unit,
wherein said feeding unit performs spare paper feeding of the recording medium to a predetermined position before said image signal generator is set in an image signal output enable state, and
wherein said image forming unit comprises a plurality of paper feed means and when said receiver receives a paper feed means designation command for designating one of said plurality of paper feed means to feed the recording medium during the spare paper feeding, said image forming unit performs recording of the recording medium in spare paper feeding and causes the designated paper feed means to feed a recording medium to be recorded next.

43. An image forming apparatus comprising:
an image forming unit for forming an image on a recording medium on the basis of an image signal sent from an image signal generator;
a feeding unit for feeding the recording medium to said image forming unit; and a receiver for receiving different types of commands to control an operation of said image forming unit, wherein said feeding unit performs spare paper feeding of the recording medium to a predetermined position before said image signal generator is set in an image signal output enable state, wherein said image forming unit can perform image formation selectively at one of a plurality of resolutions, and wherein when said receiver receives a command for designating one of the plurality of resolutions, said image forming unit forms the image on the recording medium in the spare paper feeding at the designated resolution.

44. An image forming apparatus comprising:

an image forming unit for forming an image on a recording medium on the basis of an image signal sent from an image signal generator;

a feeding unit for feeding the recording medium to said image forming unit; and a receiver for receiving different types of commands to control an operation of said image forming unit, wherein said feeding unit performs spare paper feeding of the recording medium to a predetermined position before said image signal generator is set in an image signal output enable state, wherein said image forming unit comprises a plurality of paper feed means, and the predetermined position is located on an upstream side of a merge point of sheet paths extending from said plurality of paper feed means to said image forming unit, and wherein when said receiver receives the paper feed means designation command during the spare paper feeding, said apparatus causes the recording medium in spare paper feeding to stop at the predetermined position and allows another paper feed means to feed a recording medium.

45. An apparatus according to claim 44, wherein one of said plurality of paper feed means is arranged to feed a recording medium having an image on a first surface thereof to have an image formed on a second surface thereof.

46. An apparatus according to claim 44, wherein said image forming unit comprises a plurality of paper feed means, and said receiver receives a paper feed means designation command for designating one of said plurality of paper feed means; and wherein the recording medium is fed from the designated paper feed means when the paper feed means designation command is received before the spare paper feeding, and said image forming unit performs recording on a recording medium already fed in spare paper feeding and causes the designated paper feed means to feed the next recording medium when the paper feed means designation command is received during the spare paper feeding.

47. An image forming apparatus comprising:

an image forming unit for forming an image on a recording medium on the basis of the image signal generated by said image signal generator, a feeding unit for feeding the recording medium to said image forming unit; and a receiver for receiving different types of commands to control an operation of said image forming unit, wherein said feeding unit performs spare paper feeding of the recording medium to a predetermined position before said image signal generator is set in an image signal output enable state, and wherein said image forming unit performs different processing operations when the specific command of the different types of commands is received during a spare paper feed period and when the specific command is received before the spare paper feed period.

48. An image forming apparatus comprising:

an image forming unit for performing image formation, said image forming unit comprising an image signal receiver for receiving an image signal sent from an image signal generating means and recording medium feed means;

a signal receiver for receiving a predetermined signal to cause said image forming unit to perform a predetermined operation; and a command receiver for receiving a command to control an operation of said image forming unit, wherein said image forming unit performs different processing operations when said command receiver receives the command during the predetermined operation based on the predetermined signal and when said command receiver receives the command during an operation not based on the predetermined signal, and said image forming unit causes said recording medium feed means to keep stopping the recording medium at a predetermined position in spare paper feeding on the basis of the predetermined signal before said image signal generating means is set in an image signal generation enable state.

49. An image forming apparatus comprising:

an image forming unit for forming an image on a recording medium on the basis of the image signal sent from an image signal generator;

a feeding unit for feeding the recording medium to said image forming unit; and a receiver for receiving different types of commands to control an operation of said image forming unit, wherein said feeding unit performs spare paper feeding of the recording medium to a predetermined position before said image signal generator is set in an image signal output enable state, and wherein said image forming unit performs different abnormal event treatments for identical abnormal events during a spare paper feed period and during a period other than the spare paper feed period.

50. An apparatus according to claim 49, wherein the abnormal event treatments are treatments performed for a feed disable state of the next recording medium.

51. An apparatus according to claim 50, wherein the abnormal event treatment during the spare paper feed period is the same as jamming processing of the recording medium.

52. An apparatus according to claim 49, wherein said image forming unit comprises means for detecting the recording medium of spare paper feeding located at the predetermined position; and wherein said feeding unit feeds the recording medium again upon occurrence of an abnormal event in which the recording medium in spare paper feeding is no longer detected.

53. An apparatus according to claim 49, further comprising spare paper feed signal generating means for designating start of spare paper feeding.

54. An apparatus according to claim 49, wherein said image signal generator develops an image and generates an image signal on the basis of external code data; and wherein said image forming unit performs image formation in accordance with an electrophotographic scheme using a light beam.

55. An apparatus according to claim 54, wherein said image forming unit comprises means for deflecting the light beam; and wherein the abnormal event treatments are treatments performed for a failure of said deflecting means.

56. An image forming apparatus comprising:

an image forming unit for forming an image, said image forming unit comprising image signal generating means, toner image forming means for forming a toner image on an image carrier, and recording medium feed means;

signal receiving means for receiving a predetermined signal for causing said image forming unit to perform a predetermined operation; and abnormal event treating means for performing a treatment of an abnormal state of said image forming unit, wherein said abnormal event treating means performs different abnormal event treatments when said image forming unit is set in abnormal states during the predetermined operation based on the predetermined signal and during an operation other than the predetermined operation, and said image forming unit causes said recording medium feed means to stop the recording medium at the predetermined position on the basis of the predetermined signal before said image signal generating means is set in an image signal generation enable state.

57. An apparatus according to claim 56, wherein the abnormal state is one of a supply disable state of the next recording medium and a toner image formation disable state.

* * * * *

UNITED STATES PATENT AND TRADEMARK OFFICE
CERTIFICATE OF CORRECTION

PATENT NO. : 5,258,779  Page 1 of 3
DATED : November 2, 1993
INVENTOR(S) : Yoji SERIZAWA, et al.

It is certified that error appears in the above-indentified patent and that said Letters Patent is hereby corrected as shown below:

Drawings:

SHEET 14 OF 42 - FIGURE 15:

"SESOLUTION" should read --RESOLUTION--.

SHEET 19 OF 42 - FIGURE 21:

"FEEDIND" should read --FEEDING--.

COLUMN 1:

Line 33, "resist" should read --resist or regist--.

COLUMN 2:

Line 46, "even" should read --event--.

UNITED STATES PATENT AND TRADEMARK OFFICE
CERTIFICATE OF CORRECTION

PATENT NO. : 5,258,779

DATED : November 2, 1993

INVENTOR(S) : Yoji SERIZAWA, et al.

It is certified that error appears in the above-identified patent and that said Letters Patent is hereby corrected as shown below:

COLUMN 10:

Line 42, "connector  ." should read --connector Ⓐ.--.

COLUMN 11:

Line 29, "Commane" should read --Command--.

COLUMN 13:

Line 56, "no" should read --not--.

COLUMN 15:

Line 7, "BC" should read --BD--.

COLUMN 17:

Line 22, "   ." should read --Ⓐ.--.

COLUMN 18:

Line 68, "connectors  " should read --connectors Ⓐ--.

UNITED STATES PATENT AND TRADEMARK OFFICE
CERTIFICATE OF CORRECTION

PATENT NO. : 5,258,779
DATED : November 2, 1993
INVENTOR(S) : Yoji SERIZAWA, et al.

It is certified that error appears in the above-indentified patent and that said Letters Patent is hereby corrected as shown below:

COLUMN 22:

Line 28, "$T_{L2}$ s" should read --$T_{L2}$ is--.

COLUMN 24:

Line 20, "S3'" should read --$S_3$'--.

Signed and Sealed this

Eleventh Day of October, 1994

Attest:

BRUCE LEHMAN

*Attesting Officer*    *Commissioner of Patents and Trademarks*